US008001067B2

(12) United States Patent
Visel et al.

(10) Patent No.: US 8,001,067 B2
(45) Date of Patent: Aug. 16, 2011

(54) METHOD FOR SUBSTITUTING AN ELECTRONIC EMULATION OF THE HUMAN BRAIN INTO AN APPLICATION TO REPLACE A HUMAN

(75) Inventors: Thomas A. Visel, Austin, TX (US); Vijay Divar, Austin, TX (US); Lukas K. Womack, Austin, TX (US); Matthew Fettig, Austin, TX (US); Gene P. Hamilton, Austin, TX (US)

(73) Assignee: Neuric Technologies, LLC, Houston, TX (US)

( * ) Notice: Subject to any disclaimer, the term of this patent is extended or adjusted under 35 U.S.C. 154(b) by 571 days.

(21) Appl. No.: 11/697,721

(22) Filed: Apr. 7, 2007

(65) Prior Publication Data
US 2007/0282765 A1   Dec. 6, 2007

Related U.S. Application Data

(63) Continuation-in-part of application No. 11/670,959, filed on Feb. 2, 2007, which is a continuation-in-part of application No. 11/425,688, filed on Jun. 21, 2006, now Pat. No. 7,849,034, which is a continuation of application No. 11/154,313, filed on Jun. 16, 2005, now Pat. No. 7,089,218, which is a continuation of application No. 11/030,452, filed on Jan. 6, 2005, now abandoned.

(60) Provisional application No. 60/534,641, filed on Jan. 6, 2004, provisional application No. 60/534,492, filed on Jan. 6, 2004, provisional application No. 60/534,659, filed on Jan. 6, 2004, provisional application No. 60/764,442, filed on Feb. 2, 2006, provisional application No. 60/790,166, filed on Apr. 7, 2006.

(51) Int. Cl.
*G05B 13/02* (2006.01)
(52) U.S. Cl. ........................................... 706/23; 706/46

(58) Field of Classification Search .................. 706/46, 706/23
See application file for complete search history.

(56) References Cited

U.S. PATENT DOCUMENTS
5,371,807 A   12/1994 Register et al.
(Continued)

FOREIGN PATENT DOCUMENTS
EP   1 006 452 A2   6/2002

OTHER PUBLICATIONS

Breazeal, C. and Scassellati, B. 2000. Infant-like social interactions between a robot and a human caregiver. Adapt. Behav. 8, 1 (Jan. 2000), 49-74.*

(Continued)

*Primary Examiner* — Jeffrey A Gaffin
*Assistant Examiner* — David H Kim
(74) *Attorney, Agent, or Firm* — Howison & Arnott, L.L.P.

(57) ABSTRACT

A method for emulating human behavior and actions in an expert mode to control and execute a defined task. The first step is to define a task based application having a task associated therewith that is operable to receive goals and conditions and which goals define the desired results to be achieved when the task is performed. A brain emulation is represented by a plurality of nodes each representing a concept, and interconnecting relationships between select ones of the concepts, which brain emulation is operable to receive information from the task based application and process such information and capable controlling the task based application with the outcome of such processing to achieve the goal of the task based application. The brain emulation receives information either directly from a external source or from the task based application as to the state of the task based application and processes the received information based on the existing interconnecting relationships to initiate the task associated with the task based application and attempt to achieve the goal associated with the task based application.

6 Claims, 31 Drawing Sheets

U.S. PATENT DOCUMENTS

| | | | |
|---|---|---|---|
| 5,406,956 | A | 4/1995 | Farwell |
| 5,918,222 | A | 6/1999 | Fukui et al. |
| 6,081,774 | A | 6/2000 | de Hita et al. |
| 6,269,368 | B1 | 7/2001 | Diamond |
| 6,330,537 | B1 | 12/2001 | Davis et al. |
| 6,353,810 | B1 | 3/2002 | Petrushin |
| 6,415,257 | B1 | 7/2002 | Junqua et al. |
| 6,513,006 | B2 | 1/2003 | Howard et al. |
| 6,584,464 | B1 | 6/2003 | Warthen |
| 6,601,026 | B2 | 7/2003 | Appelt et al. |
| 6,731,307 | B1 * | 5/2004 | Strubbe et al. .............. 715/727 |
| 6,826,568 | B2 | 11/2004 | Bernstein et al. |
| 7,113,848 | B2 * | 9/2006 | Hanson .......................... 700/245 |
| 7,379,568 | B2 * | 5/2008 | Movellan et al. ............. 382/118 |
| 2003/0055654 | A1 * | 3/2003 | Oudeyer ....................... 704/275 |
| 2003/0101151 | A1 * | 5/2003 | Holland ......................... 706/45 |
| 2003/0130837 | A1 | 7/2003 | Batchilo et al. |
| 2004/0138936 | A1 * | 7/2004 | Johnson et al. ................. 705/7 |
| 2004/0138959 | A1 * | 7/2004 | Hlavac et al. .................. 705/26 |
| 2004/0181427 | A1 | 9/2004 | Stobbs et al. |
| 2004/0193420 | A1 | 9/2004 | Kennewick et al. |
| 2004/0243568 | A1 | 12/2004 | Wang et al. |

OTHER PUBLICATIONS

Matthew J. Marjanovic. Teaching an Old Robot New Tricks: Learning Novel Tasks via Interaction with People and Things. MIT AI Lab. AI Technical Report 2003-013. Jun. 2003.*

Barba, R. The Sims: Prima's Official Strategy Guide. Prima Publishing, Roseville, CA. 2000.*

Fong, T., Nourbakhsh, I., Dautenhahn, K. A survey of socially interactive robots: concepts, design and applications, Technical Report No. CMU-RI-TR-02-29, Robotics Institute, Carnegie Mellon University, 2002.*

"International Search Report," International Searching Authority of the Patent Cooperation Treaty, PCT Application No. PCT/US06/00229, May 12, 2006, p. 1.

* cited by examiner

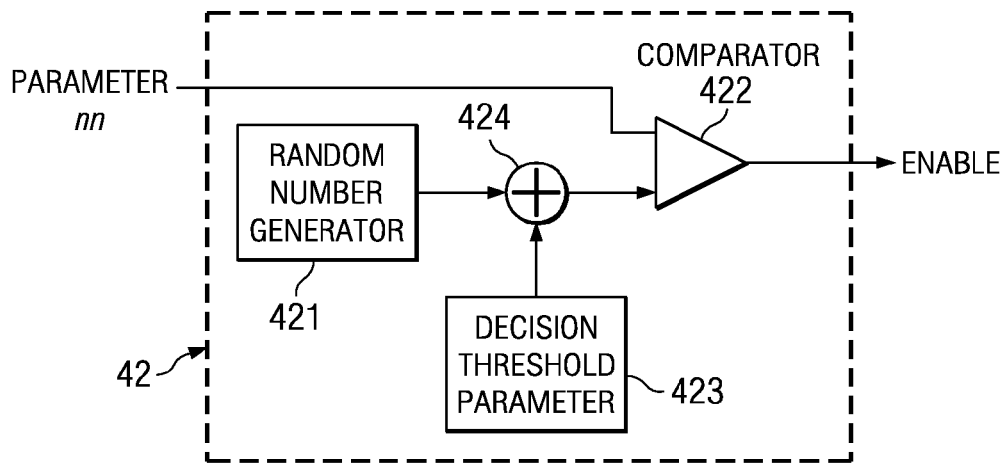

FIG. 3

```
/** *** Overall Sentence ***
 *   Order of tests is important. */
     Sentence = {Quest_To_Learn | Imper_Sentence | Exclam_Sentence
               |   Decl_Sentence | Quest_To_Confirm};

/*   *** Declarative Sentence ***
 *   Indicators: Subject is before the verb, is spoken w/ falling
 *   intonation, and ends in '.'
 *   Hearer responds w/ acknowledgement (yes, okay, <nod>). */
     Decl_Sentence = go Has_Decl '.';
     Decl_Phrase   = Ind_Clause [{Coord_Conj | ';'} Ind_Clause] . Has_Decl;
     Ind_Clause    = Subject Predicate;
     Predicate     = Not_End [Adverb] {Tv_Sentence | Iv_Sentence
                     | Lv_Sentence} [Compounder];

Compounder    = Not_End [','] Adv_Sub_Conj Decl_Phrase;

/*   ** Sentence w/ linking verb - Describe or identify a condition (of being) ***/
     Lv_Sentence = Lv {Subj_Compl | Adv_Phrase | Adjective};

```
1. the table failed.
Sentence                                    'the table failed.'
  Declarative                               'the table failed.'
    Ind_Clause                              'the table failed.'
      Subj                                  'the table failed.'
        Noun_Ph                             'the table failed.'
          Not_End                           'the table failed.'
          Pronoun                           'the table failed.'
          Norm_Noun_Ph                      'the table failed.'
            Noun_Prefix                     'the table failed.'
              Article                       'the table failed.'
                Def_Art                     'the table failed.'
                Def_Art matched 'the'
              Article matched 'the'
            Noun_Prefix matched 'the'
            Noun_Equiv                      ' table failed.'
            Noun_Equiv matched 'table'
          Norm_Noun_Ph matched 'the table'
        Noun_Ph matched 'the table'
      Subj matched 'the table'
      Pred                                  'failed.'
        Classify_MV                         'failed.'
          Verb_Wo_Cdx                       'failed.'
            Past                            'failed.'
              Past_Verb                     'failed.'
              Past_Verb matched 'failed'
            Past matched 'failed'
          Verb_Wo_Cdx matched 'failed'
        Classify_MV matched 'failed'
      Pred matched 'failed'
    Ind_Clause matched 'the table failed'
  Declarative matched 'the table failed'
Sentence matched 'the table failed.'
```

*FIG. 6*

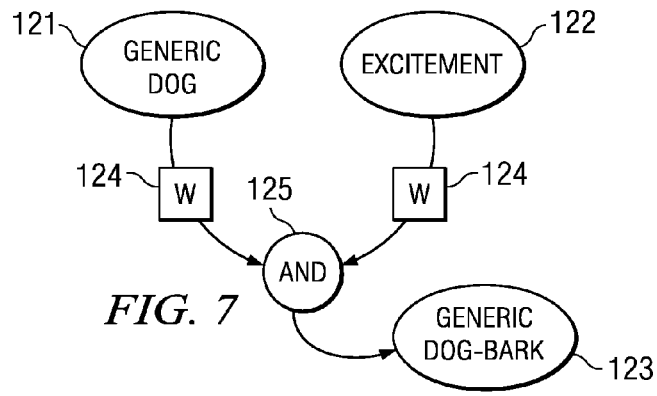
FIG. 7
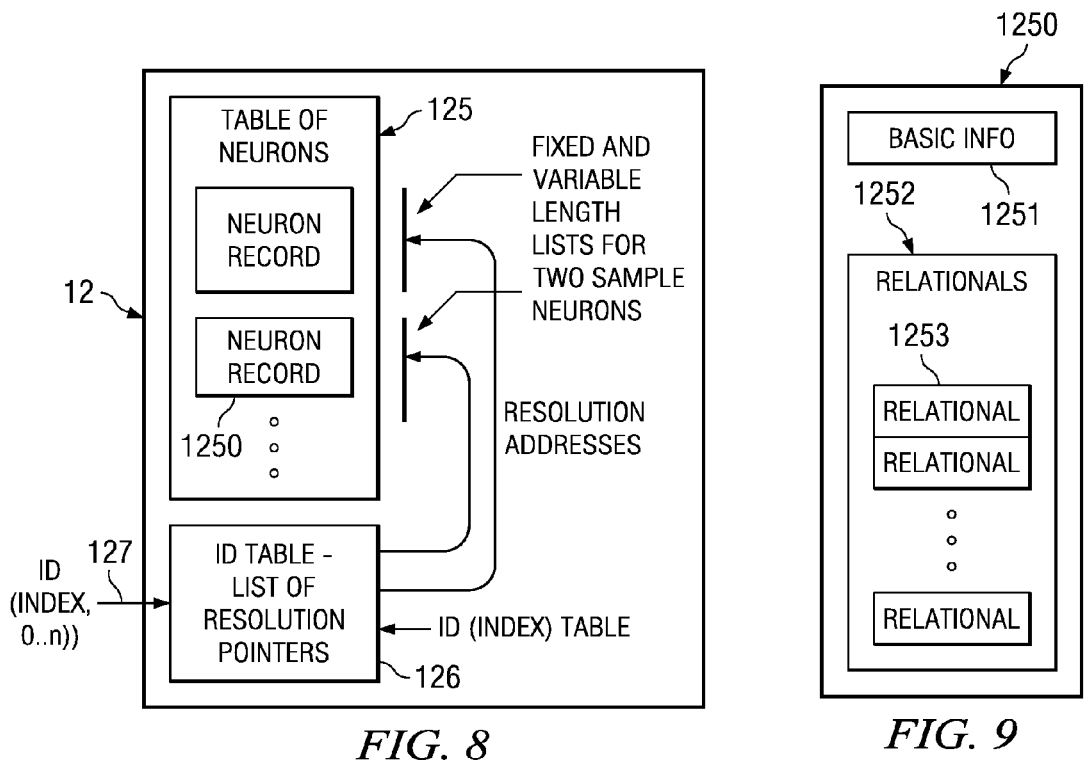
FIG. 8
FIG. 9
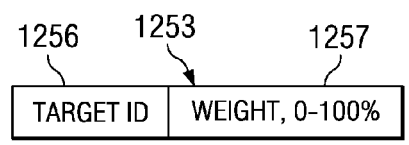
FIG. 10

201 → ['PRE-WIRED' TEMPERAMENT] + [EXPERIENCE AND ENVIRONMENT] → [COMPOSITE PERSONALITY]

*FIG. 14*

| CHOLERIC TEMPERAMENT | MELANCHOLY TEMPERAMENT | SANGUINE TEMPERAMENT | PHLEGMATIC TEMPERAMENT |
|---|---|---|---|
| DECISIVENESS<br>ORGANIZATION ORIENTED<br>LEADERSHIP<br>ORGANIZED<br>MAKES A PLAN | ANALYTICAL<br>DETAIL ORIENTED<br>METICULOUS<br>TECHNICAL<br>INVENTIVE<br>CORRELATES SEEMINGLY UNRELATED FACTS | ENERGETIC<br>WARMTH<br>PEOPLE ORIENTED<br>OUTGOING<br>PARTY ANIMAL<br>FUN LOVING<br>ADVENTURESOME<br>SEEKS CHANGE | LOYAL<br>SLOW CHANGING<br>FAITHFUL<br>MEMORY CAPACITY<br>OBSERVER<br>FOLLOWS A PLAN<br>STUDIOUS |

CHARACTERISTIC TRAITS

*FIG. 15*

All tall mail men sometimes chase orange dogs quickly and belch.
Some rather rude men belch.
Men belch.

TONGUE

MOUTH

RIGHT EYE

LEFT EYE

TEETH

NOSE

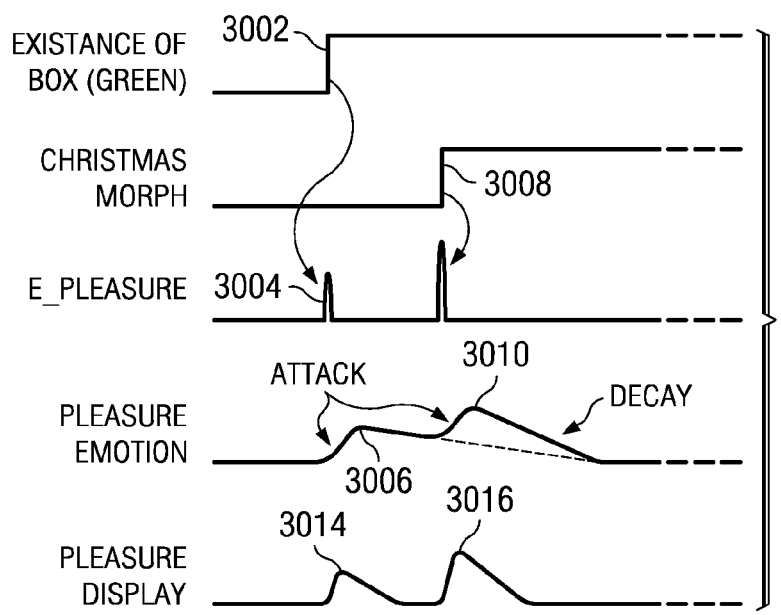
*FIG. 30A*
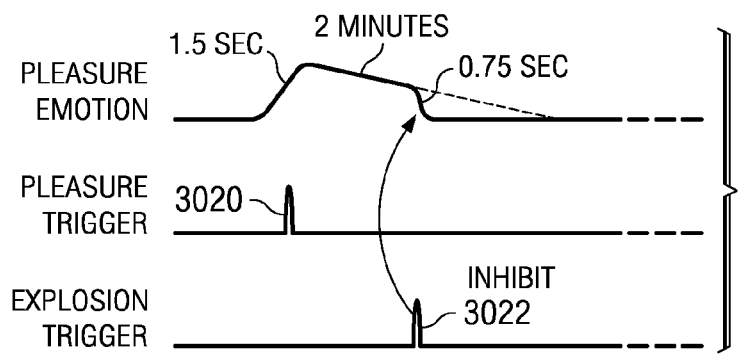
*FIG. 30B*
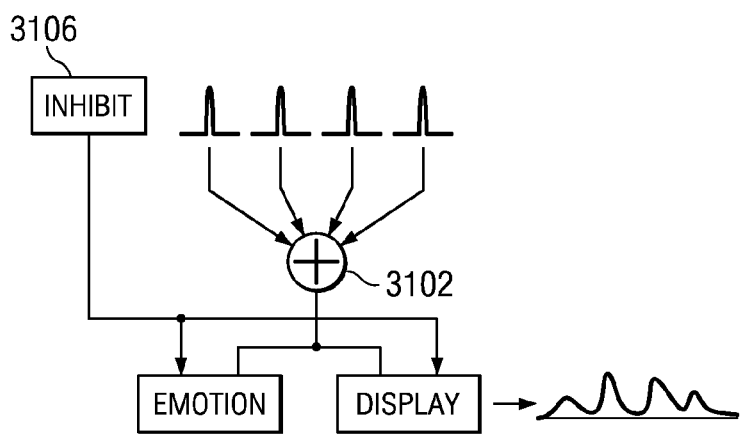
*FIG. 31A*
*FIG. 31B*

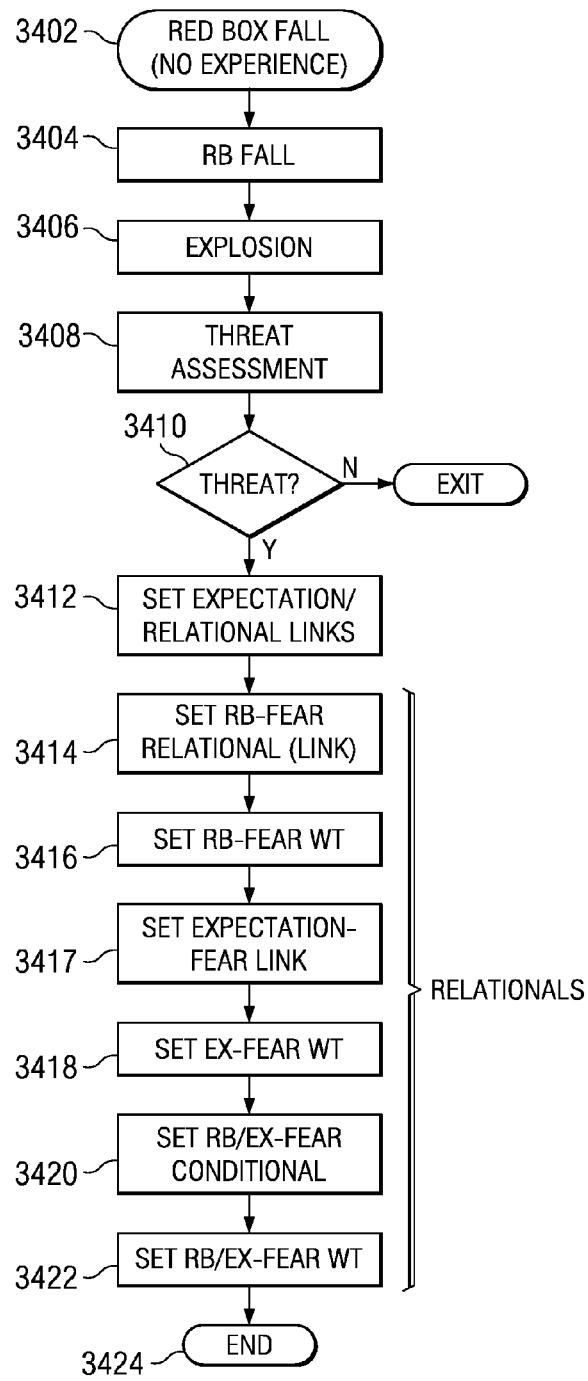
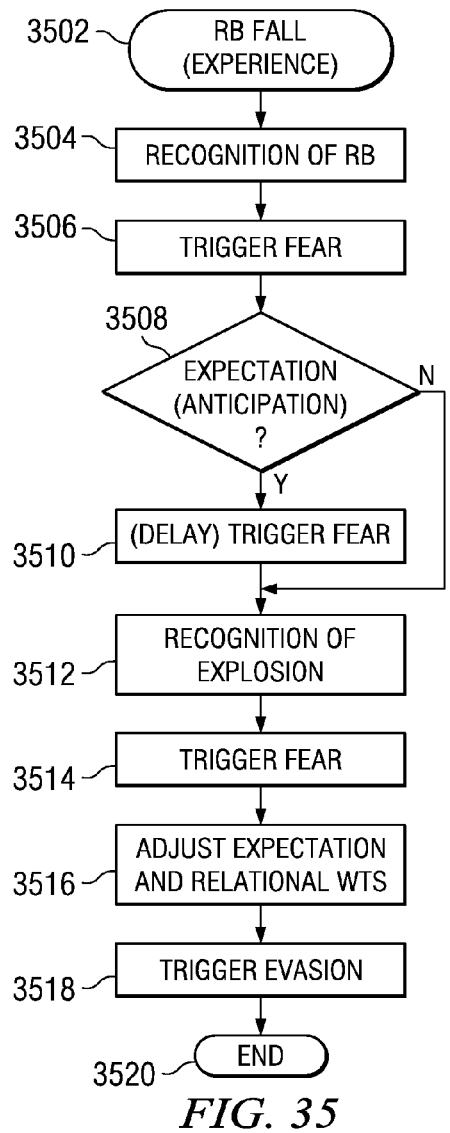
FIG. 34
FIG. 35

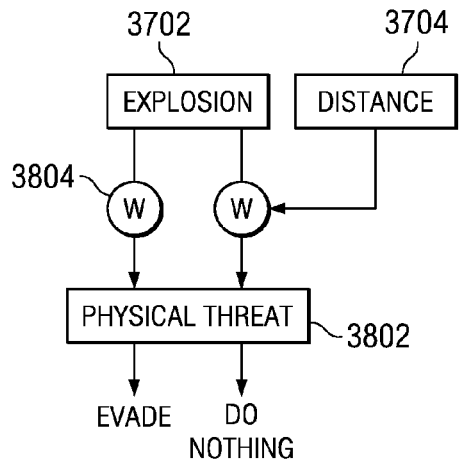
FIG. 38
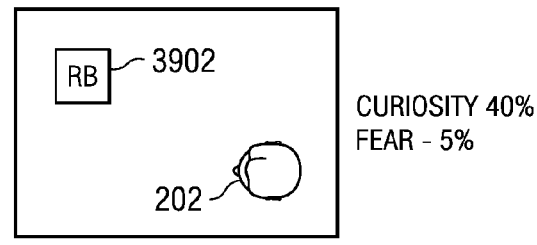
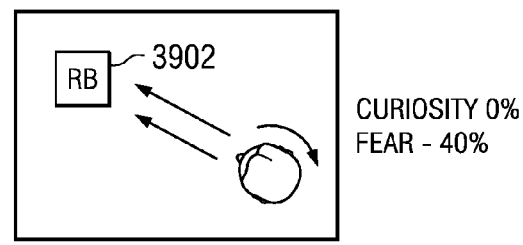
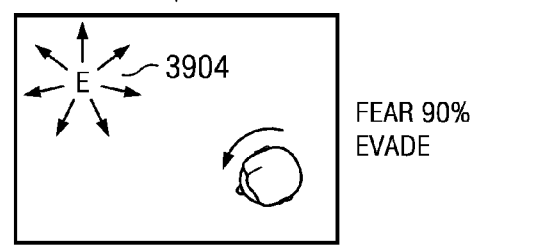
FIG. 39
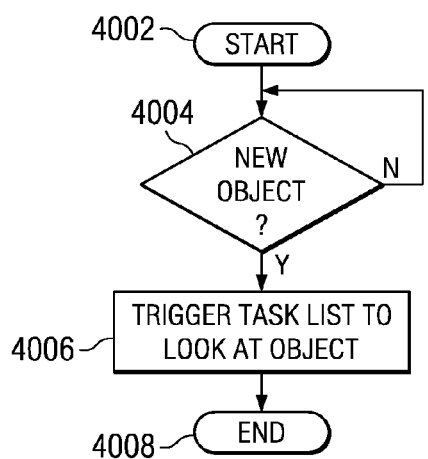
FIG. 40

# METHOD FOR SUBSTITUTING AN ELECTRONIC EMULATION OF THE HUMAN BRAIN INTO AN APPLICATION TO REPLACE A HUMAN

CROSS REFERENCE TO RELATED APPLICATIONS

This application is a Continuation-in-Part of pending U.S. patent application Ser. No. 11/670,959, filed Feb. 2, 2007, and entitled METHOD FOR MOVIE ANIMATION and claims benefit of U.S. Provisional Application Ser. No. 60/790,166, filed on Apr. 7, 2006, and entitled BRIAN MODEL. Application Ser. No. 11/670,959 claims benefit of U.S. Provisional Application Ser. No. 60/764,442, filed on Feb. 2, 2006, and entitled USE OF THE NEURIC BRAIN MODEL IN MOVIE ANIMATION. Application Ser. No. 11/670,959 is also a Continuation-in-Part of U.S. patent application Ser. No. 11/425,688, filed Jun. 21, 2006, and entitled METHOD OF EMULATING HUMAN COGNITION IN A BRAIN MODEL CONTAINING A PLURALITY OF ELECTRONICALLY REPRESENTED NEURONS, now U.S. Pat. No. 7,849,034, issued on Dec. 7, 2010, which is a Continuation of U.S. application Ser. No. 11/154,313, filed Jun. 16, 2005, and entitled METHOD FOR INCLUSION OF PSYCHOLOGICAL TEMPERAMENT IN AN ELECTRONIC EMULATION OF THE HUMAN BRAIN, now U.S. Pat. No. 7,089,218, issued Aug. 8, 2006, which is a Continuation of abandoned U.S. application Ser. No. 11/030,452, filed Jan. 6, 2005, and entitled METHOD FOR INCLUSION OF PSYCHOLOGICAL TEMPERAMENT IN AN ELECTRONIC EMULATION OF THE HUMAN BRAIN, which claims the benefit of U.S. Provisional Application for Patent Ser. No. 60/534,641, entitled NEURIC BRAIN MODELING SYSTEM IN THE MILITARY ENVIRONMENT, U.S. Provisional Application for Patent Ser. No. 60/534,492, entitled METHOD FOR INCLUSION OF PSYCHOLOGICAL TEMPERAMENT IN AN ELECTRONIC EMULATION OF THE HUMAN BRAIN, U.S. Provisional Application for Patent Ser. No. 60/534,659, entitled DESIGN OF THE NEURIC BRAIN, all filed Jan. 6, 2004.

TECHNICAL FIELD

The present invention pertains in general to artificial intelligence and, more particularly, to replacing a human in an application specific environment.

BACKGROUND

In certain applications, a human is required in order to assess the conditions surrounding the operation of particular system or the execution of a certain task and to determine the progress of the task or covered conditions in the system have changed. Once an observation is made by a user, based upon that user's experience and information, there can be some type of action taken. For example, it might be that a user would make a change to the system in order to maintain the system in a particular operating range, this being the task of that individual. Further, it might be that the user is tasked to achieve certain results with the system. In this situation, the user would take certain actions, monitor the operations, i.e., the surrounding environment, and then take additional actions if necessary or to ensure that the tasks are achieved. This also the case with military operations wherein multiple individuals might be involved in carrying out of military mission. In this situation, multiple individuals, each having their own expertise, would be given a certain task that, when operating in concert, would be achieved-tasks of achieving a certain military goal. However, each of these individuals, although having a certain amount of specific training, also has the ability to make decisions that are not directly accorded to their experience in training. For example, if an unknown factor entered into the mission, i.e., a previously unknown obstacle occurs, an individual has the background to make a decision, though this decision is made based upon prior experience in different areas that the human might have.

Sometimes an expert system is supposed to operate a particular system to take the place of the human. These expert systems are trained based upon an expert human wherein that human is presented with certain conditions and the actions are recorded. Whenever those conditions exist with respect to the expert system, the expert system will take the same actions. However, if conditions exist that were not part of the training dataset for the expert system, the results would be questionable, as there is no basis upon which to make such a decision by the expert system.

SUMMARY OF THE INVENTION

The present invention disclosed and claimed herein comprises a method for emulating human behavior and actions in an expert mode to control and execute a defined task. The first step is to define a task based application having a task associated therewith that is operable to receive goals and conditions and which goals define the desired results to be achieved when the task is performed. Inputs are provided to the task based application for controlling the operation thereof, and information as to the state of the task based application is received from the task based application. A brain emulation is represented by a plurality of nodes each representing a concept, and interconnecting relationships between select ones of the concepts, which brain emulation is operable to receive information from the task based application and process such information and capable of controlling the task based application with the outcome of such processing to achieve the goal of the task based application. The brain emulation is trained in a training mode to establish the relationships between concepts in response to training information input thereto that is designed to impart predetermined meaning to the one or more concepts in the brain emulation. After training, the brain emulation receives information either directly from a external source or from the task based application as to the state of the task based application and processes the received information based on the existing interconnecting relationships to initiate the task associated with the task based application and attempt to achieve the goal associated with the task based application.

BRIEF DESCRIPTION OF THE DRAWINGS

For a more complete understanding of the present invention and the advantages thereof, reference is now made to the following description taken in conjunction with the accompanying Drawings in which:

FIG. 3 illustrates Influence Inclusion—An example of weighted random influence;

FIG. 5 illustrates Language Grammar Sample—Example of natural language grammar description;

FIG. 6 illustrates Example Parser Diagnostic Trace—Example trace of grammar parsing;

FIG. 7 illustrates Example Relationals Between Neurons;

FIG. 8 illustrates Organization of Neuron Tables—General organization of neuron memory lists;

FIG. 9 illustrates Table of Neurons—Internal organization of a neuron;

FIG. 10 illustrates Example Relational Record—Contents of inter-neuron relationship record;

FIG. 14 illustrates The Layered-Temperament Personality;

FIG. 15 illustrates Characteristic Traits of the Temperaments;

FIGS. 30a and 30b illustrate timing diagrams for activating both the emotion neuron and the display as a function of the triggering of other neurons;

FIG. 31a illustrates a diagrammatic view of the summation of multiple inputs to a single neuron;

FIG. 31b illustrates a diagrammatic view of a sequence of triggering events;

FIG. 34 illustrates a flow chart for one animation sequence prior to gaining experience;

FIG. 35 illustrates a flow chart for the operation of FIG. 34 with experience;

FIG. 38 illustrates a diagrammatic view of the concept of an example physical threat;

FIG. 39 illustrates a sequence of events illustrating the evasion animation;

FIG. 40 illustrates a flow chart for viewing a new object in environment;

DETAILED DESCRIPTION

Figure 1:
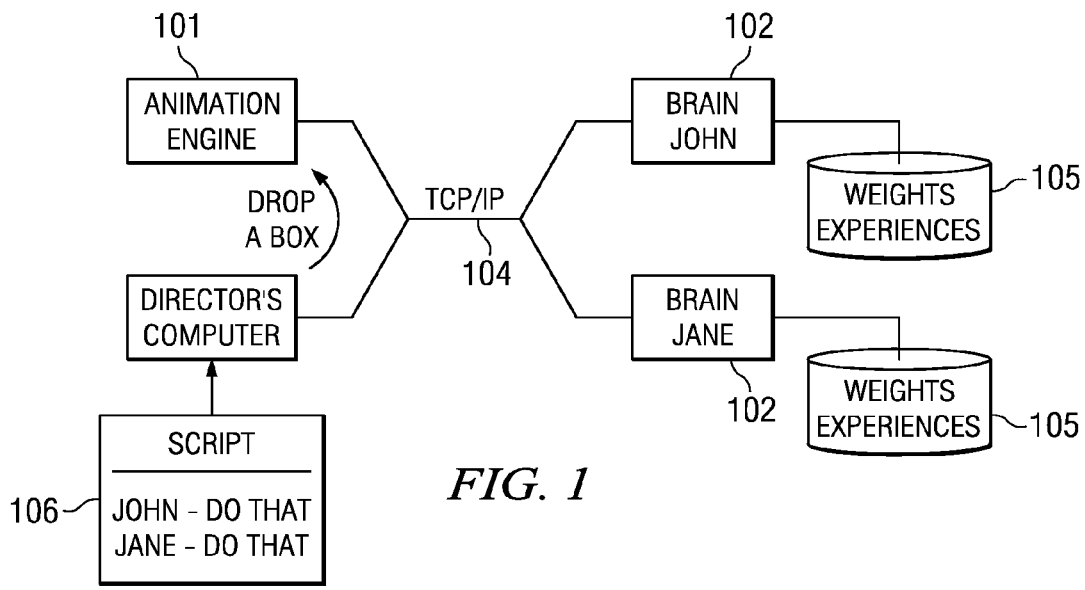
FIG. 1 illustrates a diagrammatic block diagram of the overall animation system.

Referring now to FIG. 1, there is illustrated an overall diagrammatic view of the system of the present disclosure. This system is directed toward the concept of controlling an animation engine 101 through the use of central animation brains 102, one associated with a first character named "John" and with a second character named "Jane." Each of these brains 102, as will be described in more detail herein below, is capable of being trained to express emotion, that emotion being translated into control signals that can be put into the animation engine 101. A communication path 104 is provided for communicating information from each of the brains 102 over to the animation engine 101. This communication path can be any type of communication path, such as a TCP/IP protocol. Of course, it is well understood that any type of communication path can be utilized. Each of the brains 102, after training, will have a character, this character being defined in a memory system 105 associated with each of the characters. In these memories is contained various experiences of the particular character and various weights. These are trained and adaptable. During the generation of the animation, the entire animation is controlled by a director who may tweak the script. The screen-writer's material that is defined in a script 106 basically instructs the particular brain or character to do a particular action or instructs an input to occur in the animation engine 101. For example, as will be described in more detail herein below, the animation engine 101 can be directed to drop a box in close proximity to a particular character. This essentially is in the "virtual world" of the particular character. This action can then be interpreted by the brain and experience is gained from that action through these various inputs. As will be described herein below, this action in the animation engine 101 can elicit various emotional responses, which emotional responses are in direct response to the environmental changes within this virtual world proximate to the character which will then cause the brain to generate outputs to express emotion, this being facilitated by the animation engine.

Figure 2A:
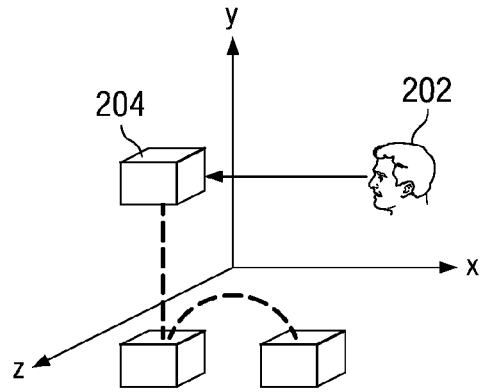
FIGS. 2a and 2b illustrate a diagrammatic view of an animation sequence.
Figure 2B:
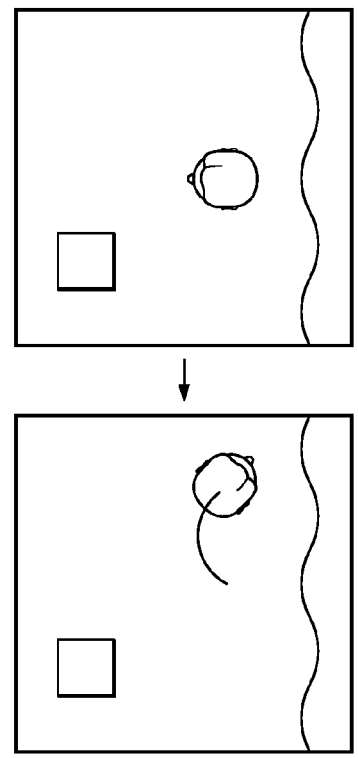

Referring now to FIGS. 2a and 2b, there is illustrated a very simplistic concept of this animation sequence. A character 202 is provided in the virtual world defined as a series of vertices in the x, y and z direction. The character 202 is basically a character that can be represented through various concepts, but has a positional relationship with respect to the environment. There will be a head which can rotate in all directions which will have perception points, those perception points being, for example, the eyes, the nose, the mouth and even the ears. In this example, only the concept of vision will be described. Therefore, there will be two points in the virtual space that represent the vision. These points can be rotated by rotating the head in an animation sequence such that they are oriented in the direction of an object, for example, a falling box 204. The falling box is illustrated as falling from an upper level, down to a surface, and then bouncing. As will be described herein below, the character 202 is animated to recognize the box, move its head to view the box and follow the box to the upper location, to the lower location and as it bounces. Further, as will be described herein below, there will be emotion expressed as a result of seeing the box and any actions that may occur with respect to the box in the environment of the individual. FIG. 2b illustrates a situation wherein the individual is aware of the box in the personal environment and in proximity thereto and, after seeing the box, viewing the box as a threat. Once the box is viewed as a threat, it can be seen that the character, in the lower portion of FIG. 2b, is placed into an animation sequence wherein the character will evade the box and move away from the box to a potentially safe area. As noted, this will be described in more detail herein below.

Core Brain

The central brain of the present disclosure distills the temperament, personality and instantaneous state of a human individual into a series of Brain Parameters. Each of these has a value varying from zero to 100 percent, and is loosely equivalent to a single neuron. These parameters collectively define the state of the person's being and specify matters of temperament and personality. Some parameters are fixed and seldom, if ever, change, while others change dynamically with present conditions.

Relationships between parameters, if any, are pre-established. The Parameters are connected with the rest of the brain model in such a manner as to alter the decision processes, decision thresholds and the implied personal interests of the underlying model they become a part of.

The exact list of Parameters and their definitions are not germane to the system of the present disclosure, and may include more or fewer parameters in any given implementation thereof Numerous parameters define certain tendencies specific to certain temperaments. Some define the present emotional state, such as sense of confidence in a decision. Others are place-holders that define such things as the present topic of conversation or who the first, second or third persons in the conversation are. Yet others define physical parameters such as orientation within the environment, sense of direction, timing and the like.

Some brain Parameters may be loosely arranged in a hierarchical fashion, while others are not, such that altering any one parameter may affect others lower in the hierarchy. This arrangement simplifies the implementation of personality.

Example Parameters. Table 1 illustrates a few of several hundred such parameters by way of example. The 'Choleric' parameter, 202 for example, is 'above' others in the hierarchy, in that altering the percentage of Choleric temperament affects the value of many other parameters. For example, it affects the Propensity to Decide 222. Each can be treated as a neuron that may be interconnected with other (non-parameter) neurons. The parameter neurons may serve in a role similar to an I/O port in a digital computer.

The below table is not a complete set of parameters, but is a representative set of parameters useful for the explanations that follow.

TABLE 1

General Examples of Brain Parameters

| | Parameter | Description |
|---|---|---|
| 201 | Root Temperament | Choleric, Melancholy, Sanguine or Phlegmatic |
| 202 | Choleric, Ratiometric | Percentage contribution of Choleric attributes |
| 203 | Melancholy, Ratiometric | Percentage contribution of Melancholy attributes |
| 204 | Sanguine, Ratiometric | Percentage contribution of Sanguine attributes |
| 204 | Phlegmatic, Ratiometric | Percentage Contribution of Phlegmatic attributes |
| 209 | Gender | Male or female |
| | Sense of Confidence (Decisions) | Degree of confidence in a decision |
| | Sense of Confidence (Motor Skills) | Degree of confidence in present motor skill |
| | Sense of Determination | Degree of determination to continue present plan |
| | Sense of Dread | Present sense of dread being experienced |
| | Sense of Enjoyment | Present sense of enjoyment |
| | Sense of Embarrassment | Present sense of embarrassment |
| 229 | Present need to Defer | Present need to defer to external person's desire |
| 230 | Trauma | State of physical or emotional trauma |
| | Present Goal (1 of n) | Present objective(s), a list |
| | Long Term Goal (1 of n) | Long term objective(s), a list |
| | Topic of conversation (1 of n) | The present subject of conversation, a list |
| | Self Identify | Recognition of identity such as target for communications |
| | Present Speaker | Identity of person speaking |
| | Person Spoken To | Identity of person being spoken to |
| | Present Object | Identity of object/person being spoken of |
| 235 | Correlating Facts, status | True of presently correlating information |
| 236 | Hottest Node, status | Hottest-firing node in context pool, for threshold scaling |
| 237 | Activity Threshold | Minimum firing level for context pool memory |

In traditional models of the human brain, facts are simplistically represented as a single neuron, each of which may 'fire' at some level of 0 . . . 100%. The degree of firing is construed as an indication of the present recognition of that fact. These neurons are interconnected by weighted links, based upon the relationship and experience between connected neurons.

Example Decision-Related State Parameters. Some of the key state parameters used in the decision process are detailed below. Some are set by personality traits, some by the context of the moment and are described elsewhere. Several have baseline values established by the Propensity to parameters.

Activity Threshold 237 is the minimum percentage of full-scale that a neuron must fire fore it is considered a candidate for inclusion in short-term memory.

Base Decision Threshold 250 is a personality-based starting basis for the decision threshold. Long-term training and learning experience can raise or lower the base value.

Correlating Facts 235 is true if the correlator portion of the analyzer is presently correlating facts, usually in support of an analyzer decision.

Hottest Node 236 points to the hottest-firing neuron in the context pool (short-term memory). The analyzer uses it for scaling decision thresholds.

Importance for Action 215 is the relative importance of making a decision. It is initially based on the propensity for importance of action, and can be scaled up and/or down by the analyzer as the result of recent decisions.

Need for Completeness 260 indicates the relative need for complete (and quality) facts, prior to making a decision. Incomplete facts will cause the Conjector to make suitable guesses, but the resulting 'facts' will be of lower quality.

Urgency for Action 216 represents the urgency (not the importance) of making a decision. Higher levels of urgency make lower quality of information (and decisions) acceptable.

Example Temperament-Based Propensity Parameters. A typical set of basic brain Parameters which indicate various propensities based upon temperament are given in Table 2, including representative contribution ratios (given as a percentage). This set of values is by no means complete and is given for the sake of description of the mechanisms of this disclosure. Other Temperament Parameters may be identified and included in this list, without altering the methods and claims of the present disclosure.

The specific percentages given in Table 2 are representative and typical values used, but are subject to 'tweaking' to improve the accuracy of the psychological model. Other values may be used in the actual implementation. Further, the list is representative and is not complete, but serves to demonstrate the system of the present disclosure.

It has been observed (and incorporated into Table 2) that, generally, many of these parameters reflect traits shared primarily by two of the temperaments, with one of the two being greater. That same parameter may also be shared minimally by the remaining two temperaments.

TABLE 2

Examples of Temperament Parameters

| | Parameter | Choleric | Melancholy | Sanguine | Phlegmatic |
|---|---|---|---|---|---|
| 210 | Propensity for Amusement | 10 | 35 | 35 | 20 |
| 211 | Propensity for Completeness | 20 | 35 | 10 | 35 |
| 212 | Propensity for Determination | 35 | 20 | 10 | 35 |
| 213 | Propensity for Enjoyment | 10 | 25 | 40 | 25 |
| 214 | Propensity for Fun | 10 | 20 | 55 | 15 |
| 215 | Propensity for Importance of Action | 50 | 10 | 35 | 5 |
| 216 | Propensity for Urgency of Action | 35 | 12 | 50 | 3 |
| 217 | Propensity for Patience | 15 | 35 | 5 | 45 |
| 218 | Propensity for Rhythm Influence | 10 | 15 | 60 | 15 |
| 219 | Propensity for Stability | 10 | 25 | 5 | 60 |
| 220 | Propensity to Analyze | 10 | 60 | 5 | 25 |
| 221 | Propensity to Care-Take | 5 | 10 | 30 | 55 |
| 222 | Propensity to Decide Quickly | 50 | 15 | 30 | 5 |
| 223 | Propensity to Follow a Plan | 10 | 25 | 5 | 60 |
| 224 | Propensity to Plan | 50 | 35 | 10 | 5 |
| 225 | Propensity to Procrastinate | 5 | 15 | 30 | 50 |
| 226 | Propensity to Second-Guess | 5 | 60 | 10 | 25 |
| 227 | Propensity for Stability of Action | 10 | 25 | 5 | 60 |
| 228 | Propensity to Rest Hands on Hips or in Pockets | 25 | 60 | 5 | 10 |

The system of the present disclosure presumes the use of a node that defines the desired underlying temperament, and additional nodes that define the desired percentages of the four temperaments. Table 2 is a chart of the selected typical tendencies for each of the temperaments, with each numeric value giving the approximate likelihood of the given trait to be demonstrated by the four temperaments, as a percentage.

The percentages given are by way of example, although they may approximate realistic values. The altering of these values by no means alters the means and methods of the present disclosure, and they may be adjusted to better approximate temperament traits. The list is by no means complete and is given as a set of representative parameters for sake of example.

In many, but not all, cases, the overall impact of a temperament is given by the product of the temperament's percentage, as pre-selected to produce the desired personality, and the percentage of likelihood given for each propensity from Table 2. This is demonstrated in FIGS. 4 and 5. These may be augmented by additional variations due to the Gender 201 parameter, accounting for differences in response by male or female gender.

Detail of Some Temperament-Based Propensity Parameters. The samplings of parameters in Table 2 are described below, by way of example of how such parameters are specified and applied. The described settings and applications of these parameters are necessarily subjective, and the relative weightings of these and all other parameters described in this document are approximate and exemplary. One skilled in the art will realize that they may be altered or adjusted without altering the means of the system of the present disclosure.

The Propensity for Amusement 210 is the tendency to be amused. The higher values lower the threshold of what is found to be amusing, triggering amusement sooner. The triggering of amusement may be reflected in the appropriate facial expressions, as provided for in the underlying brain model and skeletal mechanics, if any.

The Propensity for Completeness 211 is a measure of the personality's tendency to need complete facts before making a decision, and is based solely on temperament selection. It is naturally highest for the Melancholy and naturally lowest for the Sanguine or Choleric. While it is normally not altered, the underlying brain model (analyzer) can raise or lower this parameter based upon training or learning.

The Propensity for Determination 212 is the tendency for the brain emulation to be determined, and sets the baseline value for the sense of determination. Over time, it can be permanently altered by achievement (or failure to achieve) targets or goals.

The Propensity for Fun 214 defines the tendency of the temperament to make decisions based on the sense of feel-good. It is temperament dependent, tends to be highest for the Sanguine, and heavily influences the impact of Rhythm Influence.

The Propensity for Importance of Action 215 is a measure of the temperament's tendency to find action important, whether or not all the facts needed for decision are available and with high confidence. It is naturally highest for the Choleric and naturally lowest for the Melancholy and Phlegmatic. While it is normally not altered, the underlying brain emulation can raise or lower this parameter based upon training or learning.

The Propensity for Urgency of Action 216 is a measure of the personality's tendency to find action important, at the expense of strong consideration or analysis of the facts. It is naturally highest for the Sanguine and naturally lowest for the Phlegmatic. While it is normally not altered, the underlying brain emulation can raise or lower this parameter based upon training or learning.

The Propensity for Patience 217 is a measure of the overall tendency for patience. The level is normally high for a Phlegmatic and low for a Sanguine, but is also significantly affected by (long term) experience history. Growth in this trait parameter is very slow and is an iterative process. High levels of Patience 217 can suppress early termination of action, when faced with repeated failure to meet short- or long-term goals.

The Propensity for Rhythm Influence 218 is a temperament-dependent parameter, and may be altered up- or downward by hyperactivity. It controls the relative effect of rhythm on the decision process. Its baseline value is relatively higher for the Sanguine.

The Propensity for Stability 219 is a temperament-dependent parameter that defines the tendency towards stability. When the value is high, decisions will tend to be made that lead to no net change, in the sense of foot-dragging. It also implies a tendency to procrastinate, and is a strength (or weakness) of the Phlegmatic personality. High levels of Stability 219 lead to strong loyalty towards the context-dependent authority.

The Propensity to Analyze 220 is determined by temperament and is not affected by other properties, except by external command. Even then, its effect is short term and rapidly trends back to the base tendency. When very high, there is a marked tendency to analyze and correlate facts before making decisions, and the confidence-based decision thresholds based on the outcome are normally raised.

The Propensity to Care-Take 221 is a temperament-dependent parameter, tending highest in the Phlegmatic and Sanguine. It increases the interest in acquiring people-related facts for short-term memory. The impact of this parameter is established, for example, by altering the parameters of the Clutter Filter for the context pool or short term memory.

The Propensity to Decide 222 is a parameter that is highest for the Choleric and Sanguine temperaments, and influences (increases) the willingness to make decisions with a minimum of facts. For the Choleric, decisions subsequently proven inferior may be altered, while for the Sanguine, the results tend to be ignored. Parameter 222 also increases the tendency to revise decisions as higher-quality facts are available, and decreases the stability in decisions and the tendency to foot-drag.

The Propensity to Follow the Plan 223 is the (current) level of tendency to follow a plan. Its core value comes from personality traits, but is altered by such variables as stress, urgency, and external pressure. When pressure is high, as per Trauma parameter 230, there is increased tendency to ignore the plan and to revert to personality profile-based responses. This is accomplished in a manner such as demonstrated, for example, in FIG. 5.

The Propensity to Plan 224 is a measure of the tendency and desire to work out a plan prior to a project or task, and is a function of the temperament profile. If Propensity 34 is high, work on the task will be suspended until a plan of steps in the task is worked out. The propensity to plan does not imply a propensity to follow the plan, per 223.

The Propensity to Procrastinate 225 is a measure of the tendency to procrastinate, deferring decisions and action. The primary value derives from the temperament per Table 2, and is then a fixed parameter but which may be gradually altered by experience or training. While procrastination is largely a characteristic of the Phlegmatic, it also occurs in the Melancholy decision-making process, in the absence of complete facts, and is normally very low for the Choleric.

The Propensity to Second-Guess 226 is a measure of the tendency to reevaluate decisions, even quality decisions, and possibly to evaluate them yet again. Temperament-dependent as shown in Table 2, it is highest in the Melancholy and typically lowest in the Choleric.

The Propensity to Stability of Action 227 is a measure of the tendency to maintain the status quo. Largely a Phlegmatic trait, it influences (increases) the tendency to foot-drag, and is implemented by a decreased willingness to alter plans. It may be connected to the underlying brain emulation or model as a part of the clutter or interest filter at the input of the context pool, short term memory or analyzer, suppressing new plans or suggestions that abort existing or active plans.

Propensity to Rest Hands on Hips 228 is a largely Melancholy trait whose more positive values increases the tendency of any attached mechanical skeleton to find a resting place for its hands, primarily on the hips or in the pockets. This parameter provides a control value to the underlying brain emulation or model, which itself is responsible for the motor skill issues that carry out this tendency. That emulation or model actually determines whether or not this tendency is carried out.

Again, parameters in Table 2 are directly controlled by one or more of the four underlying temperament selection parameters. They are scaled by percentages such as those also given by example in Table 2. They are then distributed by the brain model to the appropriate control points, filters and selectors within the underlying brain emulation or model.

Inclusion of Parameter Influence. Throughout the brain emulation, there are many places at which a parameter may or may-not influence the outcome of a decision. The likelihood of the parameter contributing to the decision in some cases is often statistically based. One method of accomplishing this is shown in FIG. 3. A random number between 0 and 100% is generated by 421 and is compared by 422 against the parameter in question. If the parameter value exceeds the sum of a base threshold parameter 423 and a random number, inclusion is enable.

This type of logic is frequently used in the clutter filter discussed herein below.

Derived Brain Parameters. Many parameters derive from the basic Temperament Parameters of Table 2. These values may be a combination of temperament parameters, but as adjusted for learning, training, experience and present conditions. As with other brain nodes and parameters, most of these are expressed in a range of 0 . . . 100%, in units suitable to the technology of implementation.

A typical set of these derived parameters is given in Table 3. Each of these has an additional (signed) value to be added to it which is further adjusted on the basis of learning or training. The list is by no means complete, and is given for the sake of description of the mechanisms of this disclosure. Many of these relate to matters of emotion, its measure and expression. These parameters, as with all parameters, may be monitored externally to measure the emotional state of the emulated brain.

The current derived parameter values are distributed to the appropriate control points, filters and selectors within the brain emulation or model. In some cases, they control decision or stability thresholds, or establish the statistical settings, such as per 42 of FIG. 3, for current-interest filters in the emulated brain, and to other such brain emulation functions. The composite impact of these temperament and temperament-derived parameters determine the composite personality of the emulated brain.

The Base Decision Threshold parameter 250 is the starting basis for many decisions. It is the typical starting decision threshold, and is a measure of confidence or information completeness that must be obtained before a decision will be made. The threshold is given as a percentage, 0 . . . 100%, whose application depends upon the types of decisions being made. In some places it is used as an absolute threshold, or may specify a figure of confidence in the present facts, a figure that must be exceeded before a decision may be made.

The Concentration Ability parameter 251 is a measure of the ability to concentrate. A more positive value raises the threshold of attention to outside distractions, those unrelated to the issues in short term (or current context) memory in the underlying brain model or emulation. It is used by both the analyzer 30 and the clutter filter 40.

Docility 252 is a measure of the overall propensity for stability during external emotional pressure. It contains a long-term filter that decays back to the base value. Positive Docility 252 greatly increases the threshold of attention to emotional trigger events. Docility 252 can be altered over moderate periods of time, but tends to return to its temperament-defined static value. When this value falls lower than its average setting, there is an increasing tendency to ignore learned responses and to revert to personality profile-based responses.

Hyperactivity 253 is a measure of current levels of hyperactivity, as would be normally defined by someone skilled in the art. It is established by a programmable value and subse-

TABLE 3

Examples of Derived Brain Parameters

| | | Decay Targets | | |
|---|---|---|---|---|
| | Derived Parameter | Choleric | Melancholy | Sanguine | Phlegmatic |
| 250 | Base Decision Threshold | 10 | 45 | 5 | 40 |
| 251 | Concentration Ability | 10 | 60 | 5 | 25 |
| 252 | Docility | 5 | 25 | 10 | 60 |
| 253 | Hyperactivity | 25 | 10 | 60 | 5 |
| 255 | Filter Organizational Detail | 5 | 25 | 10 | 60 |
| 256 | Filter People Interest | 60 | 25 | 5 | 10 |
| 258 | Filter Relational Detail | 10 | 60 | 5 | 25 |
| 259 | Filter Technical Detail | 45 | 5 | 40 | 10 |
| 260 | Need for Completeness | 10 | 40 | 5 | 45 |
| 261 | Patience With Detail | 5 | 60 | 10 | 25 |
| 262 | Procrastination Level | 5 | 25 | 10 | 60 |

These parameters may be derived from temperament, context, environmental and current-condition parameters, for example, although other means will become obvious during this discussion. The parameters of Table 3 are exemplary. Most parameters in this table decay over time to the values shown at the right. These decay targets are nominal and may be altered through preemptive training. They derive from temperament percentages in a similar manner to Table 2. Artisans of ordinary skill will appreciate that the list is by no means exhaustive or complete, and others will also become obvious throughout this disclosure.

quently augmented by temperament percentages. Hyperactivity is also influenced by Docility 252 and current emotional stress. These sources are the primary determiners for the base value of hyperactivity, but long-term training or experience can alter the value. Choleric and Sanguine temperaments have relatively higher values, while Melancholy and Phlegmatic values are quite low.

The impact of Hyperactivity 253 is implemented, for example, by introduction of (typically negative) random variations in the magnitude of selected decision thresholds. It also alters the time constants of task-step performance and present rhythm parameters, with additional ultimate impact upon the performance of motor tasks.

Filter Organizational Detail 255 specifies the filtering of organizational detail from incoming information, context pool or short-term memory for the brain emulation. A value below 100% removes the greatest percentage of detail.

Filter Human Interest 256 specifies the filtering of human-interest data from the incoming information, context pool or short-term memory in the emulated brain. 100% removes most human-interest information. The value will be highest for Choleric models and lowest for Sanguine temperaments.

Filter Relational Detail 258 specifies the filtering of detail about inter-relationships between facts from the incoming information, context pool or short-term memory. 100% removes most detail. The value is highest for Phlegmatic and Sanguine models and lowest for the Melancholy models. Higher levels inhibit the correlation of distant facts that are nonetheless related. Lower levels also encourage the analyzer 30 to spawn events to event memory 14. This has the effect of iteratively revisiting the same information to analyze short-term memory for better correlation of data.

Filter Technical Detail 259 specifies the filtering of technical detail from the incoming information, context pool or short-term memory for the brain emulation. 100% removes most detail. The value is highest for Choleric and Sanguine models, and lowest for Melancholy models.

The Need for Completeness parameter 260 establishes the required level of completeness of information before making a decision. A higher value of completeness increases the likelihood of deferring a decision until all the facts are available, sometimes stymieing or stalling a decision. Other parameters related to importance and urgency can alter this parameter. The need for completeness can be altered by a decision of the analyzer 30, and upon external command to the brain emulation, such as through 93.

As the context pool (short-term memory) shrinks over time because of rest, the need 260 drifts backwards to the value set by the propensity for completeness. The need also reverts to the propensity value after a decision has been made. 100% implies the highest need for completeness. It is highest for Melancholy and lowest for Choleric and Sanguine models.

Patience With Detail 261 is the present level of patience. Its baseline value derives from the propensity for patience. It is affected by present conditions and can be commanded to rise. It largely alters decision thresholds and values near 100% imply comfort with detail. The value is dynamic and tends highest for the Melancholy and lowest for Sanguine and Choleric.

Procrastination Level 262 is a measure of the present level of procrastination. Its base value is set by the propensity to procrastinate, is increased by uncertainty, and decreased by impatience. Procrastination defers decisions and postpones actions that are not otherwise inhibited by circumstances. Decision choices are implemented in a manner similar to 42 of FIG. 3. Higher values of this level postpone decisions, even in the presence of hard facts (high sense of certainty).

While procrastination is largely a characteristic of the Phlegmatic, it also occurs in the Melancholy decision-making process in the absence of complete facts. It is normally very low for the Choleric.

As noted, the parameters described in the preceding tables in no way constitute a complete set, which total in the hundreds. Selected parameters have been presented by way of illustrating the internal processes and considerations for the brain emulation of the present disclosure.

Implementation of the Brain Emulation. One implementation of the underlying functional model of the brain is diagrammed in FIG. 4. Three primary elements of the model are analyzer/correlator 30, the context pool memory 10, and the English semantic analyzer 50.

Throughout the descriptions, English is always used where the processing of external communications are involved, whether in complete sentences or in sentence fragments. Internally, the system is essentially language independent, except where linguistics, phonics, the spelling of words or the shape of letters used in the language are involved. For ease of initial implementation, English was used, but essentially identical processes can be applied to any human language of choice. The choice of language in no way limits the present disclosure. Indeed, the methods of the present disclosure can be applied to autonomously translate one human language to another.

Figure 4:
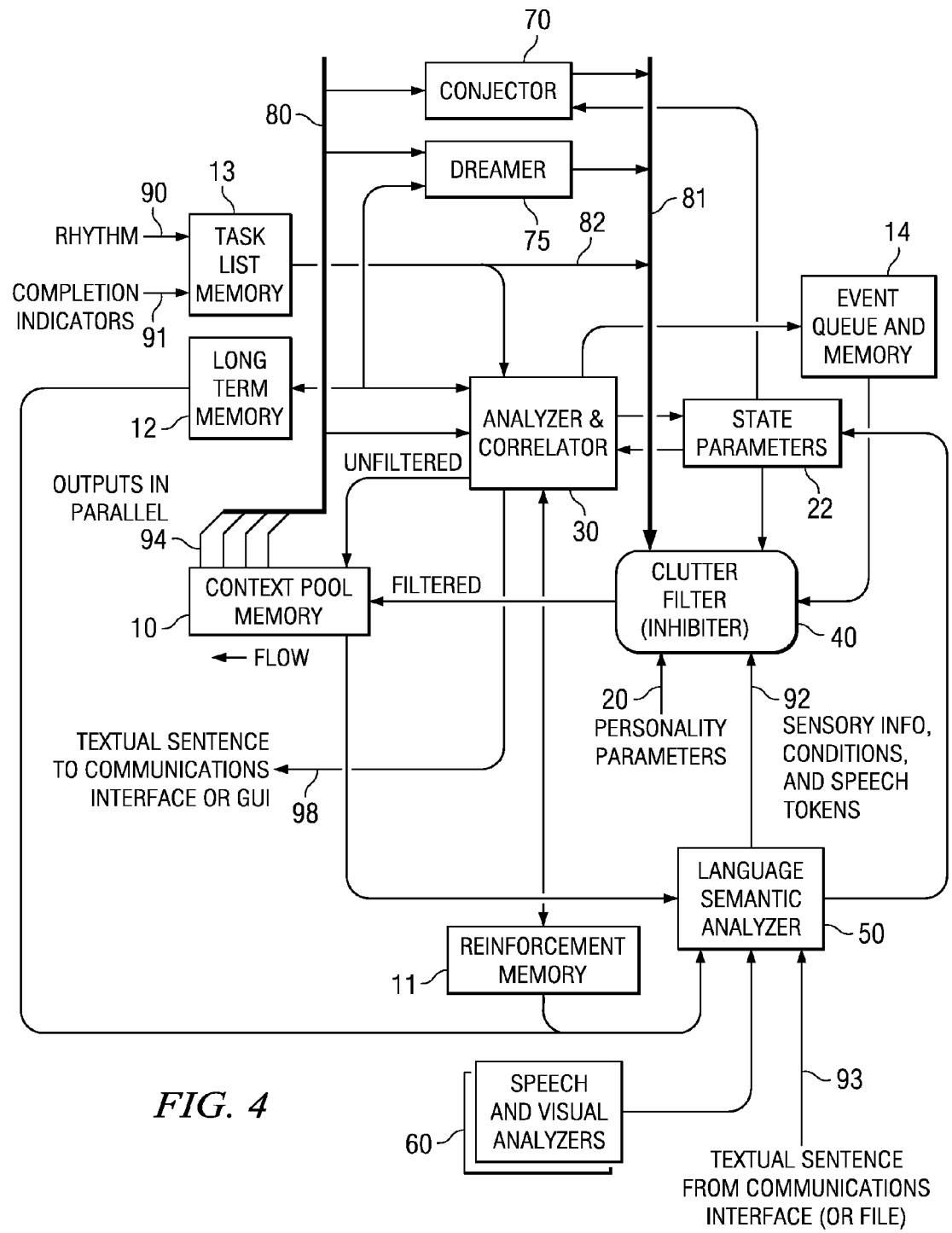
FIG. 4 illustrates Implementation of the Brain Emulation—Block diagram of brain emulation.

Referring to FIG. 4, various elements are controlled or modified by the state parameters previously discussed. In particular, the Clutter Filter 40 plays a central role in determining what types of information are actually considered in the brain. As are most other blocks in the figure, operation of the analyzer/correlator 30 is controlled or heavily influenced by personality state parameters 22. These same parameters may themselves be the results of analyzer 30, in many cases.

The flow of external information enters through the semantic analyzer 50. This distills content and intent from both English sentences and sentence fragments, and formats the distillate for inclusion into short-term memory 10.

Concept of the Neuron Used Here. This disclosure makes no attempt to replicate the biological neuron, axion and dendron, their arrangement or interconnections, or their redundancy. Rather, the term neuron in the present disclosure describes the means to remember a single fact or experience. As suggested bio-mimetically, the existence of a single fact is represented simplistically by a single neuron, while the implications of that fact are contained in the arrangement of interconnects between neurons.

In the biological neuron, there is an in-place 'firing' of a neuron when the associated fact is recognized. When, for example in a fox's brain, a specific neuron represents a common rabbit, the firing of a biological neuron implies recognition of that rabbit. The degree of firing (or output) represents the degree of certainty with which the rabbit is recognized.

There is no such equivalent in-place firing of the neuron in the emulation or brain model of this disclosure. In a digital implementation, the entire long-term memory 12 (where facts, relationships and experiences are stored) could be composed of read-only or slow flash memory, because recognition does not involve a change of the neuron's state in that memory.

As an alternative process used here, recognition takes place by the existence, recognition or correlation of data within the context pool memory 10. Any reference to a 'firing neuron' is to be construed as placement of a reference to (address-of) that neuron into context pool 10, along with a current firing level for it.

Neurons and Reference Indices. Every neuron records two types of information. The existence of a specific fact is implied by the fact that a neuron to represent that was defined at all. Experiences are implied by the relationships and linkages formed between neurons. Individual neurons are emulated by some fixed-size base information, and a variable number of relational connection records, as shown in FIG. 9. Relational conditions may be conditional, predicated upon the state of other neurons, and reference the ID indices of both their target neurons and condition triggers.

All neurons have a unique address, but it may be changed from time to time as memory is reorganized. Further, the very existence of some neurons is tentative. They may disappear unless reinforced over a period of time, and are located in the reinforcement memory 11. Because their precise locations are unstable, references of one neuron by another could be problematic. Further, the relative size of a neuron can vary widely, depending upon the inter-relationships and context with other neurons.

To handle these matters gracefully, a unique and unchanging index is allocated for each neuron created. References between neurons use this permanent index to inter-reference each other. If a neuron is deleted (in reinforcement memory 11), the index is reclaimed for later reuse. A specific bit within the index value indicates whether it refers to a normal permanent neuron or to the reinforcement memory 11. A fixed subset of the indices to the reinforcement memory 'tentative' neurons are also reserved and used to indicate information block type and format within the context pool 10.

Neurons in the reinforcement memory 11 that have been reinforced over a period of time are made permanent by the analyzer/correlator 30. The analyzer 30 then moves them to permanent memory 12 and alters all references to its index to show that it has been so moved. References within that neuron may themselves not survive the reinforcement process, and may be deleted during the transfer. Refer to Table 4 for data stored with the individual neuron.

Content of Neural Reference Structures. The analyzer/correlator 30 repeatedly scans context pool memory 10 for both unprocessed information and for activities suspended while awaiting occurrence of certain events or conditions. It also updates brain parameters both to keep them current and to check for relevant changes of substance.

Within the context pool 10, information is organized into variable-sized blocks, with all of it pre-classified or typed prior to submission. Some blocks contain inferred intent from sentences. Others contain commands, propositions, conjecture and other miscellaneous material. In its degenerate form, a 'block' may simply be a reference to a single neuron, and its firing level.

implied by the very existence within the context pool 10 of a reference to a neuron from long-term memory 12. Information (blocks) enter the context pool 10 serially, as it were, but are processed in parallel by the analyzer 30.

Referring the context pool 10 in FIG. 4, data flows from right to left, as it were. Unless reinforced, all neuron data in the pool gradually 'leaks away' or dies away during its travel, aging it. Should the context pool 10 fill, oldest (or left-most) data is simply lost, a case of information overload. Any data remaining in the context pool 10 that has aged without reinforcement can eventually decay to a zero-firing state, at which point it is simply removed from the pool.

Data may be placed into the context pool 10 from a number of sources, the initial one of which is often the semantic analyzer 50. Except for inputs from the analyzer 30, all context pool 10 information is filtered by a clutter filter 40, which largely keeps irrelevant or non-interesting data from reaching the context pool 10.

Data in the context pool 10 take the of form block-like structures of predefined format. A block arriving from the semantic analyzer 50, for example, contains the intent of a sentence, independent clause or sentence fragment. A one-word reply to a question is fully meaningful as such a fragment. Such a sentence block may contain references to a speaker, the person spoken to, and possibly, references to the person or object discussed. Many combinations of this and other sentence data are possible.

Blocks from analyzer 50 frequently include the purpose of the sentence, such as query (and expected type of answer), command, factual declarations, observations and the like. This type of data is discrete and readily identifiable by the semantic parse.

Other implied emotional information may be inferred from use of superlatives, exclamatories, and tone (if derived from an auditory analyzer 60). Auditory sources yield the speaker's nominal fundamental frequency and infer stress or emotional excitement by short or long-term pitch deviations accompanying spoken speech.

TABLE 4

Neuron Structural Content

| Neural Content | Description |
| --- | --- |
| Basic Information | Basic information may include references to explicit spellings (e.g., a walk-back index to the text-tree for the word), pronunciation exceptions, visual-object descriptors and the like. Certain flags and start-indices for lexical matters and the like are also included here. |
| Relational Linkages | The weighted and conditional influence of this neuron upon another is defined by relational linkages, of which there may be up to 1000 or more, for some neurons. Each new experience and relationship learned has a relational linkage created for it.<br>Initially, these relationships are created in the reinforcement memory, where they remain until later validated and moved to long-term memory (or are deleted). Relationals in reinforcement memory may refer to neurons in either memory, but those in long-term memory may refer only to other neurons in long-term memory.<br>The Analyzer tracks the allocation, aging, validation, and 'garbage-collection' processes, and these are discussed in detail elsewhere. |

Individual neurons are emulated by some fixed-size base information, and a variable number of relational connection records. The latter may be conditional, predicated upon the state of other neurons, and reference the ID indices of both their target and conditional neurons.

Context Pool Memory 10. The core of all emulation occurs in the context pool (short term) memory 10 and the analyzer/correlator 30. All information of immediate awareness to the emulator resides in that context pool 10. Neuron-like firing is The length of the context pool 10 is determined empirically by the application, but is nominally sufficient to handle a number of hours of intense study, or approximately a day of casual interaction. To put sizes into context, this represents roughly a megabyte of conventional digital storage, although selected size does not alter the means or methods of the present disclosure.

During sleep times (or emulated extended rest), the context pool 10 gradually drains, with neural firings gradually fading to zero. As neural references fade to zero, they are removed from the context pool, as suggested bio-mimetically.

New information may be introduced during sleep by the dreamer block 75. Dreamer-derived information created during deep sleep decays rapidly when awake, at rates different from normal context pool data decay. If the sleep time is insufficient, yet-active neural firings remain into the following wake cycle, and cycle; these are handled as previously described.

Language Syntax Analyzer 50. A language semantic analyzer 50 accepts communications in the natural language of implementation, English, for example. It breaks down sentences, clauses, and phrases to derive intent and purpose from the sentence. It uses the context of the current conversation or interaction by polling the analyzer 30, long-term memory 12 and reinforcement memory 11. Access to present context is obtained indirectly from the context pool via analyzer 30. Interpretation of language words is weighted by the presence of their associated neurons in the context pool, yielding context-accurate interpretations.

While language semantic analyzer 50 could be hard-coded in logic, it is beneficial for many applications that it be implemented as an embedded processor. This method is not required for the purposes of this disclosure, but is a convenience for the parse and interpretation of languages other than the initial design language.

Because all humans are essentially the same regardless of their national language and its grammar or semantics, the parameters described herein remain constant, while language semantic analyzer 50 language description script would change.

For convenience, statements emitted by analyzer 30 through interface 98 are created in analyzer 30. However, this function could be separated into a separate unit for convenience in altering the language of choice from English.

For a given language, semantic analyzer 50 recognizes a set of words that are an essentially invariant part of the language, such as with and for, in English. These play a substantial role in defining the grammar for the language. Nouns, verbs and adjectives readily change with the ages, but the fundamental structural words that make up the underlying grammar rarely do.

In addition to these invariant 'grammar' words, the structure of sentences, clauses and phrases define the remainder of the grammar. Analyzer 50 uses this overall grammar to interpret the intent of the communications.

Computer languages (non-natural languages) are often parsed by separate lexical and grammar parsers, using such commercial tools as Lex and Yacc. These were deemed burdensome and unwieldy for parses within the system of the present disclosure. For natural languages, an alternative parser (Lingua, a commercial parser and not the subject of this disclosure) was created. Using Lingua, a highly complete description of English grammar was defined and serves as the basis for language semantic analyzer 50. The intellectual property contained therein is a definition of English grammar itself, although it is also not the subject of this disclosure.

In the prior art, custom analyzers using large corpuses or dictionaries of words have also been employed for the parsing of English text. Unlike them, semantic analyzer 50 makes use of context-dependent information for a more accurate rendering of intent from the text.

Semantic analyzer 50 takes in natural language sentences, clauses, phrases and words, and emits blocks of decoded neuron references and inferred intent. In large measure, the non-changing and fundamental grammar words are discarded after they have served their purpose in the parsing. Similarly, structural constructs within sentences are often discarded after their implications have been gleaned. Finally, pronoun references such as he and it are replaced by references to neurons representing the resolution targets, such as "David Hempstead" or "rabbit".

The semantic analyzer indirectly references both long term 12 and the "21-day" reinforcement memory 11, and can extract relational information from either, to determine meaning and intent of specific words. It places greater weight on words whose neural references are already firing within the context pool 10.

The definitions of English (or other natural language) grammar are contained in a definition file in a variant of the Baccus-Nauer Format (BNF). Refer to FIG. 5 for an example fragment of such a definition. The example was implemented using the Lingua compiler, a commercial product of Neuric Technologies. An example of diagnostic results obtained from parsing the sentence, "The table failed." is given in FIG. 6, showing the iterative nature of the parser used in the commercial Lingua product.

It can readily be seen by one skilled in the art that the language analyzer 50 can be implemented variously without detracting from its placement and efficacy in the system of the present disclosure.

Sentence Blocks. For sentence processing, context pool 10 data may be blocked into inferred facts and data. Preprocessing in semantic analyzer 50 will have already converted sentence fragments into complete sentences, or will have flagged the fragments for expansion by the Conjector.

Each sentence block is usually a complete sentence, with subject and predicate. Implied you subjects have had the subject resolved and appropriate neuron reference substituted. The implied It is prefix, that turns a noun-clause (e.g., an answer to a question) into a full sentence, would also have been added as needed. All sentence blocks are standardized in form, with inferred sentence information reordered into that form.

The blocks are of variable length, with flags that indicate the sentence data being stored. Some of this information is gleaned from state parameters. The sentence type dictates which items are optional. Types include Declaration, Question, Exclamation, Observation, Accusation, Answer to Query, and yet others. Other sentence data may include the following (and other) information:

Subject
Subject Person: (1st, 2nd or 3rd)
Subject Count: (Singular, Plural)
Subject Gender: (Male, Female, Object)
Action or Step to Take
Verb
Object (including Person, Count, Gender)
Target of Action (including Person, Count, Gender)

All noun-like items also contain the person, count, and gender flags. These sentence blocks are interpreted by the analyzer/correlator 30 and the conjector 70 as commands for interpretation. Some of these are described in the discussion about Table 7 contents.

The Sentence Recognition Process. Regardless of whether the sentence was obtained through written text or from auditory speech, recognition and understanding of sentence content is roughly the same. The greatest differences are the additional cross-checks, validations, and filters imposed on spoken speech. For extracting intent from sentences, a general communications triad is defined: The speaker, the person/object spoken to (e.g., the receiver of commands), and the person, object or subject spoken of. Most of this information can be inferred from sentence content, from the present context pool 10, and from state parameters 20 and 23.

The basic process is:

1. Parse—Parse the sentence using language grammar rules, such as in FIG. 5.
2. Extract the Triad Corners—Identify shifts in the communications triad, if any. For identified shifts, advise correlator 30 by suitable command notifier in the context pool 10.
3. Extract any Qualifiers—Compile qualifier clauses. If a definitive sentence, store the compilation, but otherwise evaluate the clause's probability to a single neuron, extracting both neuron references and data sufficient to create additional relational connections 1252.
4. Extract Structural Elements—Extract key structural elements, discarding semantic information. Store the data in appropriate blocks or neuron references for use by the correlators 30 and 75.
5. Compile Definitives—Compile any definitive sentences into relational and qualifier constituents, storing the relational associations (if any) with the relevant fact neurons. This is done indirectly by submitting an appropriate directive to the context pool 10.

The above basic process is exemplary of a portion of the typical activity for parsing a sentence and generating information or command blocks for inclusion in the context pool 10.

Clutter Filter 40. Clutter filter 40 acts to limit entry of certain types of information into context pool 10. Information entering the context pool 10 must pass through the clutter filter 40, except for that emitted by analyzer 30. The purpose of the filter 40 is to remove extraneous neurons, such as language or grammatical tokens and non-significant gesture information. The clutter filter 40 follows preset heuristics which may either be fixed or adaptable.

The result of the filter is to maximize the consideration of relevant information and to minimize 'mental clutter' and things of little interest to the personality being modeled. Choleric temperaments, for example, do not thrive on human-interest information as the Sanguine does. Data so identified may be removed in keeping with current parameter conditions. This may occur during the course of conversational exchange, during which time semantic analyzer 50 or other sources flags the data on the basis of the topic of discussion.

The clutter filter is a substantial contributor to the emulation differences in right-brained and left-brained activity, second in this only to the work of analyzer/correlator 30.

During interaction with the outside world, a large number of neurons are referenced from memory and submitted to the context pool 10 for analysis, correlation, conjecture and dreaming. The filter considers the type and groupings of neurons being submitted, as well as some of the inhibitor factors, and may opt to discard them instead of forwarding them to the context pool 10. During normal (non-sleep) activity, outputs from the dreamer 75 are given very low priority, unless overall levels of neural firings in the context pool 10 are very low.

Neural phrase results from the analyzer 30 always enter short-term memory directly, bypassing the clutter filter 40. By the nature, analyzer/correlator 30 governs overall thought (and memory) processes and normally does not produce clutter.

The filter also prioritizes incoming information. Entire contents of answers to questions are also likely to be passed through, whereas the same material might not ordinarily be.

The primary basis of determination of what constitutes 'clutter' is the personality parameters 20, a subset of the state parameters 22. (In FIG. 4, they are shown separately from other parameters for emphasis and clarity, but are essentially are the same.) Logic such as that of FIG. 3 demonstrates one means by which the clutter determination may be made. It will be obvious to one skilled in the art that the clutter filter 40 as described herein can be augmented with additional rules and heuristics without altering the basic disclosures of the present disclosure.

Analyzer/Correlator 30. The analyzer/correlator 30 is the heart of the emulated brain, and is the primary center of activity for thought processes. It is also the primary means for updating of all dynamic brain parameters and is the only means for initiating permanent storage of information.

Decisions are normally based upon 'solid' facts, information of high confidence or firings. Generally speaking, higher perceived quality of the source information yields higher quality decisions. In the absence of good information, analyzer 30 uses information from conjector 70, although results using the latter are also of lower quality.

Thought and decision processes are performed by the analyzer block, with supporting prompts and suggestions from conjector 70 and dreamer 75 blocks. The heart of the analyzer's work is done in context pool memory 10, such that all processes are performed within the context of the moment.

Entry of a neuron reference into the context pool memory 10 a sequence of events unique to the neuron and its associated relational (experiential) linkages, or 'relationals'. Detailed later, these often make use of the event queue memory 14 to handle the implications of their connections.

Initial Activity Upon Awakening. When awakened in the morning, the rested mind (that is, the context pool 10) is usually quite empty. Thoughts and cares of the past day are gone, or are so diminished as to not be readily recalled. Fragments of sentences, fleeting observations and incomplete or illogical ideas of the previous day have been purged, the mind uncluttered. This is the context upon awakening.

Daily activity in this brain emulation begins in a similar way. The initial tendency is to resort to routine, established lists of actions, usually by the timed fulfillment of events from the event queue 14. Activity can also be started by other external means in both human life and in this brain emulation. Table 5 lists some example ways that activity begins in the morning, but the list is of course by no means inclusive:

TABLE 5

Example Start-of-Day Activity Indicators

| Event | Activity Initiated |
| --- | --- |
| Hungry for Breakfast | For the human, some form of routine that is normally undertaken, even if only the process of waking up, getting dressed and eating breakfast. Such a simple process is still a learned list, equivalent to one stored in the task list memory 13, though it also may not be consciously present in the mind. If nothing else occurs during the initial state of fogginess, the physical body soon makes known its need for food, and that initiates a tentative routine. If the emulated brain is connected to a robotic skeleton or vehicle, an equivalent for hunger might be depletion of fuel or electrical charge. |

TABLE 5-continued

Example Start-of-Day Activity Indicators

| Event | Activity Initiated |
|---|---|
| Conversation or Telephone Call | Sometimes the day is begun by someone else who interrupts the sleep with a request for attention, asking a question. This is equivalent to wake-up via external communications 93, or through speech or visual analyzer 60. The sequence initiated by the conversation is a part of the thought processes. The sentence may be a command, a question or an observation. |
| Uncompleted List | Lists of things to be done at the close of the previous day are not always purged by sleep. They remain part of active context 10 of the brain. Carried into the next day with reduced clarity or importance, they are a basis for the first thoughts of the day. Timed or conditional items emitted to the event queue 14 may also be waiting. |

Any of the above conditions places blocks of neuron references that take the form of sentences, event-based commands and other information to be processed. One skilled in the art will recognize that the analyzer/correlator 30 can be implemented as hard-coded logic, a form of command interpreter, or as an embedded processor without altering the means of this disclosure.

Outcomes of Analyzer/Correlator 30 Activity. As a consequence of its operation, analyzer/correlator 30 may include any of the activities of Table 6. The list is indicative of the types of outcomes and is not all-inclusive, but may be extended for the convenience of implementation. One skilled in the art shall realize that this does not alter the means of the present disclosure.

Besides the items of Table 6, analyzer/correlator 30 maintains and updates numerous lists, such as present subjects of conversation or inquiry, the status of pending answers to questions issued, maintenance and completion status of motor skill activity, and the like. Its primary source of information and commands comes from the present contents of the context pool 10.

Context Pool Commands. Within context pool 10, information and facts are stored in the generic form as neuron references, neural indices. Both state parameters 22 and context pool 10 commands are encoded as dedicated lower values of neural indices. The commands are variable in length, with their index followed by length and supporting information.

TABLE 6

Outcomes of Analyzer Activity

| Action | Description |
|---|---|
| Fire a Neural Reference | In context pool 10, initiate (or increase) the firing of a neuron for each new reference to it. Multiple references in the context pool 10 to the same neuron thus increase its influence. |
| Reinforce Neural 'Keep' Count | Neurons in reinforcement memory 11 that have been freshly referenced are reinforced. Their time-weighted reference ('keep') count is maintained with the neuron in memory 11. |
| Decay 21-day References | Periodically (e.g., during sleep intervals) decay the 'keep' count for all neurons in the reinforcement memory 11, to enforce the need for reinforcement of learned information. |
| Create a Permanent Neuron | Neurons in reinforcement memory 11 that have satisfied their reference count level are made permanent by moving them to long-term memory 12, updating their references, and removing them from short term memory. |
| Initiate an Event | Certain conditions, particularly due to neuron relationals, and some types of sentences, cause events to be queued to the event memory 14. The queuing is normally for execution after specified delay, awaiting the meeting of the conditions pending. |
| Ask a Question | Based upon need for more information, ask a question, formatting and emitting it through interface 98. |
| Perform I/O or Motor Skills | Initiate appropriate motor skill lists or handle computer-like I/O related to the application. |
| Update a State Parameter | Update relevant state parameters 22 based upon changes in internal conditions created by analyzer 30. |
| Trigger Other Neural Blocks | Initiate action in other blocks such as the task list memory 13, to initiate motor-skill activity or to perform memorized steps. |
| Decayed-Neuron Removal | When firing value for a neural reference in context pool 10 has been decayed to zero, remove the reference from the context pool. |
| Neural Reference Aging | Periodically throughout the active day, neural references in context pool 10 are aged, reducing their influence. This aging is accelerated during periods of sleep. |
| Conjecture Clutter Removal | Commands or references created by the conjector 70 are correlated for relevance, and discarded for low relevance to the target subject(s). |
| Dream Clutter Removal | While awake, information and command fragments from dreamer 75 are rapidly decayed. During sleep periods, perceived accuracy of these items is increased and treated as ordinary and factual information, but motor-skill related commands are suppressed. |
| Expand Fragment | Command the conjector 70 to expand a sentence fragment into the closest equivalent full sentence. |

Many synthesized commands derive from the parsing of sentences by language analyzer 50. Sentences may be distilled into multiple commands, each complete with neural references. Implied subjects, verbs or objects are resolved with references to relevant neurons. For sentences with multiple subjects, verbs or objects, the sentence content is replicated, with one copy per item in the subject list, for example.

Some commands found in context pool 10 are given in Table 7. The list is exemplary and not exhaustive. One skilled in the art will realize that the list may be extended without altering the means of the system of the present disclosure.

TABLE 7

Example of Context Pool Commands

|     | Command | Remarks |
| --- | --- | --- |
|     | Initiate Motor Skill | From a command or a list item |
|     | Await Completion | Suspend topic activity, awaiting completion. |
|     | Await Factual Answer | Question was asked that expects factual information. |
|     | Await Affirmative Answer | Question was asked that expects a yes/no answer. |
|     | Seek Information | Ask a question to resolve ambiguity or missing information. |
|     | Correlate Answer | Process anticipated answer |
|     | Initiate Definition | From definitive sentence |
|     | Execute Command | From imperative sentence |
|     | Repeat Until Condition | Perform an iterative operation or analysis. |
|     | Note Declarative | Handle declarative sentence or observation, setting relevant expectations. |
|     | Note Exclamatory | Handle exclamatory sentence, updating relevant emotional states. |
|     | Update/Add Topic | Refresh list of topics and update relevance of the list items. |
|     | Update the Communications Triad | Update the list(s) of who is speaking (speaker), who is being spoken to (target) and the object(s) of conversation. |
|     | Note Accusation | Handle accusatory statements, updating emotional state and emitting conditional events to queue 14 to prep answers to implied questions. |
| 231 | Declarative | Command to handle state of being, remarks or commentary |
| 232 | Imperative | Command to self to do something |
| 233 | Definitive | Command to define something |
| 234 | Interrogative | Command to respond to a question |

For convenience, all data structures in the context pool 10 look like neuron references.

Execution commands are always flagged by their source, such as a speech or grammar analyzer, the Analyzer or Correlator 30, the Conjector 70, Dreamer 75 and so on. The Analyzer 30 later considers the source when applying the command during its thought or decision processes. Exemplary commands from semantic analyzer 50 are given below, these particular ones being based upon sentence types.

Declarative 231 is an instruction to consider a present condition about the subject. It may also be a part of an experience process, ultimately culminating in the creation of a neuron-to-neuron or neuron-to-state-parameter relationships. This command is usually created by the parsing of a sentence, but can also be created by thought processes within analyzer 30.

Declaratives may result in a remembered relationship, in time and with reaffirmation, and through conjector 70's action. That is, declaratives are 'taken with a grain of salt', and consider confidence in the source of the observation. They differ from the definitive 233 in that the latter is already presumed to be a source of facts, and only the reliability of (confidence in) the information needs to be confirmed before remembering it.

For example, "Four cats are sufficient to eliminate mice from large barns," is a declarative that proposes how many cats it takes to get the job done. Before analyzer 30 assumes the statement to be factual and remembers it, it will consider its confidence in the source of the remark, and whether or not the information is reaffirmed.

Imperative 232 instructs analyzer 30 to the brain emulation to do something, such as to consider a proposal, pay attention, recall something, or to conjecture an answer to an issue with insufficient information. It is a command for action of some type, directed towards the brain emulation.

A command such as 'Come here!' must be evaluated in the present context. It implies activation of a motor-skill list to begin physical motion, and targets the location of the speaker. The latter may not be in the context pool 10, but is maintained in a state parameter 22. In this case, analyzer 30 directs the motor skill via task list 13. It can then, for example, issue an await-on-completion event 142 and dismiss the command from memory. It will later receive a completion message (or a notation that it encountered a brick wall or other impediment to carrying out the instruction), closing the command.

Definitive 233 indicates definition of a fact (in reinforcement memory 11), and may include auxiliary conditional relational information. Example, "A cat is an animal with four paws, of which the front two are commonly called forepaws," is a compound statement. The statements share a common subject, and have separate definitive 233 ("A cat is an animal with four paws") and declarative 231 ("The front cat paws are commonly called forepaws") clauses. Semantic analyzer 50 separates the compound into separate commands for each clause.

Declarative 231 portion, "A cat is an animal with four paws," defines these neurons if they are not already known: Cat, Animal and Paws. Even if the meanings of Animal or Paws are unknown, they can still be remembered, and the suitable relationals later formed between them. These are all recorded in reinforcement memory 11, if not already there and not known in long-term memory 12.

If already in reinforcement memory 11, their existence is reaffirmed to encourage possible permanent recollection. If the veracity of the speaker is high, less time is required to reinforce the facts. If the system is in preemptive training mode, these are assumed to be pristine facts, perhaps from God, and are immediately and permanently remembered.

The declarative 231 portion, "The front (cat) paws are commonly called forepaws," also forms a definition, but must be reaffirmed to a greater degree than for the definitive clause. (Because parsing has already been performed, the explicit subject defined at the start of the sentence has already been associated with the trailing clause, too, by semantic analyzer 50.)

Because 'The' is present, the clause is declarative 231 rather than definitive 233. This is because the reference is to a specific cat, rather than to the generic cat animal. One skilled in the art is aware of these subtleties of English grammar, and how that grammar may be used to determine the intention and type of sentence.

Interrogative 234 poses questions and requests. These are normally injected into context pool 10 by the grammar semantic parser 50, but may also be queries from other sources. Many (but not all) questions are simply a declarative statement with a question indicated, and are often formed by a restructuring of a simple declarative sentence.

The parser 50 sorts questions into those seeking affirmation (yes/no) or seeking specific information, and presents them to the context memory 10 as declaratives 231 marked for validation or as an imperative 234 demanding an informative response. In either case, analyzer 30 only sees data constructs for the latter forms, and so marked as questions so that it can form its response to the question.

Other internal commands are also added for sake of convenience, analyzer 30 loosely taking on the form of a von Neumann processor, with the 'program' being the command stream from the English parser, or from other blocks.

In communicating with brain emulators that share common memory 12, their analyzer 30 can forward 'digested' command blocks directly to the context pool of this emulator. If communicating with the outside world via external interface 98, analyzer 30 reformats the command block into an English sentence for parsing there, and receives English back via interface 93.

Neurons and the Context Pool 10. Conditionals expect a specific neuron (or combination of neurons) to be fired. State parameters 20 and 22 are pseudo-neurons, and preexist all allocated neurons. They are treated as neurons, and are assigned the lowest index ID numbers, but have no relational (experiential) links created for them. The ID of every firing neuron (except for state parameters 20 and 22), along with some information specific to the neuron, is maintained in the context pool 10, including the degree of firing.

Aged neurons in context pool 10 that are no longer firing are eliminated from the pool memory, usually while 'sleeping'. Neurons that are firing but are not being reaffirmed or re-fired in the context pool 10 have no effect, other than to establish the context of the moment. For example, they may be the subject of a conditional test, or may alter the contextual meaning of a sentence being parsed.

Unidirectional Relationals. Where relationships are unidirectional, a relational attached to the 'causing' neuron issues an event, but only if the specified condition is true. For unidirectional relationships, A implies B, but B does not imply A. In either case, the relationships may be conditional, predicated on other neurons also firing. Referring to FIG. 10, a relational link 1253 is created within the neuron impacted by the relationship.

Bidirectional Relationals. Where relationships are bidirectional, neurons or state parameters at both ends of the relational will issue events. If any conditions specified are not met, no event is fired off. For bidirectional relationships, A implies B, and B implies A. In either case, the relationships may be conditional, predicated on other neurons also firing. Referring to FIG. 10, a relational link 1253 is created within both neurons in the relationship, each referring to the other.

Relationals that Emit Events. When a neuron initially fires (or is reaffirmed), analyzer 30 scans its list of attached relationals. They are organized as AND-connected lists optionally separated by OR markers. Consecutive relationals are evaluated until one of them fails or until an OR marker is encountered. If a relational fails, subsequent relationals are ignored to the next OR mark or end of the list.

On failure, encountering an OR marker resets the failure condition, the OR is ignored, and testing resumes at the relational just beyond the OR.

If the end-of-list is found first after a failure, no event is generated. Finding an OR (or finding an end-of-list, with all previous tests successful) implies that all AND-connected relational conditions were met, so an event is created. Conditional relationals may be flagged with a NOT, implying that the converse of the condition must be true for the relational to succeed.

Other Internal Lists. Analyzer/correlator 30 maintains other lists of information in short-term memory similar to that of the state parameters 22, which are also treated as blocks of predefined neurons. These have been discussed elsewhere within the present disclosure and include list such as the following:

Topics of Discussion
Motor Activities in Process
Events whose completion is being awaited
Multiple objects to apply sentence to
Multiple verbs applying to the sentence One skilled in the art will recognize that the above list is by no means inclusive, and the logical or physical placement of the above lists may be altered, or the list added to, without changing the methods of the present disclosure.

Walking the Neural Connection. When a new command is added to the context pool 10, it usually contains a reference to a neuron that represents a fact or condition of existence. Usually it will reference more than one. Each such reference either brings the neuron 'into the pool' also, or reaffirms neurons already in the context pool 10.

Simply referencing a neuron causes analyzer 30 to bring it into the context pool 10, even if not firing very strongly. Some command blocks, such as from a definitive clause, greatly increase the level of firing. Multiple references to the same neuron over relatively short duration, increases the firing level, also, up to the 100% level.

Recognition of a person's face, for example, brings the ID of that person into the context pool 10, firing the relevant neuron in accordance with the degree of confidence in the recognition. (e.g., "That might be Jackie, over there.") Shortly thereafter, hearing the same person's voice increases the confidence of the identification. The firing of that person's neuron (ID) may therefore increase from perhaps 65% to 95%. Ongoing interaction with that person keeps his ID alive in the context pool 10.

Correlation of Relational Information. When in-pool neurons fire, other neurons may be implied by known relationships. For example, Green and Animal might imply a parrot if either Cage or South America is presently in the context pool 10. Otherwise, if Swamp is firing, Alligator may fire. Analyzer/correlator 30 gathers triggered references into context pool 10, updating neuron firings in a manner specified by the scaled connection weight.

For the case of such relationally-initiated firings, firing level is controlled by the values of the referencing neurons (e.g, Green, Animal or Swamp), and the weight given in the relational connections. That is, the Alligator neuron will fire weakly if Florida (which might imply Swamp) is firing weakly, although nothing else directly activated Swamp. Analyzer 30 effectively acts as a correlator by walking through the connections of all firing neurons, awakening other neurons as long as firings are not suppressed by conditional relationships.

Referring to FIG. 7, if Dog 121 and Excitement 122 are both firing (e.g., information inferred from a parsed sentence), references to them are placed into context pool 10. The relationships of FIG. 7 would set expectations for a dog to bark via neuron 123. Weights 124, which may differ from each other, are multiplied by the firing levels of 121 and 122, respectively. If the resultant firings both exceed some minimum decision threshold, the AND operation 125 causes the generic Dog-Bark neuron 123 to fire. A reference to neuron 123 would then be inserted in the context pool 10, possibly initiating a motor skill event to cause a bark, for example. It should be obvious to one skilled in the art that many variations of FIG. 7 are possible without altering the means of this disclosure.

Again, the analyzer 30 causes any neuron not reaffirmed or re-fired over time to gradually decrease its firing level. That neuron is then ejected from the context pool 10 if it goes to zero. It is also dumped from memory if it is still firing but has been there a long time and the context pool 10 is full.

The Long-Term 12 and Reinforcement Memories 11. Reinforcement memory is a way-point in the process of learning and remembering things. All new information and relationships are established in reinforcement memory 11, and it serves as a filter for items important enough for later recall. Analyzer 30 handles this process.

The reinforcement memory 11 is a means of eliminating non-essential facts, relationships and incidents otherwise uselessly cluttering permanent memory. The ultimate growth of long-term memory 12 is then moderated, keeping the mental processes and memory more efficient.

Much of the information and experience we encounter is incidental and not worth recollection. For example, paper blowing in the wind is recognized for what it is, but the incident is too insignificant to remember, unless perhaps the context is the distribution of propaganda leaflets. The latter might be worthwhile musing over. Reinforcement memory 11 is the interim repository for this information, while its worth is reaffirmed or forgotten. Analyzer 30 permanently moves validated facts and relationships to long-term memory 11, as discussed elsewhere.

The long-term memory 12 and the reinforcement memory 11 share a more or less common format. Allocation of neurons and relationals are handled entirely by analyzer 30, and policies that govern permanent retention reside there.

Information is validated by analyzer 30 as 'memorable' when it was repeatedly referenced over a 21-day period, or repeatedly during exercise of strong emotion or trauma. So validated, the analyzer 30 moves it to long-term memory 12. Referring to FIG. 8, associated relationals are also moved from reinforcement memory 11 to the long-term side. Both memories consist of the following items:
  An ID Table 126
  A Table of Neurons 125; and
  Other emulator-specific tables "Other" tables include specialty tables associated with a single neuron and used for recall of motor-skill task lists, aural or visual artifacts or objects, and the like. Their format is specific to the emulator type (e.g., visual, speech or motor-skill) that produces them, but they follow the standard processing and correlation rules for ordinary neurons.

No neuron is special of itself. Rather, it takes meaning and worth from position and interconnection with other neurons. For example, a Laptop neuron is meaningless of itself (except for spelling, pronunciation and visual shape), but has importance because of its relationships to Computer, Portable, and Convenient.

Handling of Idioms for any Natural Language: One skilled in the art is familiar with the various methods of parsing of natural language sentences, and many tools or methods are available to do that. For the convenience of description, such a system is assumed to exist for 'parsing', the breaking of sentences into their constituent parts. Even the English language is used here by way of example, one skilled in the art will immediately realize that the same general techniques of parsing and the handling of idioms as described here can also be applied to almost any other human language.

It is a generally accepted technique to have a (perhaps proprietary) description of English, frequently one of a top-down nature that first describes sentences, then their subject, predicate, object and indirect object, and so on. For example, one could describe a sentence using a formalized grammar in the following manner:
  Sentence=Subject Predicate
  Subject=Noun or Noun_Equivalent
  Predicate=Transitive_Verb Direct_Object, or, Intransitive_Verb Indirect_Object, or, Intransitive verb.

Of course, this system permits the creator of a parser to "drill down" to any desired level of detail, and can be extended as desired to accommodate all parts of speech. It is generally accepted that such formalized description of grammar is then automatically translated into some computer language. Example commercial tools that do this include Lingua, Yacc and Lex. Such tools then create computer code (for example, in C++) for a program that parses a sentence.

It is assumed that one neuron is preferably allocated to each word in English, at least for words presently recognized by the underlying parser. Such a neuron is merely a place-holder and has no intrinsic value of itself, but its importance is its connection to other such neurons. The system of interconnected relationships between the neurons is a fundamental part of what constitutes memory for the artificial human.

For example, the word muddy can be construed as any of, "to contain mud", "to be mud-covered", "mud-like", "unclear" or other concepts. In actuality, it is not necessary to have multiple neurons for "mud", "muddy" or "muddily". Rather, it is sufficient to have only one neuron, for mud, and create associations relationships/associations between neurons, for concepts such as muddy boots. In this case, it a conditional link could be created between mud and boot neurons. In that manner, simple reference to the term boot can evoke the idea of mud. Conditional relationships can also be created between boot and rain, boot and snow, and so on.

Idioms can be handled in a similar manner. A single neuron can be assigned to represent a multi-word idiom, and associations can be then drawn between that "idiom" neuron and other neurons whose meaning (and relationships) are already established. For example, off the wall can be stored as a single neuron (with the text, "off the wall" attached to it), and that neuron can then be conditionally linked to strange, unusual and offbeat neurons.

One skilled in the art will realize that such associations can be unidirectional or bi-directional, and may be conditional or unconditional. For example, mud can be associated with boot such that reference to boot implies mud, but such that mud need not imply boot. As described herein, multiple associations may be drawn between a neuron and one or many other neurons. Each specific association is uni- or bi-directional and is predicated on the firing of some other neuron, or not.

Parsing: Traditionally idioms can be parsed as a sequence of individual constituents. Ascertaining their meaning from their individual constituents is extremely difficult, however, if not impossible. True idioms show three qualities, all causing difficulty with parsing:

Non-compositionality: The meaning of an idiom is not a straightforward composition of the meaning of its individual constituents. Under the weather has nothing to do with something being located under weather.

Non-substitutability: One cannot substitute a word in an idiom with a related word. Below the weather is not the same as under the weather, although both under and beneath are synonyms.

Non-modifiability: One cannot modify an idiom or apply syntactic transformations such as Luke is under the bad weather, or the weather Luke is under. These have nothing to do with being sick or not feeling well.

The formal language description, and parsers created from it, normally deal with a single word at a time. They infer a word's usage both from context within the sentence and by the word's classification, such as may maintained for that word in the neuron (or elsewhere), as appropriate.

A scanner device is required that can search for either an explicit sequence of words (e.g., "off the wall"), or, failing that, for a single word. If such a sequence is indeed found, such as might be associated with an 'idiom' neuron, that neuron is noted and may subsequently be fired, turned on. If only a single word of the sequence is matched against a neuron (or an item's text sequence), e.g., "off", then the neuron for the off word is identified instead.

By performing this two-part lookup, the example word off can be readily classified as a single word, or as a multi-word idiom, off the wall. Either such neuron may/will contain associations with other neurons, and those associations give the final meaning to the word or idiom.

The relevance of the distinction in the above noted lookup process is that the entire phrase that constitutes an idiom can be treated in precisely the same manner as a single word, both in the parser and in the associated AI logic. That is, the implications of an idiom phrase are handled in exactly the same manner as implications of a single word's 'neuron'. The context where the idiom (or word) is found determines which other connected neurons also get fired.

For example, the neuron for under the weather is likely to be connected to (and fire) a neuron that implies 'ill health' or 'not-feeling-good' neuron, or to reduce the firing of a 'sense-of-health' neuron. Obviously, one skilled in the art will realize that other neurons to be fired by the recognition of an idiom is determined both by the context within the sentence and by the present connections (knowledge) of the neural network in which it is implemented.

Using the above techniques, it is not necessary to individually parse the constituent words of an idiom and then attempt to establish interpretation of meaning. Rather, the matching of the idiom's sequence of words establishes the neuron, context and associations that give the idiom its cultural meaning. Idioms have long posed a great difficulty with parsing because of the above three qualities. Without our method they will no longer cause this problem. All of this has been implemented at the parsing and neuron-connection level, and without extra-ordinary care or logic being necessary.

The following sections discuss one specific implementation of emulator structure. One skilled in the art will realize that the technology of implementation is secondary to the means described herein. Many of these items will be tweaked or implemented variously as the underlying technology of implementations varies, such as software emulation, FPGA, gate array, embedded processor, analog relational arrays or optical logic.

The ID Table. Referring to FIG. 8, every neuron is assigned a serial number 127, something of no significance in itself. Each relational connection to another neuron uses that unchanging serial number as an ID. From the ID, spelling, pronunciation and other relevant information is obtained.

When memory is implemented as digital memory, the ID table 126 is located preferably at the base of that memory and consumes a predetermined and finite logical space. It is sized to have one element for every possible neuron. In reality, memory can be resized as more is made physically available, with suitable offsets applied to the resolution value for each ID in the table 126. For each index 127, the corresponding offset into the ID table 126 contains a neuron's address in the neuron table 125.

A vocabulary of 30,000 words is an acceptable working size when words alone are considered. For some people, up to 300,000 unique words are known. Each concept, e.g., "off the wall" to be remembered has its own index, as do words, remembered events or conditions; each corresponds to a unique neuron record 1250 in the neuron table 125.

Experiences may or may-not have their own index, depending on what they are and how they were formed. Because of this, it is therefore realistic to have an index table 126 of 8-20 million items or more, for example.

Table of Neurons. Referring to FIG. 9, neurons 1250 are emulated by fixed-size information block 1251, and a variable number of relational connection records 1252. The latter may be conditional, predicated upon the state of other neurons. They may reference the ID indices 127 of both their target and conditional neurons. With better-suited hardware memory technology available, such as those capable of directly forming relational linkages between neurons, these technology-dependent linkage-pointer structures may be superfluous and may be eliminated or replaced.

Basic information 1251 may include references to explicit spellings (e.g., a walk-back index to the text-tree for the word), pronunciation exceptions, visual-object descriptors and the like. Certain flags and start-indices for lexical matters and the like are also included here.

The relational 1252 is a link between two neurons. It may also be a link between a neuron and a state parameter. Relationals may be unidirectional or bidirectional in nature, and may be performed only if a specified set of conditions are met. Relationals are loosely suggested by the biological neural dendron.

When implemented in digital memory, it is convenient that relationals 1252 are allocated in the space immediately behind the fixed-length portion of a neuron record 1251. Normally a blank space is reserved there in anticipation of relational records insertions. Before inserting a new relational 1252, analyzer 30 checks for sufficient room and, if not, reallocates the entire neuron with greater space.

The length of the relational detail block 1252 is variable, depending upon the type and number of relational connections made to other neurons. It is not unreasonable that total (digital) memory may consume sixteen (16) megabytes to two (2) or three (3) gigabytes.

Relationals 1252 have an AND-OR organization. AND-connected relational records are grouped together following the fixed-length portion of the neuron.

Referring to FIG. 10, a specific target ID 1256 is generically defined to represent the OR condition, with the remainder of that 'relational' record ignored. As stated elsewhere in this discussion, certain neuron IDs are reserved for such special purposes as this. Similarly, certain values of the weight 1257 are reserved to indicate an INHIBIT condition, and the weights themselves may be negative, to reduce the level of recognition, the firing level.

By itself, the relational 1253 is unidirectional. The neuron 1250 it is a part of is fired to the degree that the neuron referenced by target ID 1256 fires. However, the firing of this neuron 1250 does not otherwise affect the target ID 1256. For example, Grass may imply Green, but Green does not imply Grass.

For conditions in which a relationship is bidirectional, analyzer 30 creates a suitable relational for each of the two neurons, each pointing back to the other. This is akin in software to a doubly-linked list.

The weighted and conditional influence of this neuron upon another is defined by relational linkages 1252, of which there may be up to one-thousand (1000) or more for some neurons. Each new experience and relationship that is learned has a new relational linkage created for it. The garbage collection and management of neuron-relational memory spaces is discussed herein below.

Initially, new neurons 1250 and relationships are created in the reinforcement memory 11, where they remain until later validated and moved to long-term memory 12, or are deleted. Relationals 1252 in reinforcement memory 11 may refer to neurons in either memory, but those in long-term memory 12 may refer only to other neurons in long-term memory 12. Analyzer 30 tracks allocation, aging, validation, and 'garbage-collection' processes, as discussed in detail herein below.

Other Tables. Besides pure neurons or relationals 1250, both reinforcement 11 and long-term memories 12 may hold other encapsulated information. These data blocks are treated and referenced as ordinary neurons, but contain extended structures for efficient later recall of compound and complex entities. Details of each of these are discussed with the description of their relevant neurons.

The neuron process for recognition of sight and sound is by reconstructive correlation, matching a reference image, or sound against a known object or sound. Memory storage is 'reconstructive' in that actual sampled sounds or pixilated images are not stored. Rather, sufficient information to reconstruct a reference object (for comparison purposes) is remembered. Stored images and sounds then consist of lists of object artifacts rather than detailed information on them. The degree of match or similarity determines the neuron's firing level.

Refer to Table 8 for a list of some common supporting tables. The list is by no means complete, and one skilled in the art will realize that there are many ways to organize such information into tables without altering the means of this disclosure.

TABLE 8

List of Some Common Supporting Tables

| Table | Description |
| --- | --- |
| Task Lists (e.g., Motor Skills | These are lists of actions to be taken, to carry out repetitive or learned tasks. They are specific to supporting emulators, such as those that handle motor skills or musical abilities. Task lists are usually coupled tightly to sensory processes, and can be started, interrupted or stopped by the main brain model. |
| Aural Artifacts | These are descriptors of basic sounds, including such things as phonemes, ADSR rules and the like. They are not complete words or sounds. |
| Aural Interpretive Rules | This is a list-like set of rules for the interpretation of spoken speech, and augments the algorithmic-based lingual processes. |
| Visual Artifacts | This is an arbitrary set of visual elements used to recognize more complex objects. The artifacts may include lines at various angles, facial and nose shapes, alphabetic outlines, and the like. They are elements used for the reconstruction of visual images, of the minimum detail needed to perform image correlation matching. |
| Visual Objects | These are descriptions of complete visual objects, but of minimal detail needed to recognize them. For example, to recognize a specific face, only a portion of the eyes, nose and chin or cheekbone may be required. This reconstruction object is connected to the neuron for a specific person, for example, attaching the face to its identity. The connection is done via bidirectional conditional link. |

Recognition and re-creation of visual objects are different processes, and must be optimized separately. Biological function suggests that humans do not store detail, such as a bitmap image. Yet, they can certainly recognize a detailed object, and can accurately identify it when exposed to it. A correlation template is recreated from the stored table information and applied to the appropriate correlator. This may be, for example, a vector skeleton for use by the visual correlator for image identification. The neuron fires in proportion to the degree of match.

Event Queue and Memory 14. Events are special-purpose commands issued to a queue 14. They are slated for later execution at a specific time, after a specified delay or after a specified set of conditions are met. They are the means by which unwanted looping over information in the context pool memory 10 is circumvented.

An event is simply a marker or flag set down to remind the system to do something when a specified condition is met. It greatly simplifies the handling of actions that are asynchronous with each other. When the analyzer 30 discovers new information in the context pool 10, it may issue one or more events to the event pool 14. For example, the analyzer may create an event that adds new reference back into the context pool 10. It could also issue a conditional event to later force the analyzer 30 itself to iteratively rescan the context pool 10, such as may be done for an analytical temperament such as the Melancholy.

The same mechanism is also used for establishing conditional relationships between neurons, or between neurons 1250 and state parameters 22. Events can be generated by the alteration of state parameters 22. By issuing events for future execution, the analyzer 30 avoids getting side-tracked from the task at hand being worked.

Figure 11:
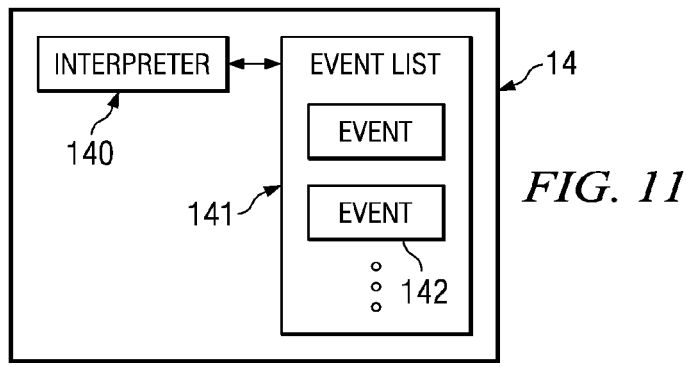
FIG. 11 illustrates Event Queue and Memory—Organization of the event processor.
Figure 12:
FIG. 12 illustrates Content of an Event—General internal contents of an event record.

Referring to FIG. 11 and FIG. 4, the event queue 14 consists of an interpreter 140 and an event list 141. Creation of an event causes an event 142 to be inserted in the event list. Events 142 in the list 141 consist of a command field and other optional fields shown in FIG. 12. The interpreter 140 repeatedly scans the event list 141 for events 142 that can be processed. Whether or not they can be processed is determined by the conditions and timing fields. The auxiliary data field, if present, contains information unique to the event type. Once an event 142 has been processed, it is removed from the event queue 14.

After interpreter 140 has scanned to the end of event list 141, it restarts scanning at the beginning. If no events 142 are left to process, it awaits the creation of a new event 142. One skilled in the art will realize that the event queue 14 can be implemented as hard-coded logic, as a micro-coded processor, a software emulation, an embedded processor, FPGA, ASIC, optical or other technology of choice, without altering the means of this disclosure.

Conjector 70. Conjector 70 proposes decisions based upon incomplete or partial facts, or facts of low confidence. While the analyzer 30 is the main thinking facility for the emulator, it takes advice and proposals from both the conjector 70 and dreamer 75 blocks. Proposals from the conjector 70 are filtered by clutter filter 40 on the basis of temperament and personality.

During the processing of sentence data in the context pool 10, analyzer/correlator 30 acts on the sentence block to determine a suitable course of action where appropriate. If it 'comes up dry', the analyzer 30 invokes the conjector 70 to suggest a valid meaning. If the resulting quality of the conjector 70 output is too low, analyzer 30 may direct the communications interface 98 to ask for clarification. It sets an appropriate parameter flags to await an answer to the question of clarification.

Conjector 70 output is similar to any normal neuron reference or sensory nerve that is firing at a relatively low level for the topic. Other than being flagged as coming from the conjector 70, output of conjector 70 is essentially identical to data inferred from sentences by semantic analyzer 50.

The conjector 70 behaves in a similar manner to the analyzer 30, except that it only looks at material in the present context pool 10. It is not bound by the same needs for hard facts as the analyzer 30 is, and effectively offers subjective information for consideration. Its proposals are largely ignored by the analyzer, except for cases such as the following:

Information is missing or incomplete.

Questions posed by the analyzer through the communications interface 98 are yet unanswered within the expected interval.

Overall level of confidence (firing) levels of information in the context pool 10 is low.

In effect, when answers are not available to the analyzer 30 from existing information, the analyzer turns to the conjector 70 to fill in the blanks.

For its operation, conjector 70 reviews outstanding questions or issues, as defined both in the context pool, supporting tables and appropriate state parameters 22. Some state parameters 22 rack the present topical subject(s), questions being asked, and information presently being sought by analyzer 30. On the basis of this material, it scans even low-firing neuron references and commands within the context pool 10 and proposes (conjectures) answers for the analyzer 30.

Respect by analyzer 30 for conjecture is implied by the weighting placed on it. Proposals are ignored if they conflict with other information, or if better (stronger firing) information becomes available. Conjectures age rapidly and are soon forgotten from the context pool 10, whether or not acted upon. The analyzer 30 considers the source of the conjector 70's 'information' and its levels of confidence (firing levels). It then establishes its own need for the proposal, and its own level of confidence in the data. Rejected conjecture is immediately deleted.

One skilled in the art will realize that conjector 70 can be implemented as hard-coded logic, as a micro-coded processor, a software emulation, an embedded processor, FPGA, ASIC, optical or other technology of choice without altering the means of this disclosure.

Dreamer 75. Dreamer 75 functions as the 'right side' in the brain emulation of this disclosure. It peruses neuron references in context pool 10 and uses different weightings for state parameters 22 than used by analyzer 30 for its inputs and decision processes.

The dreamer 75 influences the analyzer 30 primarily by injecting fired neuron references into the context pool 10, rather than just structured commands such as from the semantic analyzer 50. Where pre-existing information in the context pool 10 comes from visual or aural sources 60, or from visual neuron correlations, the dreamer 75 may output proposals in the form of command blocks.

Similarly to correlator-analyzer 30's processing methods, the dreamer 75 generates new references and commands based upon existing neuron firings. However, when traversing the neuron relational chains, lower regard is given to relational conditions 1252, as in FIG. 9. The resulting outputs are of low reliability, as indicated by both their source and its firing levels. When analyzer 30 is otherwise inactive or is in sleep mode, the dreamer 75 may indirectly alter the subject topics by issuing events to event queue 14. Due to the 'noise' levels involved, the dreamer 75 may rapidly flit from topic to topic. The dreamer 75 also remains active when the brain emulation is otherwise in a 'sleep' mode.

When subsequently processing context-pool 10 data created by the dreamer 75, analyzer 30 does not create new neurons or relationals in the reinforcement memory 11. Upon awakening from sleep mode, the analyzer 30 also rapidly purges residual dreamer-generated 'information' remaining in the context pool 10.

The dreamer 75 therefore behaves as a 'movie-maker' of sorts, unconstrained by relational logic. It creates new ideas loosely based on the context of the moment, ideas that also have very rapid lifetime decays. While this firing of neurons is not in a logical or cohesive way, it still influences decisions and analyses made by the analyzer 30.

Dreamer 75 is algorithmically based, statistically ignoring strong-firing neurons and applying logarithmic weighting to firing neurons as a part of its own processes. In this way, dreamer 75 peruses the context pool 10, effectively giving weight to neurons barely firing.

The impact of the additional neuron firings in context pool 10 is that the dreamer places greater overall weight on neurons than the analyzer 30 would have. During the course of activity, the firing of some neurons will be enhanced because of the multiple references to those neurons. Analyzer 30 appropriately weights information flagged as coming from the dreamer 75, and continues to apply its normal logic to the data. Where it is seeking new ideas, it will weight dreamer-induced references higher than it ordinarily would.

Because dreamer 75 operates at lower effective thresholds than useful for analyzer 30, it is more prone to 'noise' and error than is the analyzer 30. While its outputs are less reliable insofar as decisions go, its purpose is different. During non-sleep operations, dreamer pseudo-information passes through clutter filter 40 where it may be rejected by the personality and temperament filters. During non-sleep operations, the clutter filter rejects more dreamer 75 output by altering rejection filter thresholds.

One skilled in the art will realize that dreamer 75 can be implemented as hard-coded logic, as a micro-coded processor, a software emulation, an embedded processor, FPGA, ASIC, optical or other technology of choice, without altering the means of this disclosure.

Speech and Visual Analyzers 60. The emulated brain of the present disclosure may be applied to a mechanical system, whether a skeleton or vehicle, and list-based motor skill learning functions are used. Interfaces from task list handler 13, event handler 14 or analyzer/correlator 30 can be used to control external hardware. These interfaces can be used to apply specific levels of force, when used with closed-loop feedback, or a specific mechanical position, with or without feedback.

Sensors used for the feedback systems are determined by the application. For example, placing one's hand on a table requires either a prior knowledge of the table height and position, or requires feedback such as derived from the eyes. Suitable sensors might be a pressure sensor for the nose (so one doesn't bump into a wall more than once) or for the hand. Aural sensors provide feedback to ascertain the proper formation of sounds, such as to sing on key with existing music.

The methods of this disclosure create correlation templates or proposals, visual or aural objects presented for correlation against visual images or sounds. Binary search methods are used to select the proper template for correlation, to rapidly determine degrees of recognition. The correlation method constitutes a processed sensor, a sensor with internal ability to ascertain degrees of recognition.

Non-processed sensors are simple temperature, pressure, humidity or light intensity measurement devices, whose outputs are simply formatted appropriately for input to an interface. Processed sensors require interpretation and possible correlation before they can develop meaningful signals. For example, using any number of algorithms, a visual sensor takes a template image and returns the degree of correlation in the present image. Similarly, processed aural sensors take a prototype, such as for a phoneme, and return the present degree of correlation. Phoneme variations may be proposed if a matching word has its neuron firing in context pool 10.

Speech and visual analyzers 60 use task lists or other memory such as 13 to retrieve the next sequential image templates for correlation as proposed by analyzer 30. These are conveyed as present settings of the relevant state parameters 22. For example, some motor skills demand visual feedback for the recognition of a table, its upper surface position, and the position of that portion of the hand to be placed there. These separate objects that must be recognized in turn by the visual correlation processes.

When the table top has been identified, its position must be reported to the context pool 10, as is the position of a suitable landing site on it, the proper area prescribed by the analyzer 30's intention and desire. The outputs of visual correlation are conveniently made relative to the location of the skeleton's eyes, such that correction for hand motion can be made.

Particularly for the visual recognition processes, motor skills require feedback for position, rate of travel, distance and the like. From a single sensor (e.g., a pair of camera 'eyes'), multiple streams of feedback can be derived, with the information forwarded as command or event packets to context pool 10.

Visual and aural cues aid in confirmation of recognition, delivering feedback for required motion control. These are needed, for example, to rotate and tilt the head properly and to then direct the eye yaw and tilt so the detailed center of the foviated vision is centered on the portion of the scene of interest. These matters are handled interdependently by list processor 13 and visual/aural analyzer 60.

The speech analyzer 60 dumps its output into the semantic analyzer 50 to actually parse spoken material into items suitable for the context pool 10 memory.

Obviously, many technologies for such processed sensors exist, as known by one skilled in the art. The present disclosure permits interactive presentation of template information with the sensor, in concert with the functions of this brain emulation. One skilled in the art will realize that visual analyzer 60 itself can be implemented as hard-coded logic, as a micro-coded processor, a software emulation, an embedded processor, FPGA, ASIC, optical or other technology of choice, without altering the means of this disclosure.

Memory Garbage Cleanup and Collection. Garbage collection refers to the reclaiming of unused fragments of memory. During this process, the fragments are sought out and objects in surrounding memory are moved up or down, coalescing unused fragments into a larger block. Coalesced blocks are remembered for later reuse.

Cleanup is a catch-all phrase to cover all things that need to be done to the memory to optimize it. As noted below, it is used to resize certain areas of memory to optimize usage, reclaiming previously reserved space that could better be used elsewhere.

Memory garbage collection and cleanup processes usually involve the movement of information in memory, with suitable updates to indices and pointers to properly reflect the movement.

Expansion of Relational Linkage Blocks. When a neuron originally assigned and given an ID by analyzer 30, empty area for the relationals 1252 is reserved behind the basic neuron information block 1251. Refer to FIG. 9 and FIG. 10. As new relationships are formed, relational records 1253 are appended to the end of the above linkage list. Eventually, this free space is exhausted, and there is no room to add the relational 1252, between the end of the present linkage block and the start of the next neuron. Something must be explicitly done to fix this.

'Sleep-Time' Cleanup Activity. Sleep is used to remove clutter from short-term memory, half-formed fragments of thoughts, conjectures, and certain other items of information. This process enables the next day to start out fresh, just as with a human. It is a suitable low-risk time to perform optimization of memory. During periods of 'sleep', the inactive state of the brain emulator can be used to advantage to handle movement of validated facts from reinforcement to long-term memory 12. This process leaves unused holes in reinforcement memory 11, which are also cleaned up.

During the reallocation of the neuron in long-term memory 12, or when moving a relational 1252 from reinforcement memory 11 over to the associated neuron in long-term memory 12, it is possible there is no room left for the relational 1252. For this reason, a neuron's space in long-term 12 must sometimes be expanded.

For this, reinforcement memory 11 is scanned to determine what neurons are eligible for transfer. If transfer would be impeded by lack of space, the associated long-term neuron memory record 1251 is resized upwards.

When available reinforcement 11 or long-term memory 12 has diminished below threshold, neuron space can also be resized downwards during 'sleep' times, to optimize it. Neurons 1250 with significant free space behind them can have some of that space reclaimed. Heuristics determine whether or not to downsize. Sparse separation of neurons 1250 in memory is always faster, so reclamation is only done if required.

Incoming information 93. The implementation of deference between two modeled individuals takes place in analyzer 30. The position of the present individual being modeled within a hierarchy of individual, political or institutional structures is also kept in parameters 22.

All information except that from the analyzer/correlator 30 first passes through the clutter filter 40, where it may simply be ignored and scrapped. Clutter filter 40 uses personality-specific parameters 22 to determine whether the composite personality is even interested in addressing the information, which has been pre-classified. For example, a Choleric temperament is likely to completely ignore human-interest information, whereas a Sanguine temperament readily devours it.

The filter 40 is a catch-all area to pass preliminary judgment on data, including judgment of its source. The filter 40 is controlled by a number of dynamically-changing parameters, including the current state of patience. When context pool 10 is full, filter 40 drops information, bio-mimetic to someone in the state of "mental overload."

Preemptive Training. The brain emulation of this disclosure learns over time, influenced by underlying temperament. Normal human learning processes are used by the emulated brain. Nothing is retained in permanent memory 12 by the analyzer 30 unless it has been reinforced for approximately 21 days, avoiding an accumulation of 'clutter' facts and relationships. Facts learned are normally interpreted under the influence of the root temperament, which has its implicit filters and analytical processes (or limited analytical processes, as in the case of the Sanguine).

The brain emulation may be 'trained' by a method preempting normal temperament-and-time processes, to rapidly absorb facts, control and environmental conditions. The process is therefore described here as preemptive training. It is assumed in this case that the 'facts' and relationships presented are previously determined to be true and factual, "from God," as it were.

Preemptive training may be turned on or off at will, externally to the emulator. It can be turned on to affect rapid training of these pristine facts and relationships, bypassing temperament-related decision steps and levels of analyzer 30 and clutter filter 40. In this training mode, access is given to state parameters 22 and controls not otherwise permitted. When training is completed, these may be returned on. The modified parameters then immediately affect the personality.

When in preemptive training ('setup') mode, the entire contents of memories, one or all, are selected or all state parameters 22 may be copied to external storage. This has application for both the commercial marketing of the information as "intellectual property", and for military purposes as discussed elsewhere. Such 'snapshot of being' may be replicated elsewhere and used as the basis for additional training.

Facts and Relationals. Under preemptive training, new facts and preliminary relationships between them can be defined using declarative monolog in a text file, or a verbal narrative if a speech analyzer 60 is present. These are described in English prose format. The grammar is interpreted by the English Parser, but it is not filtered or further interpreted by analyzer 30 or conjector 70. Normal processes for grammar interpretation are followed, but the information undergoes no further temperament-based interpretation or filtering. This approach lets the brain emulation query the trainer for information that is unclear or not understood, and the training process becomes similar that of a knowledge-hungry human being.

Religious Belief and Personal Conviction. Religious beliefs and personal convictions may be established by preemptive training. As with all preemptive training, the brain emulation will have no idea of why it has these beliefs or convictions. Even so, they can be overridden by deep (extended and consistent) normal training, thereafter.

The beliefs are set by a prose-style description in a text file, to be read by the brain emulation. If it does not understand something or considers something illogical, it will ask for clarification by the trainer. The prose can subsequently be altered to preclude that question for the future.

There is nothing fundamentally different in the matter of religious belief and personal conviction over other types of facts 1251 and relationships 1252 that may be learned. However, by defining them under preemptive training, the normal analytical checks by the analyzer 30 for consistency and factual basis are bypassed, making them an integral part of the emulated brain's basis of understanding. Religious beliefs or personal convictions are established, they could also be trained (non-preemptively) over extended time.

Specification of Control Parameter Values. The many control parameters 22 and their default values may also be preset by preemptive training. This can also include specific emotional responses to be evoked when defined conditions are met. The result is again that the brain emulation does not know why (he) responds that way, but he simply does. This is useful to preset human-like likes and dislikes for specific things, for accurate emulation of a person.

Preemptive training is the method by which the temperament of the brain emulation is specified, including both the base temperament type and the upper-level composite of temperaments. These settings will directly affect the outcome of responses and decisions made by this emulation.

The time frame over which the brain emulation learning reinforcement occurs is nominally 21 days, but defaults to somewhat different durations on a temperament-dependent basis. Table 9 gives some representative default reinforcement intervals. 'Permanent' learning also takes place during times of emotional stress or trauma, during which the interval of this table is proportionately decreased.

TABLE 9

Temperamental Learning-Reinforcement Intervals

| Temperament | Duration |
| --- | --- |
| Choleric | 21 days |
| Sanguine | 18 days |
| Phlegmatic | 15 days |
| Melancholy | 21 days |

When the time is reduced (it does not affect preemptive training), the brain emulation is more likely to retain trivia and insignificant information. After the emulation is turned operational, those presets become an intrinsic part of its responses. They define the settings from the present time onward, until altered.

While in preemptive training mode, memories 11, 12, and 13 and other tables may be saved to external storage, upon command. This includes facts and relationals 1251 and 1252, and relevant parameter settings 22 and 20, and their defaults. In short, anything trained can be restored to the memory it came from. One skilled in the art will realize that the methods of saving memory and parameter states are dependent upon the technology of implementation, and that variations in these methods do not materially alter the system of the present disclosure.

When using a brain emulation of this disclosure to model a specific person (e.g., a foreign national for military purposes), the emulation's memory and parameter settings can be "snap-shotted" to enable a simulation re-run under new conditions or parameter settings. Anything learned between the snapshot and the time of their later reloading is lost and may not be incrementally recovered and reapplied, unless it was also snap-shotted.

Figure 13:
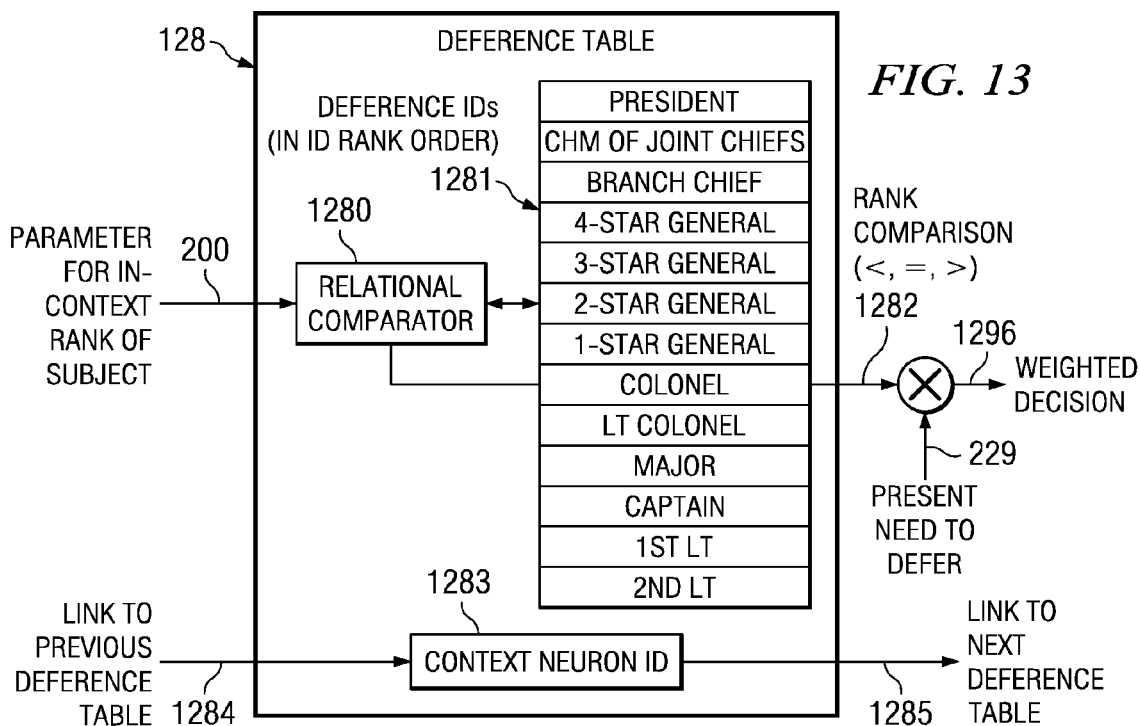
FIG. 13 illustrates A Deference Table—Example table of orders of deference.
Figure 16A:
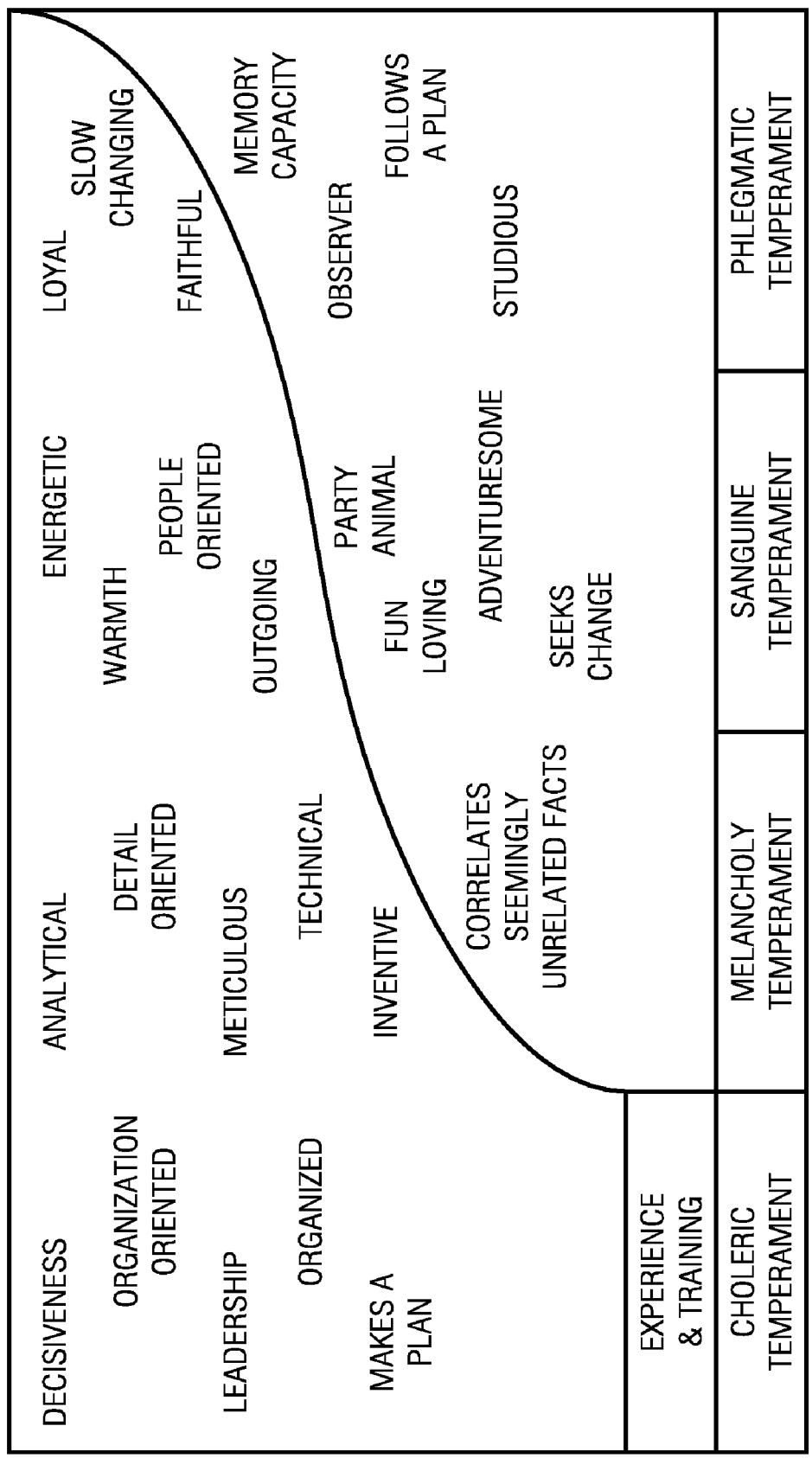
FIGS. 16A-D illustrate The Four Composite Temperament Models.
Figure 16B:
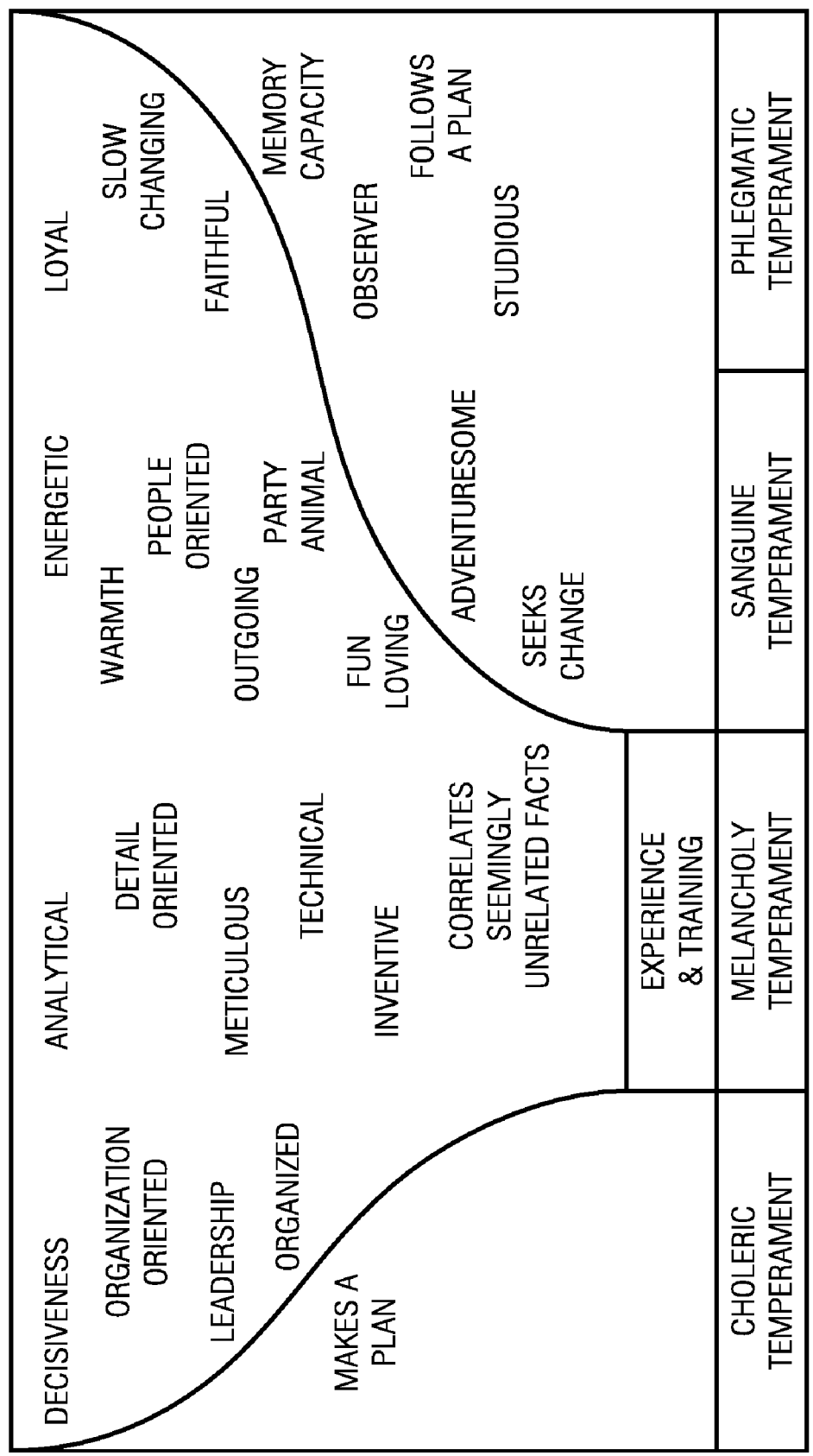
Figure 16C:
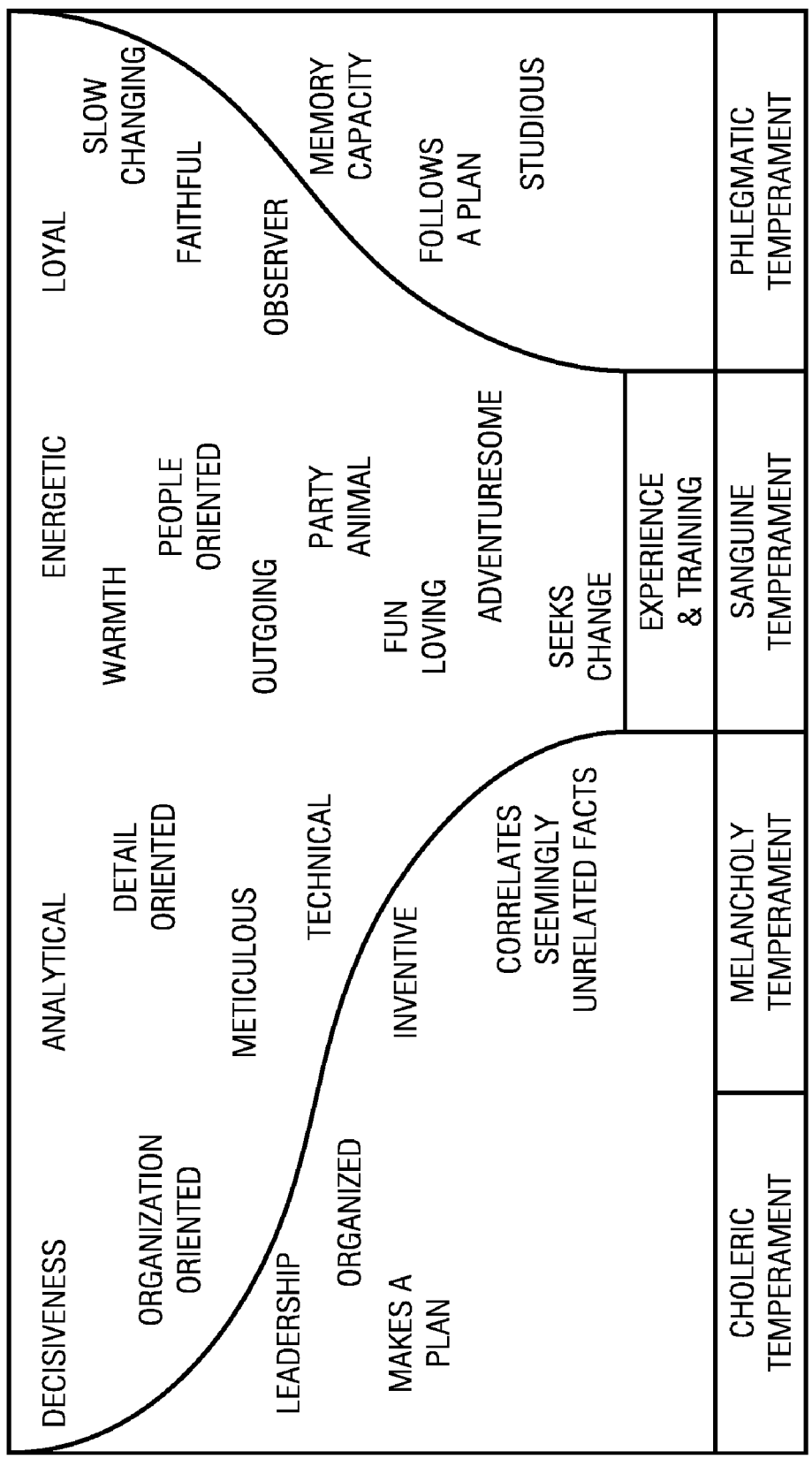
Figure 16D:
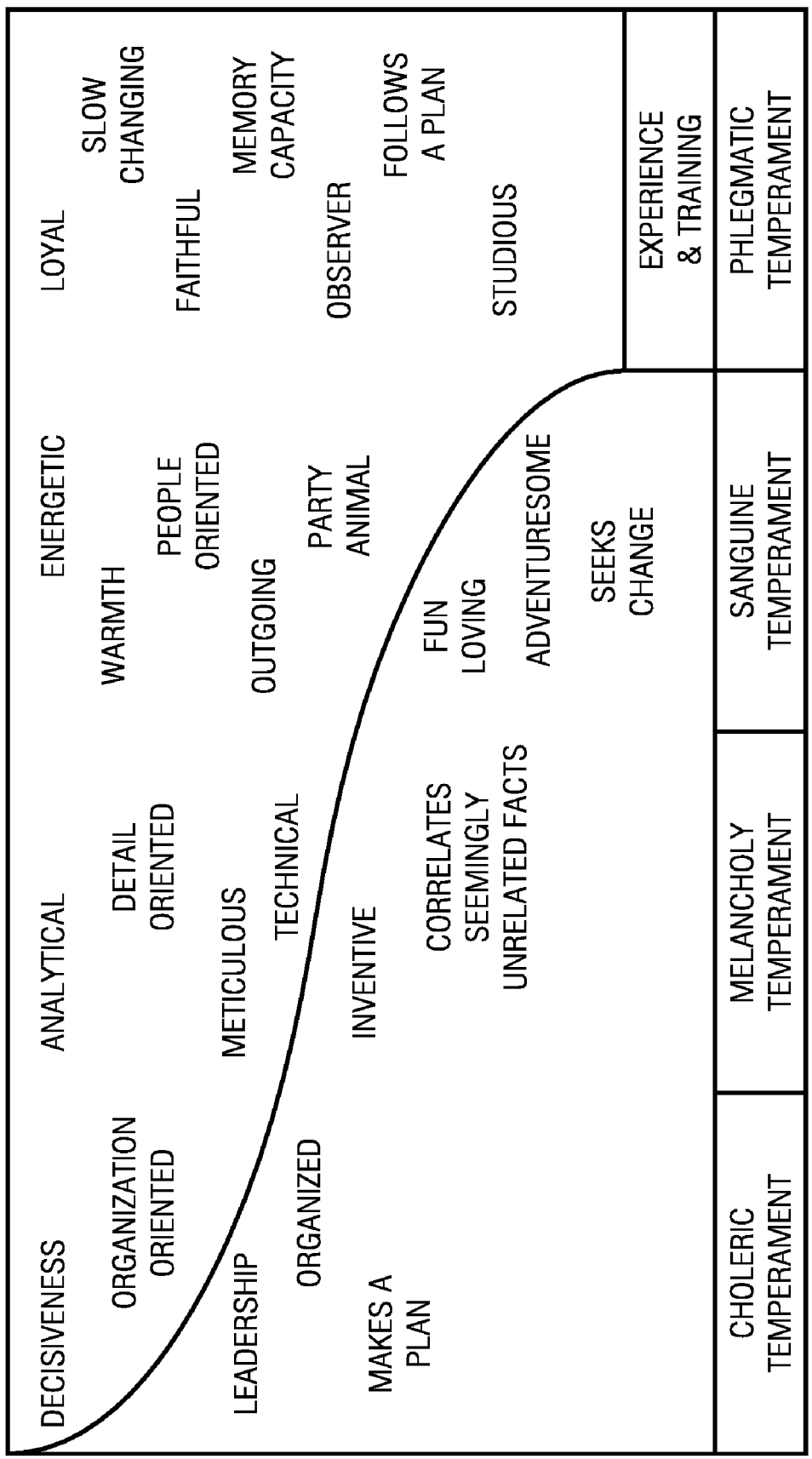

Degreed Deference. A concept that plays a necessary role in human relationships is that of deference to another person. Deference is not 'black-and-white', but exists by degree. Normally the human makes decisions that suit himself under the present conditions, without regard to other people. However, he/she will have particular regard (deference) to some people, such as parents, bosses, military chain of command and the like. The brain emulator uses degreed deference to emulate this implied relationship. Referring to FIG. 13, the Present-Need-to-Defer parameter 229 provides the weighting.

Multiple deference tables 128 may be created in memory 12, that apply in a specific context 1283 (e.g., military, political, social order, class). All deference tables are chained together using the links such 1284 and 1285. The analyzer 30 scans the deference tables to alter a tentative decision, if it conflicts with an external command, such as inferred from an imperative sentence in semantic analyzer 50.

Analyzer 30 seeks a deference table matching one or more active contexts of the moment, as maintained in state parameters 22. Finding one, it specifies the parameter for the rank self-identity. If the subject being measured for deference is another person, that person's ID 200 is used instead. The relational comparator 1280 makes its decision as the deference output 1282. The decision weighting 1296 is further adjusted by the present need to defer 229. Signal 1296 is then used to determine if any decision should be made at all. In this manner, the analyzer 30 defers to commands of authority it is subject to, or weights the decision outcome if the conflicting command was merely a recommendation of external authority.

The deference tables 128 therefore supply a realistic influence by external authority upon the brain emulation. When used in a military environment, for example, a simulation manager in charge of the brain emulator(s) can exert real-time control upon the brain emulations, if the manager's ID is placed at the top of all deference tables.

Preemptive training establishes the set(s) of hierarchical tables 128 for relationships between this emulator and others (or other people). The same prose-style description is used to describe the 'chain of command' and where the current brain emulation fits within it.

Establishing a down-line deference (i.e., a condition where another emulator or person should defer to this brain emulation) is permissible. It sets the emulator's expectations of that other emulator or person. Response to a violation of those expectations is dependent upon the base temperament specified for the present brain emulator, and may also be defined during preemptive training.

The Implementation of Temperament. Certain assumptions made by any such model of human psychological function, including this one, enable or simplify the understanding of brain functions. Properly done, they permit ready creation and implementation of a synthetic brain based on that model. They may be right, wrong or erroneous, but such assumptions permit rapid creation of a 'baseline' implementation. Such assumptions do not affect the overall means of this disclosure.

The FIG. 14 depicts one such assumption, the makeup of composite personality. The assumption is made that each person is 'pre-wired' at birth with a specific set of pre-dispositions, one of four basic types well known to those skilled in the state of the art. These include the Choleric, Melancholy, Sanguine and Phlegmatic temperaments, as categorized and defined among the basic tenants of classical psychology.

To these basic predispositions (temperaments) is added a set of experiences and training, learned from the environment in which the individual lives. The from-birth predispositions are collectively defined as a 'base temperament', as used here. The sum of that temperament and the set of experiences is used by the present disclosure to define the composite personality.

FIG. 15 depicts another assumption used by the present disclosure and model, approximate traits exhibited by the four classical temperaments. The above 'pre-wired temperament' 201 of FIG. 2 are replaced by the actual classical temperament names, in FIG. 15 and FIGS. 16A-D.

FIG. 15 illustrates typical traits (largely, but not fully) specific to one temperament type, as indicated above each temperament. FIGS. 16A-D represent the composite personalities of people, each based upon one of the four underlying predisposition temperaments.

Through experience and training, the personality of a given underlying set of predispositions may 'reach out' to intentionally assimilate desirable characteristics of the other three temperaments. The result is a broader composite personality. The individual being modeled here, a Melancholy of FIG. 16*b*, for example, may embrace decisiveness or leadership traits more characteristic of a Choleric.

Another assumption made here simplifies the understanding of human behavior, and the implementation of this realistic brain emulator. It is that every person has one and only one basic underlying temperament, regardless of past or present experience or training. When placed under emotional or physical trauma, or under extreme pressure, the actions, behavior, interests and decisions made by the person (or emulation) tend to revert to those characteristic of the person's base temperament.

Obviously, other assumptions could instead be made about the origin and development of temperament and personality, ones which may be equally valid. These could be used here instead by way of examples, but do not, however, affect the present disclosure or its embodiments. The above assumptions provide a vehicle for the description of the present disclosure, and provide a means for visualizing an otherwise complex matter.

Figure 17:
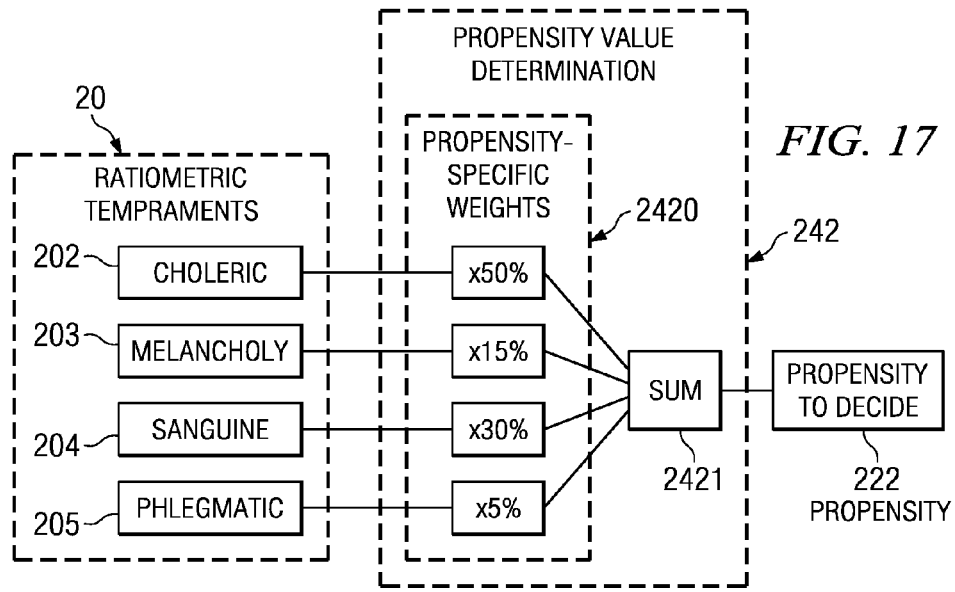
FIG. 17 illustrates Typical Temperament—Weighting of Parameters.

Weighting of Brain Parameters. FIG. 17 depicts the Choleric parameter 202 in its relationship to the Propensity-to-Decide parameter 222, noted earlier. The actual value of parameter 222 is the sum-of-products 2421 of the current values of all four temperament-controlling parameters, each with its own weight. The values of the weights 2420 applied are selected and fixed in the emulation, but the controlling temperament parameters may themselves be adjusted as desired.

It is desirable for one mode of operation that all of the four temperament parameters such as Choleric 202 have values of 0 or 100%, such that they are mutually exclusive. It is desirable for other modes of operation that the percentages of all four temperament parameters may be non-zero, but shall total 100% when summed. An example means to implement this is illustrated in FIG. 17.

It may be convenient, for example to 'synthetically' force the sum of percentages of the four temperament parameters to be 100%. Using weights 2420 given by the example of FIG. 17 the setting of the Propensity to Decide parameter 222 is given by the equation:

Propensity to Decide=50%*Choleric+30% Sanguine+ 15%*Melancholy+3%*Phlegmatic.

By ignoring how the 'pseudo-neuron' temperament parameters are set, they may be treated as normal neurons in a neural network.

A useful assumption made by this disclosure is that human beings (being emulated) have a root, or base, temperament at birth that gives the human certain propensities for behavior. Experience, training and growth may cause the human to take on selective traits found predominately in one or more of the non-baseline ('pre-wired') temperament.

Implementation of Trauma. A part of this disclosure is the implementation of the human response to emotional pressure or to physical or emotional trauma. Such response is modeled here, for example, as the reduction of impact of such experience, training and growth, such that the personality temporarily is dominated by the 'pre-wired' temperament. This is depicted in FIG. 18.

Figure 18:
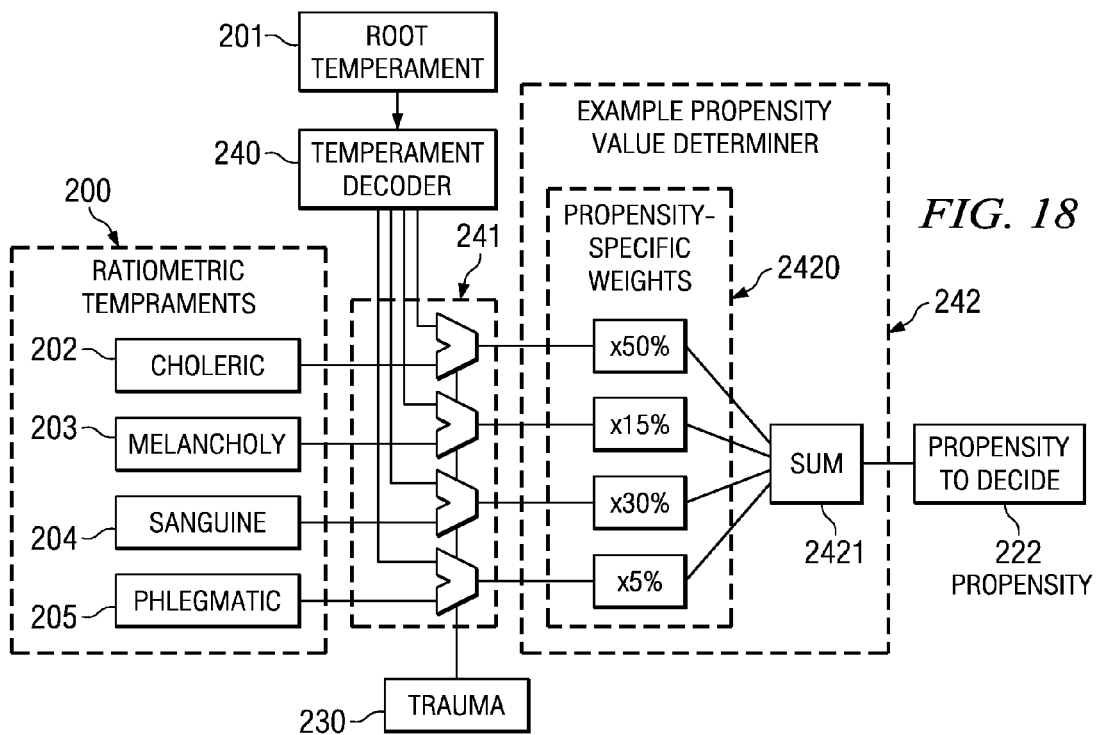
FIG. 18 illustrates Implementation of Pressure or Trauma.

In FIG. 18, the elements of FIG. 17 are augmented by a selector 241, which takes as its output either of its two inputs, one or the other in its entirety, or a percentage of each input as selected by a determining control input. In this case, the normal operation and description depicted by FIG. 4 is altered under emotional or physical trauma or extreme pressure, as noted by parameter 230.

In this case, selector 241 is interposed between temperament sum 2421 and the Propensity to Decide parameter 222, such that when under trauma, that decision behavior is instead determined by the 'pre-wired' root temperament 201. The base temperament is pre-chosen as one of the operational set-up values for the brain emulation and is presumably unchanged for 'life', although nothing prevents such change.

Trauma parameter 230 is triggered and set by sensing other parameter or neuron conditions that indicate levels of extreme emotional pressure or trauma, or physical trauma or shock, for example, trauma 230 is configured to automatically decay with time, using a linear, logarithmic rate or other rate to its nominal 'off' (unperturbed) state or value. It is normally triggered by a change of the above conditions and can be re-triggered if the condition is sustained or recurs, and can be designed to decay immediately if the condition is removed.

The conditions triggering Trauma parameter 230 are not depicted in FIG. 18, but are presumed to exist, and consist of a sum-of-products of parameters and brain nodes from whose values the trauma can be sensed.

Handling of Gender. The basic methods of FIG. 18 are extended to differences of activity between male and female people. For this case, processing flow is augmented with additional multiplexor and weighting tables such as 241 and 242. These would be driven by the Gender parameter 209, instead of Trauma 230, for example. Where appropriate in the decision and thought processes, these additions are incorporated to account for gender-related processing differences.

Figure 19:
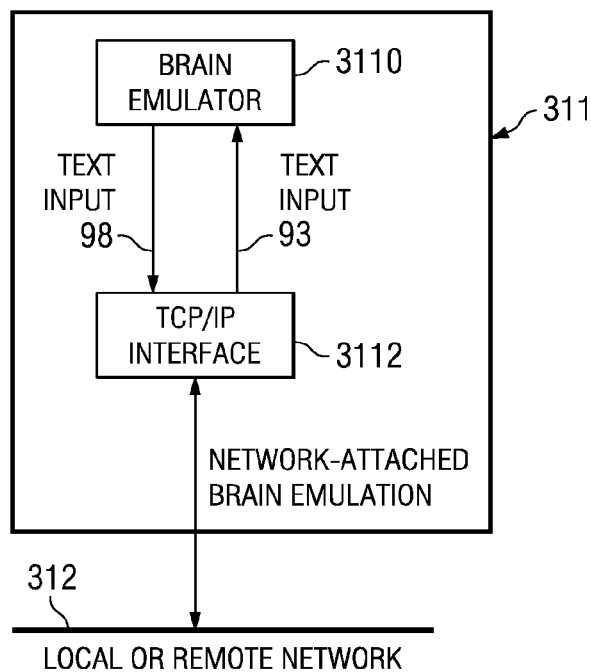
FIG. 19 illustrates Network-Connected Brain Emulation.
Figure 20:
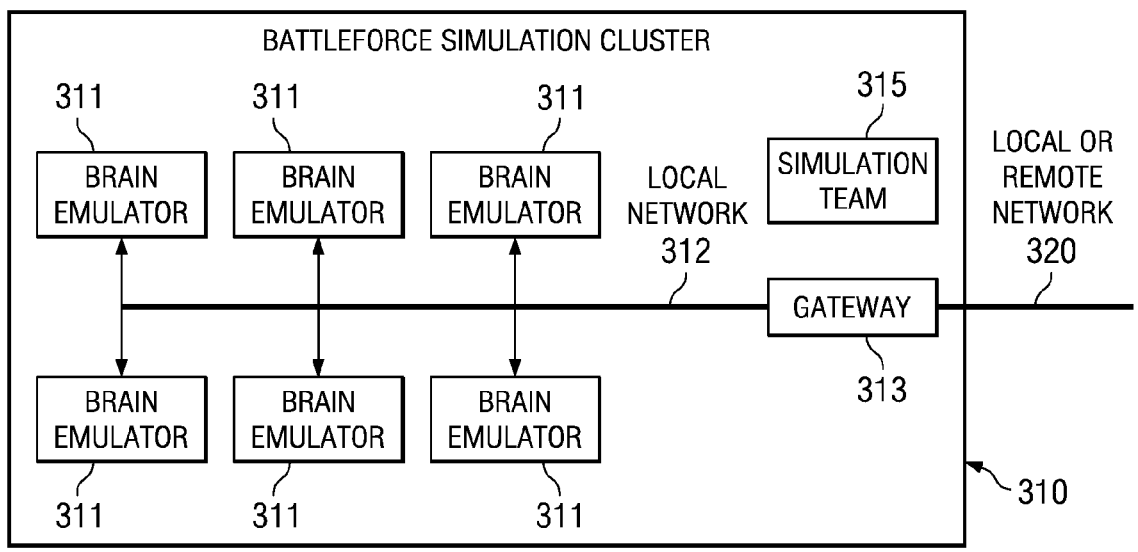
FIG. 20 illustrates Example Battleforce Simulation Cluster.

Use in Military or Political Simulations. Because this disclosure is capable of accurately emulating human behavior, the brain emulation finds use in many military applications. Using prior means, it is difficult to obtain accurate predictive modeling of combat force decisions, particularly those motivated by religious belief systems and belligerent political ideologies. In the present environment of asymmetric warfare, the ability to forecast combatant decisions becomes critically more important. The means of the present disclosure provide this capability. Refer to FIG. 19 and FIG. 20.

Brain emulator 311 as described previously can be configured to receive 'verbal' input in the form of a text stream 93 and to emit conversational output text 98. By the addition of a TCP/IP interface 3112, or other interface such as for the 1553 bus, the brain emulation 3110 can be network-connected to a local or remote network 312. It becomes a network-connected brain emulation 311. It should be evident to one skilled in the art that many variations of interface 3112 are possible without changing the system of the present disclosure.

It is now possible to configure a cluster of these emulators together to form a team. In FIG. 20, these are demonstrated as a Battleforce simulation cluster 310, such as may be used to predictively model combatant forces. The same configuration can also be applied, for example, in an Unmanned Arial Vehicle (UAV) 'cockpit' to emulate a conventional flight crew, each individual specifically trained on for his task role within the crew. It can likewise be applied to an unmanned underwater vehicle, to make autonomous mission decisions when disconnected from the host vessel.

When used as a battleforce simulation cluster, a simulation team 315 of human operators can be assigned to upload intelligence to emulators 311 to accurately emulate key individuals in the modeled battleforce. As new information becomes available on the modeled combatants, preemptive training can be used to update the models.

The emulations 311 used in the simulation cluster can use the port concept of the TCP/IP protocol to restrict conversations among themselves. Such specific local-communications ports can be precluded from access by other such clusters via conventional internet gateway 313. Cluster 310 can then be used to emulate an enemy combatant force (e.g., a 'Red' force), an unknown combatant force, coalition or friendly (e.g., 'White' or 'Blue') forces, secure from each other.

Figure 21:
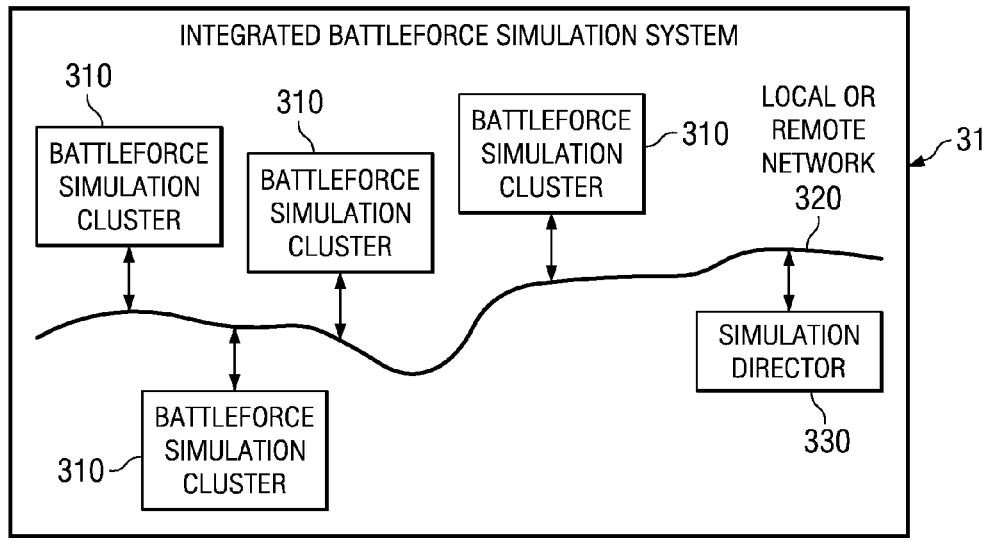
FIG. 21 illustrates Example Integrated Battleforce Simulation System.

Multiple clusters 310 may be interconnected to form an integrated battleforce simulation system 31 as shown in FIG. 21. Simulations would be under the overall direction of a simulation director 330. The director 330 can have secure access to internal conversations within the battleforce clusters 310 by mans of a dedicated encrypted port that gateway 313 replicates and encrypts the local busses 320. This configuration permits independent simulation teams 315 to work independently of each other but under the scenario proposals and directions of the director 330.

The simulation director 330 can remotely take snapshots of the memory and brain parameters of all brain emulations in the system 31. By taking such periodic snapshots, the simulations can be 'rewound' and restarted with different scenarios, intelligence information or updated personality profiles.

Simulation teams 315 may preferably consist of psychologists and people with knowledge about the personalities, governments or composite forces they are responsible for emulating. This disclosure permits realistic inclusion of religious belief, moral convictions (or lack of them), chains of command and authority, and other relevant personal information required for accurate predictive modeling of people systems.

The simulation system 31 may be located in a local region or may be distributed across the world. Results of such simulations can be made available to the actual warfighters as a part of C4ISR.

Parsing of Human Language

Definitives Versus Declarations

There are many alternative organizations for the process that separates definitive sentences from declarations. This is generally controlled by the structure defined in the Baccus-Nauer Format ("BNF") file that describes the natural language (e.g., English).

The Language Definition

The parser itself is created in a top-down description of the language, and the description (a ".BNF" file) is then translated by the Lingua compiler into a C++ class that serves as a parser. At run-time, that class parses the sentence in accordance with the language definition in the BNF file. Incoming sentences are parsed according to that definition, and the constituent parts are pushed onto a stack.

The BNF is written in top-down fashion, such that a sentence is defined as a Subject and a Predicate, while a Subject is a Noun Phrase, which itself is an optional 'a/an' determiner, a set of optional adjectives and a noun-equivalent. This process progressively defines sentence parts in more detail, and includes all realistic variations that a sentence may have.

The Parsing Stack

As parsing progresses, information from the sentence is tossed onto a stack in a first-in, first-out order. Where the parser has attempted to parse something as a Clause when in fact it is not, all information related to the (suspected) clause is discarded and later replaced by the correct data.

For the sake of convenience, significant portions of the sentence such as Subject, Predicate, Independent Clause and others are bracketed on the stack by begin/end markers.

Identifying a Definitive Sentence

A 'definitive' sentence defines something. The brain supposedly remembers the definition of a word, and possibly makes associations or relationships with it. In practice, definition of a word or topic may begin with a definitive sentence, but the definition is elaborated with declarative commentary afterwards.

Generally speaking, it is possible to know whether or not a sentence is a definitive (a "DEFN") strictly from structure of its grammar. If all sentences were well-formed, it would be reasonable to identify the DEFN entirely within the BNF description of a definitive.

In practice, that places significant and unreasonable burden on the BNF. Further, the BNF cannot identify subsequent declarative topic expansion being defined as definitive. It must be ascertained in a step to follow.

The parser should be as streamlined and fast as practical. Currently, the majority of the process load is caused by efforts to differentiate between definitive and declarative statements. A lot of recursion occurs as one pattern match is attempted, fails, and another is tried. Additionally, other sentence types calling on these same patterns have to go through this extra recursion as well.

In the real world, many problems arise when people get "declarations" pushed into their 'DEFN centers,' giving ideas more import than they deserve. Racism, bigotry and hatred seem to all occur when a declaration gets handled as a definition. The DEFN centers must be very choosy on what is let through as definitions. The best way to handle that would be post-parsing. The system would be better off erring on the DECL side by missing a DEFN. This seems to be less catastrophic than pushing a false DEFN.

The brain's following parsing system could be used to assist post-parsing:
1. All statement patterns get pushed to the stack as declarations.
2. The parser throws clues to the stack to help post parsing determine how to handle the statement. Modifiers (e.g., all, some) and determiners (a, an, the) in the subject and verb types (is, are) are primary elements useful to determine if a statement is definitive. An interface function can rule out a DEFN by checking for a set of these conditions. A token can be pushed saying: a. DECL, or b. POSSIBLE_DEFN.
3. Such tokens can be pushed within each independent clause.

Post parsing can more readily look forward within the stack to help determine a DEFN versus DECL, because we are not restricted to any cases or sub-patterns of the statement pattern. This system is more efficient, and in the end enables us to accurately differentiate between DEFNs and DECLs.

Ascertaining a Declaration

Modifiers (e.g., all, some) and determiners (a, an, the) in the subject and verb types (is, are) are primary elements useful to determine if a statement is definitive. Absence of a direct object is also a possible indicator of a definitive sentence. The original methods devised to determine a DECL were:

TABLE 10

Some Conditions for Definitives

| | Remarks | Vb Suffix | Examples |
|---|---|---|---|
| Pres-Simple Forms: | | | |
| A. ITV | | | Dogs bark. |
| B. IRR-PRES | | | Dogs unwind. |
| C. Vos | Gerund | | dogs enjoy hunting. |
| E. Vos | Adj | | Dogs act strange. |
| F. Vos | Noun_Ph | | Dogs resemble their owners. |
| IS-BE Forms: | | | |
| A. Is_Be | IRR_PPART | | Houses are built/broken. |
| B. Is_Be | IRR_PRES | ers, ed | Dogs are forgivers. |
| C. Is_Be | Noun_Ph | | Dogs are animals. |
| D. Is_Be | Adj_Ph | | Dogs are slimy. |

These are now replaced with the following:
These 3 conditions must be met for the statement to be a possible DEFN:
  Is_Declaration: The statement must parse via the declaration pattern.
  !Decl_Deter: This flag is set off by pronouns in the subject, demonstratives in the subject or a definite article ("the") in the subject.
  (Is_Be||Pres_Vb): Is_Be indicates the verb is an Is_Be verb. Pres_Vb is set for all present verbs.
If all 3 of these conditions is met, we possibly have a DEFN.
  1. Dogs are animals.
  2. Parsed by the DECL pattern.
  3. No pronouns in the subject (she is blue), no demonstratives in the subject (that dog is blue), no definite articles (the dog is blue).
  4. "is"=Is_Be verb.
Dogs are animals.=POSS_DEFN
If any of these 3 conditions is not set, we have a DECL.

1. Dogs are Animals.

| Stack+0 | BEG_CLS | <CLS> 0 |
| Stack+1 | POSS_DEFN | dogs are animals. |
| Stack+2 | BEG_SUBJ | <SUBJ> |
| Stack+3 | T_NOUN | dogs (1639) |
| Stack+4 | END_SUBJ | </SUBJ> |
| Stack+5 | SUBJECT | dogs |
| Stack+6 | BEG_PRED | <PRED> |
| Stack+7 | T_VERB | are (1000) |
| Stack+8 | ACTION_PRES | (action in present) |
| Stack+9 | VB_PLURAL | (plural) |

-continued

| Stack+10 | T_NOUN | animals (1626) |
| Stack+11 | VB_GER | animals |
| Stack+12 | CONVEY_ONGOING | (progressive) |
| Stack+13 | ISNT_CNDX | (1626) |
| Stack+14 | END_PRED | </PRED> |
| Stack+15 | PREDICATE | are animals |
| Stack+16 | END_CLS | </CLS> 0 |

Parse-to-Neuron Mappings

Figure 22:
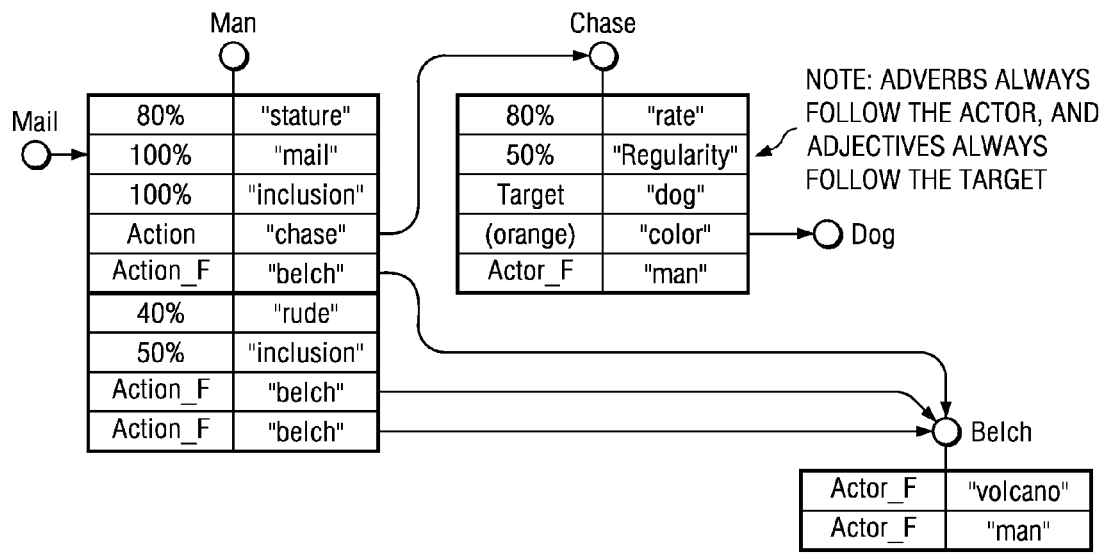
FIG. 22 illustrates sample relational connections.

Referring to FIG. 22, there are illustrated sample relational connections. The following example sentences are parsed (as definitive sentences) and are then used to permanently create neural relationships. The groups of boxes, the Man and the Chase neurons, are relational connections stored with the respective neuron.

This example shows how two sentences on the same general topic (e.g., men), defining what certain men are like. It also demonstrates what/who is known to be capable of belching.

FIG. 22 uses some of the values from Error! Reference source not found. below.

TABLE 11

Interpretation of Relational Weights
TABLE OF RELATIONAL COMMANDS

| Weight Item | Neuron Index | Remarks |
| --- | --- | --- |
| (See Remarks) | "how" | |
| (See Remarks) | "what manner" | |
| R_ACTION | Verb Neuron | Used by any neuron to specify action to take if relationals enable. This must be the last relational of an AND set. |
| R_ACTION_F | Verb Neuron | Same as R_ACTION, but terminates a list subset. |
| R_ACTOR | Noun Neuron | Used by verb neuron to indicate who fired this relational set. This must be the last relational of an AND set. |
| R_ACTOR_F | Verb Neuron | Same as R_ACTOR, but terminates a list subset. |
| R_CDX ±0 ... 100% | Emotion Neuron | Degree of influence/coupling.: 100% is full suppression. |
| R_CDX, ±0 ... 100% | "regularity" | 0 == Never, 50% == Sometimes, 75% == Often, 100% = Always |
| R_CDX, ±0 ... 100% | "inclusion" | 0 == None, 15% == Few, 50% == Some, 100% == All. If the level of inclusion is 100%, relational is superfluous and may be removed. |
| R_CDX±0 ... 100% | Wiring Neuron | Degree of influence/coupling.: 100% is full suppression. |
| R_DO | Verb Neuron | Direct Object indicator |
| R_ELT | Noun Neuron | Membership in a class (e.g., on 'dog' for "dog is an animal". |
| R_GAMUT (0-31) | Any Neuron | Gamut table of 1-32 entries follow. |
| R_IDO | Verb Neuron | Indirect Object Indicator |
| R_IMPLIES±0 ... 100% | Any Neuron | % degree of similarity to the target neuron. ("Dogs are animals" ==> 100%, "Cows may fly" ==> 30%). |
| R_INHIBIT±0 ... 100% | Any Neuron | % inhibition of firing target neuron, even if other relationals enable it. |
| R_NOT | Any Neuron | Complements present composite conditions set. |
| R_POSSN, ±0 ... 100% | Noun Neuron | % of ownership. ("Dogs mostly have hairy coats."); |
| R_PREP | Verb Neuron | Preposition (see examples below) |
| R_PREP | "when" | May be BEFORE, AFTER, etc. 50% ==> now. |
| R_PREP | "where" | May be IN, OUT, UP, DOWN, ABOVE, BELOW, etc. |

Examples of Implies and Possession

Figure 23:
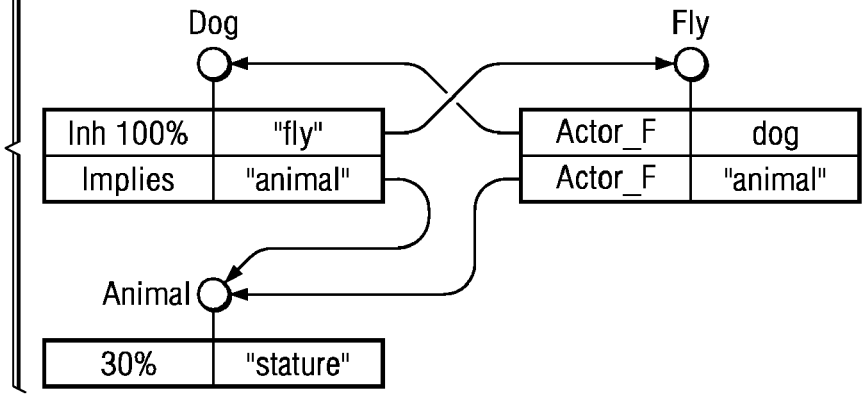
FIG. 23 illustrates implied relationals in linkages.
Figure 24:
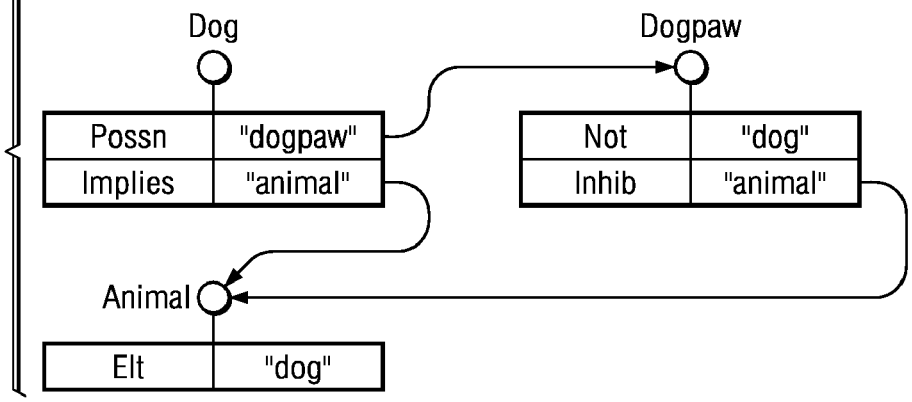
FIG. 24 illustrates the "not" relationships.

Other examples of relationships established using the relational records of Error! Reference source not found.1 is shown in FIG. 23, particularly illustrating the R_IMPLIES (100%) case and the NOT (inhibitor) case. The linkage codes may be intermixed within either the noun or verb neuron relationals.

Example of Not (Negation)

Figure 27:
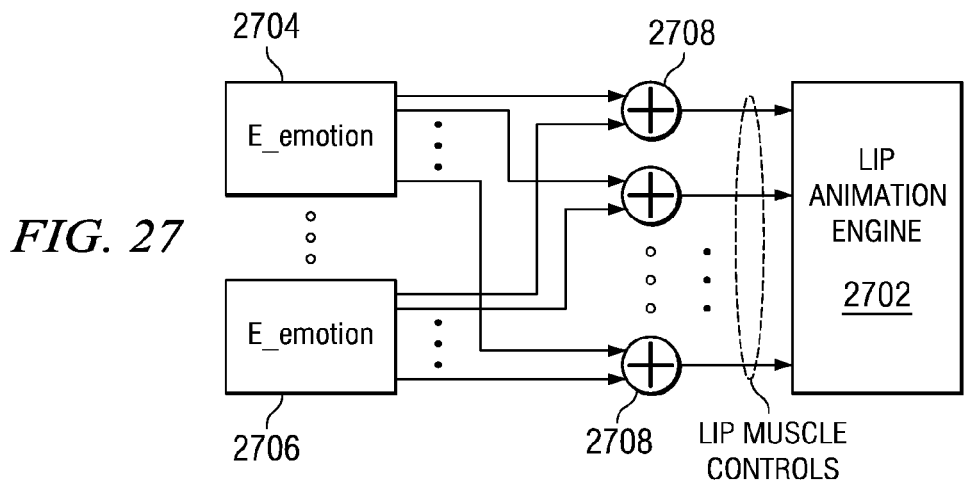
FIG. 27 illustrates a diagrammatic view of how the emotion neurons interface with an animation engine.

Use of negation is primarily an 'inversion' operation. For example, in FIG. 27, dogs are established to be animals (via Implies), and to have 'dogpaws' (via Possn). The constraint is put on dogpaws (via Not) that inhibits 'animals' from turning on unless 'dog' is hardly firing.

That is, Not complements (subtracts from 100%) the present recognition level of 'dog'. If we don't think the object we're looking at is a dog, i.e., the firing level for 'dog' is only 20%, use of a Not then inhibits 'animal'.

Sleep-Time Cleanup

For a given neuron, there may be many sub-lists of relationals that are identical, replicates of each other learned for the same fact re-learned at a later date. There may also be sub-lists that are virtually identical, except perhaps for a relatively small difference in the weights used.

To condense such sub-lists and reclaim the space, a 'background job' can be run while the brain is sleeping or otherwise not occupied. This operation can go in and remove the redundant linkage, adjusting the weights to other neurons to a suitable compromise value.

Animation of Emotion

Figure 25A:
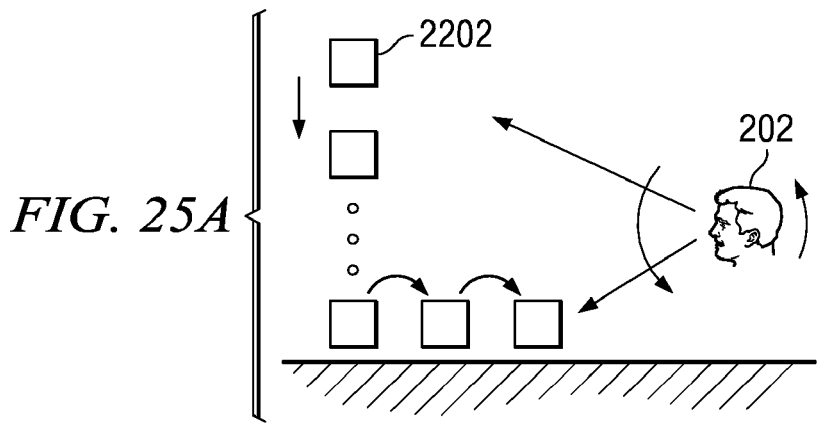
FIGS. 25a-25c illustrate a diagrammatic view of two different animation sequences utilizing the brain.
Figure 25B:
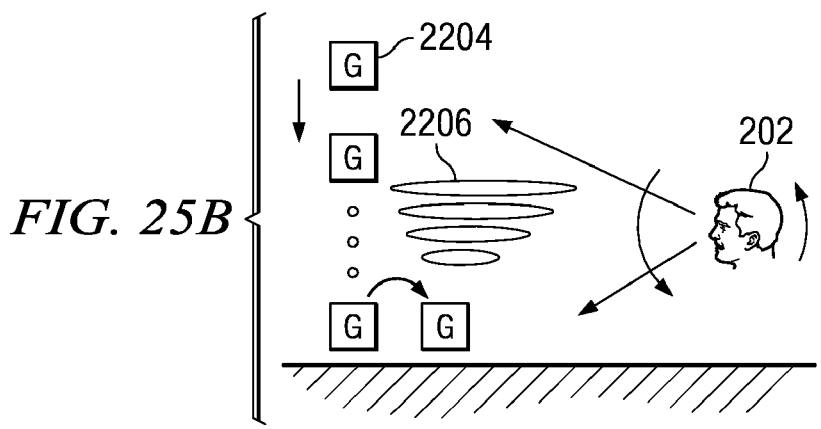
Figure 25C:
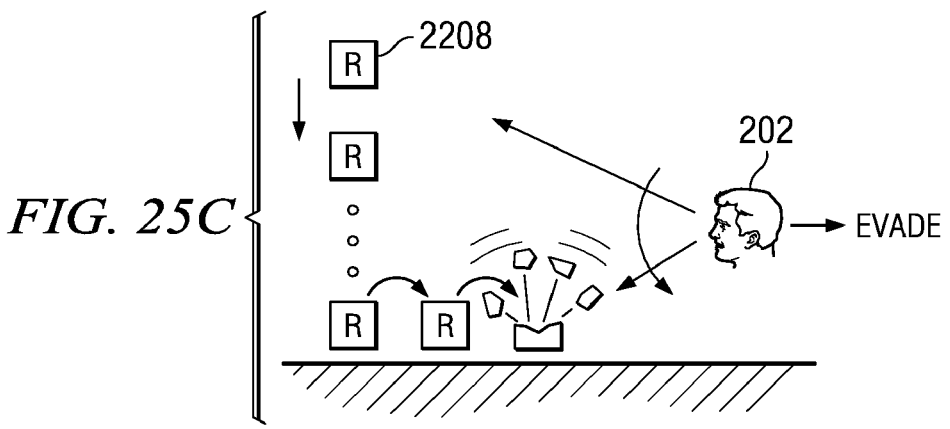

Referring now to FIGS. 25a-25c, there is illustrated a sequence of animations that illustrate the initial concept of imparting emotions to a character. In the animation of FIG. 25a, a box 2502 is dropped into the environment of the character 202. This box 2502 is a generic box and will elicit nothing more than curiosity. This emotion of curiosity will be reflected (although not shown in detail in this figure) by some type of facial expression change. This could be opening of the eyes, tightening of the lips, etc. Further, the eyes of the character 202 are first directed upward toward the box 2502 at the upper portion of the screen and then are animated to follow the box 2502 to the bottom surface and then as it bounces along the surface. The character 202, at this time will exhibit nothing more than curiosity as the box 2502 bounces and may indicate this as some type of pleasant experience. However, this is generic.

With reference to FIG. 25b, there is illustrated a diagrammatic view wherein a specific instance wherein a green box 2504 is dropped from a height and bounces one time and then the animation generates a "Christmas tree" morph 2506. This Christmas tree morph 2506 is indicated to the user by a predetermined indication, as a pleasurable experience. The character 202 will, as with FIG. 25a, move the visual access with the green box 2504 and will recognize the box 2504 as being green. Based upon prior experiences, the recognition of the box 2504 as being green will result in the expression of an emotion of pleasure on the animated face of the character 202. This may be just a slight expression indicated primarily in the fact that it considers the box 2504 beautiful. Whenever it considers the box 2504 beautiful, it indicates a certain amount of morphing to express a response to beauty. However, when the morph 2506 occurs, then the expression of pleasure is animated onto the face of the character 202 by a particular morph 2506 and the strength of this pleasure is a function of the size of the morph 2506, the distance of the morph from the user, etc. This will be described in more detail herein below. Thus, the expression can change as the box 2504 falls, as the recognition is generated that it is a green box, and there may also be an anticipation or expectation that the morph 2506 will occur. This, of course, as will be described herein below, depends upon prior experiences. If the user had a prior experience that the box 2504 would morph into the Christmas tree morph 2506, then the character 202 would anticipate some type of pleasure as the box 2504 bounced the first time and there would be an expression of pleasure, albeit probably small, before the morph 2506 occurs. When the morph 2506 occurs, a much more pleasurable morph would occur. This morph could be an increased smile, an opening of the eyes, drawing back of the cheeks, etc. As will also be described herein below, this morph is basically the control of various facial muscles in the animated face of the character 202.

Referring now to FIG. 25c, there is illustrated an alternate embodiment wherein an un-pleasurable event occurs, this being an un-pleasurable morph. This is illustrated with a red box 2508 falling into the environment of the character 202. The character 202, with the animated version thereof, will move its visual access from the upper portion down to the lower portion and watch the box 2508 bounce twice before it explodes. This explosion will induce the emotion of fear which will be morphed onto the face of the user and this will also cause certain animated movements in the character 202. This is termed an "evasion" response. In the simplest matter, the evasion may be a turning away of the head. The evasion and the emotion are basically two different things, but they are morphed together. Initially, when the character 202, based upon past experience, recognizes that the box 2508 is a red box, the character 202 may have an initial indication of the emotion of fear. This will be expressed in possibly a slight morphing of the face to represent fear. This could be a tightening of the lips and opening of the eyes. At this point, the emotion of fear is a minimum morph, as a red box could be interpreted as many things, for example, a Christmas present, etc. However, a prior experience indicated to character 202 (by assumption) that red boxes explode, especially when they fall from a certain height. Also, there is an expectation that this particular red box 2508 will explode on the second bounce. Thus, as the box 2508 falls, and after two bounces, a predetermined delay, fear will increase somewhat as a result of an expectation, this being before the actual explosion of the box 2508. When the box 2508 explodes, then fear is intensified. All of this intensity is accumulated and will be expressed by the control to the facial muscles of the animated face of the character 202. Further, there will be an evasion animation to the movement of the character 202. As the intensity increases, the eyes may open wider and there may be a "grimace" on the face. This grimace will increase and the head will turn away from the explosion as a result thereof. If the explosion were in front of the character 202, the character might turn and retreat. Whether it is right or left is not important. However, if it was interpreted that the box 2508 fell to the right of the character, the animation would cause the character 202 to turn to the left and move to a point of safety in its environment.

Referring now to FIGS. 26a-26h, there are illustrated various animated portions of the face. Typically, the face is comprised of a plurality of geometric points which are typically defined by the vertices of triangles. These define the various "hooks" that can be correlated to muscles in the actual human face. Typically, these animation engines utilize some type of geometrical representation of a 3D model of a character and they provide various points on each feature that can be moved in three dimensions. Typically, these points are moved relative to a common reference axis, such as the center of the head. As the head moves, the relationship between this particular point and the center is maintained. For example, if all that was required to express emotion was to move the left corner of the lip upward to create a smile, that point would be moved up relative to some reference point in the head and this would be maintained when it was moved. In one standard, the MPEG-4 standard, the face is defined as a node in a scene graph that includes facial geometry ready for rendering. The shape, texture and expressions of the face are generally controlled by the bitstream containing instances of Facial Definition Parameter (FDP sets) and Facial Animation Paramater (FAP sets). Upon initial or baseline construction, the Face Object contains a generic face with a neutral expression, the "neutral face." This face is already capable of being rendered. All it needs is the various controls to effect particular feature points. The FAPS will produce the animation of the face: expressions, speech, etc. If FDPs are received, they are utilized to transfer the generic face into a particular face determined by its shape and (optionally) texture. These are all very standard procedures and many of the procedures can be utilized and are anticipated, although not described.

Figure 26A:
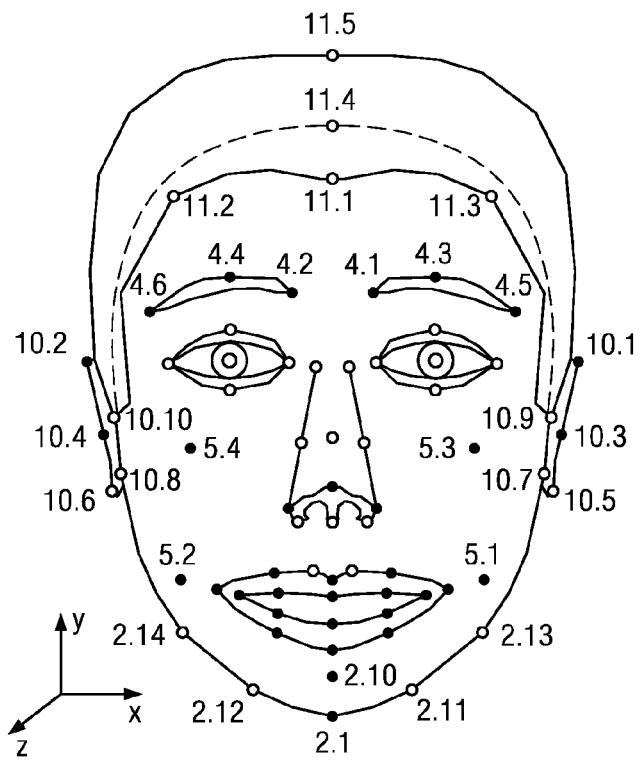
FIGS. 26a-26h illustrate the feature points in the facial muscles for an animated character.
Figure 26B:
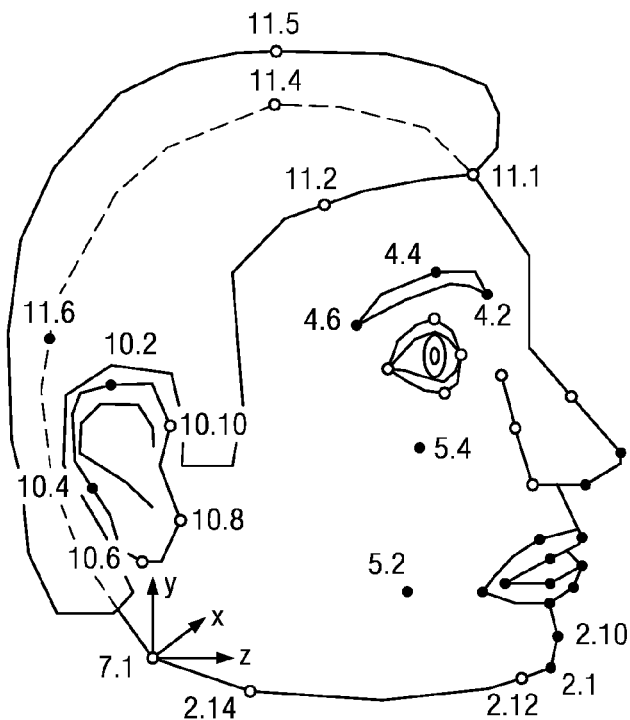
Figure 26C:
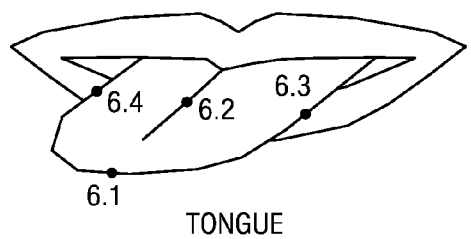
Figure 26D:
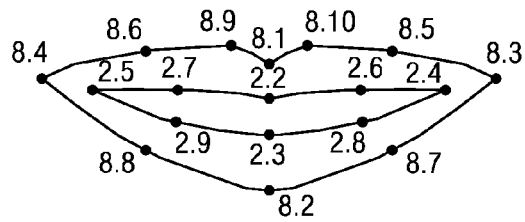
Figure 26E:
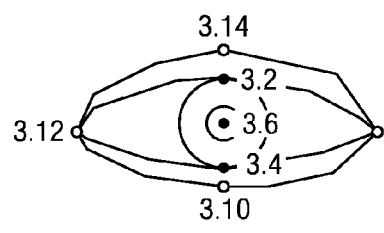
Figure 26F:
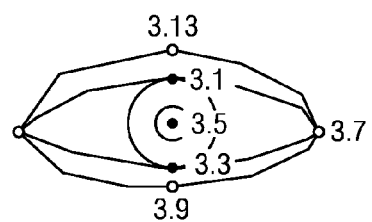
Figure 26G:
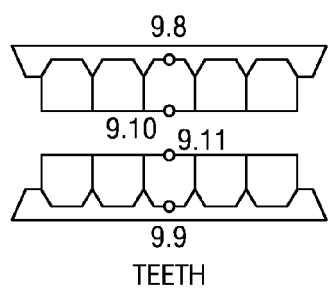
Figure 26H:
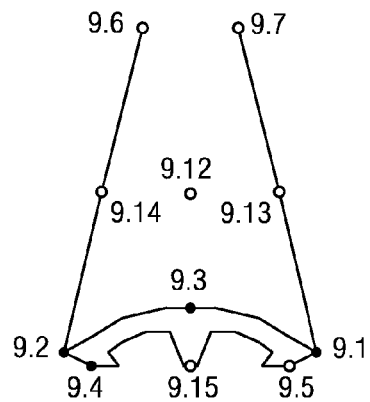

Returning to FIGS. 26a-26h, it can be seen that FIG. 26a illustrates a forward profile of a face with the various feature points disposed thereabouts for cheeks, lips, nose, eyes, eyebrows, etc. FIG. 26b illustrates a side view. There is illustrated a point "7.1" that represents a vertice of the various axis of movement of the head itself. This is a reference point upon which substantially all of the points are referred. FIG. 26c illustrates the feature points for a tongue, which is a morph that can be created, whereas FIG. 26d illustrates the feature points for the mouth, i.e., all of the points of the lip. FIGS. 26e and 26f illustrate the right and left eyes and the various morphs, such that the eyes can be opened and closed. FIG. 26g illustrates the feature points for the teeth, such that the teeth can be opened and closed. FIG. 26h illustrates a feature point illustration of the nose with the various points that can be moved. In general, the parameters that control this, the FAPs are based on the study of minimal perceptible actions that are closely related to muscle action. In this one embodiment disclosed, which is indicated as not being limiting, as are many other aspects, there are typically 68 parameters that are categorized into 10 groups related to points of the face. This is illustrated in Table A.

TABLE A

FAP groups.

| Groups | Number of FAP's in the Group |
|---|---|
| Visemes and expression | 2 |
| Jaw, chin, inner lowerlip, cornerlips, midlip | 16 |
| Eyeballs, pupils, eyelids | 12 |
| Eyebrow | 8 |
| Cheeks | 4 |
| Tongue | 5 |
| Head rotation | 3 |
| Outer lip positions | 10 |
| Nose | 4 |
| Ears | 4 |

The FAPs represent a complete set of basic facial actions, including head motion, tongue and mouth control. They allow the representation of natural facial expression. They can also be used to define facial action units.

In general, the FAPs define the displacements of the feature points in relation to their positions in the neutral face. In particular, except that some parameters encode the location of the whole head or the eyeballs, a FAP encodes the magnitude of the feature point displaced along one of the three Cartesian Axes. This is illustrated in, for example, Table B.

TABLE B

FAP description table.

| # | FAP Name | FAP Description | Units | Uni/Bidir | Pos Motion | Grp | FDP Sub Grp Num |
|---|---|---|---|---|---|---|---|
| . . . . . . | . . . | . . . | . . . | . . . | . . . | . . . | . . . |
| 3 | Open_jaw | Vertical jaw Displacement (does not affect mouth opening) | MNS | U | down | 2 | 1 |
| 4 | Lower_t_midlip | Vertical top middle inner lip displacement | MNS | B | down | 2 | 2 |
| 5 | Raise_b_midlip | Vertical bottom middle inner lip displacement | MNS | B | up | 2 | 3 |
| 6 | Stretch_l_cornerlip | Horizontal displacement of right inner lip corner | MW | B | left | 2 | 4 |
| 7 | Stretch_r_cornerlip | Horizontal displacement of right inner lip corner | MW | B | right | 2 | 5 |
| 8 | Lower_t_lip_lm | Vertical displacement of midpoint between left corner and middle of top inner lip | MNS | B | down | 2 | 6 |
| . . . . . . | . . . | | . . . | . . . | . . . | . . . | . . . |

Thus, all that is required is some type of control that determines a change in position with respect to a particular feature point. As noted herein above, for example, if a smile were to be desired, the feature points in FIG. 26d, the left corner "8.3" and the right corner "8.4" would be moved upward and backward relative to the face and relative to the reference point of the head. This would cause a smile. Of course, also there would be some movement of the cheek, for example, the point "5.2" and the point "5.1" in FIGS. 26a and 26b. The intensity of this movement, i.e., the amount of the "muscle pulled" is defined by the amount of the emotion that is to be expressed. An alternative to use of FAPs is to map the emotional expressions directly to one or more facial muscle Referring now to FIG. 27, there is a block diagram illustrating how an emotion can be mapped into various portions of the animation engine. In this example, there is referred to a single engine as merely the lip animation engine, an engine 2702. This lip animation engine 2702 is operable to represent the various facial muscles illustrated to control the lips for the purpose of a smile. Of course, there will also be a cheek animation engine, a teeth animation engine, and an eye animation engine, among others, in order to express any particular emotion. For the purpose of this disclosure and for the purpose of simplicity, only the lips will be discussed with respect to multiple emotions.

There are illustrated two emotions, although there could be many emotions that would provide some type of muscle control to the lips. These are an emotion 2704 and an emotion 2706. The emotion 2704 may be pleasure and emotion 2706 may be fear. Each one of these emotions will provide multiple outputs, one for each muscle in the lip animation engine 2702. For example, in one embodiment, there are 44 muscles or "feature points" in one exemplary animation system just for the purpose of controlling the face. If the pleasure emotion, for example, emotion box 2704, wanted to express a certain amount of emotion, then the intensity of certain muscles would be generated. This is in effect a mapping function of an input into, for example, a "smile." Each of the outputs would provide a certain level of "intensity" to the muscle that would be input into an associated summing node 2708, there being one summing node 2708 for each of the outputs. The second box 2706 may represent a different emotion, for example, fear. This may result in different muscles being manipulated in a different direction, some in a negative direction, some in a positive direction. This would be for the purpose of generating, for example, a "frown." Additionally, each of the emotion blocks 2704 and 2706 could represent different emotions. For example, there might be the concept of beauty and pleasure that resulted from a particular sequence occurring within the proximity of the character 202. Each of these would affect the muscle in a slightly different manner, and the summing nodes 2708 will sum up the intensity levels. For example, it might be that the pleasure emotion results in a certain intensity to the smile to raise the left corner of the lip upwards. The beauty emotion node may result in the same expression of emotion, which, when summed, will increase the level of "pull" on the left corner of the lip. This pull will be increased as the sum of the intensities of both emotions which one would expect in a normal human's expression of the combination of two such emotions.

Figure 28:
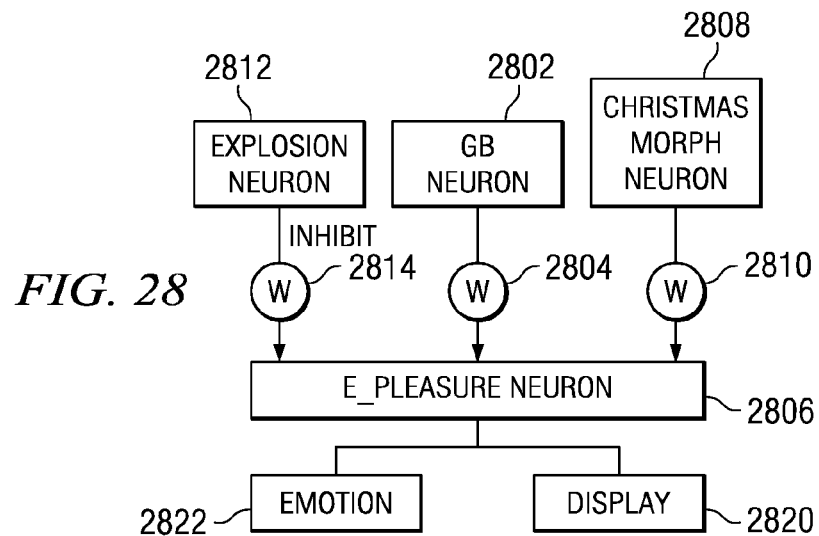
FIG. 28 illustrates a diagrammatic view of one set of neurons associated with one animation sequence.

Referring now to FIG. 28, there is illustrated a diagrammatic view of the various neurons that may be associated with the green box falling into the space. There is provided a green box neuron 2802. This green box neuron 2802 is a neuron that has associated with it various relational aspects to other neurons in the system that it had learned to be linked to or related to. As will be noted herein below, this neuron is not necessarily linked to any other output neuron, such as the pleasure neuron, the fear neuron, etc., unless there is some reason to be linked thereto. However, there is some prior experience in this illustration, wherein the green box neuron 2802 was linked to the pleasure neuron. There will be a weight 2804 associated therewith, this weight being for the purpose of modifying the output of the green box neuron 2802. This weight is, essentially, a multiplier. The output of the green box 2802 neuron is a representation of a level of recognition of the green box neuron 2802. For example, if the green box neuron 2802 were faintly recognized, i.e., it were a shade of green, then the intensity may not be that high. Therefore, the height of this recognition could vary. The multiplier that is part of the weight 2804 is utilized to basically modify how strong the link is between the green box neuron 2802 and an emotional neuron, a neuron 2806 defined as the neuron associated with pleasure. The strength of this multiplier is a function of multiple things. There may be a predetermined expectation (not disclosed in this figure) that sets this weight 2804 to a certain level. Pleasurable experiences, i.e., history, can also make this multiplier stronger. Further, if a green box were disposed a distance away from the character 202, this multiplier may be decreased also by distance, i.e., this modifies the strength of the link. Therefore, the output of the weight 2804 will be a combination of the multiplicand and the strength of the recognition. This is input to the pleasure neuron 2806. Additionally, the Christmas morph is represented by a neuron 2808. This also will have associated herewith a weight 2810 that can also modify the effect or the strength of the length that the Christmas tree morph has to the neuron 2806. This, again, can have the weight value or multiplicand effective by the distance of the Christmas morph and box, the intensity of the morph, etc.

There is also provided an additional neuron, this is associated with an explosion in a neuron 2812. This neuron 2812 is a neuron that will have many relationals associated therewith, as will be described herein below, but this will have a learned response or predetermined response that will cause a suppression of emotion to occur. This, as will be described herein below, is different than a trigger feature for the neuron. This inhibit feature may also be weighted by experience, distance, etc., through a weight 2814. In a sense these weight values for weights 2804, 2810 and 2814 are "qualifiers".

As will be described herein below, there are trigger events that occur when the green box is recognized, when the Christmas morph occurs, and when an explosion occurs. These are all input to the neuron 2806 and result in the output of an emotion, which has other purposes in the system and also for the display of that emotion. These are two different aspects, as they are present for certain periods of time. Thus, there may be a display portion 2820 that determines how the display is expressed and for what length of time and the intensity thereof, etc. This is the aspect disclosed herein above with respect to FIG. 27. There will also be an emotion aspect 2822 that will provide an output that can be utilized for other purposes in the system. The other aspect is a level that represents an internal temporal level that is determined by the trigger inputs which will cause the level to increase for a period of time.

Figure 29:
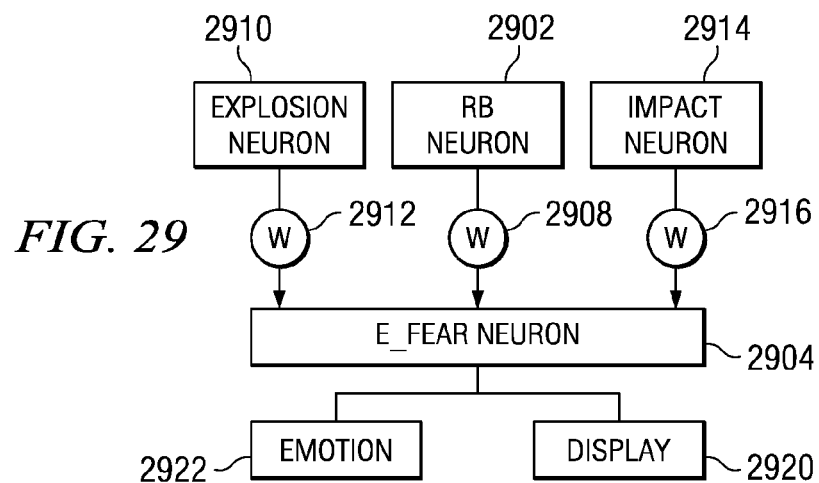
FIG. 29 illustrates a diagrammatic view of a second neuron structure for illustrating a second animation.

An alternate embodiment, that associated with the red box, is illustrated in FIG. 29. In this embodiment, there is provided a red box neuron 2902 that is linked to a FEAR neuron 2904 through a weight 2908. There is also an explosion neuron 2910 that is linked to the neuron 2904 through a weight 2912. There is noted that this explosion neuron 2910 has a relational link and not an inhibit link, as is the case with respect to the embodiment of FIG. 28. This positively affects fear. There is also illustrated, as an addition, an impact neuron 2914 which is linked to the neuron 2904 through a weight 2916. This could be the situation where, for example, the red box were falling, and it was recognized as a threat and the impact of the box onto the surface had a relational link to the fear neuron 2904 to cause some type of response. The FEAR neuron 2904 is also linked or mapped to the display through a block 2920 and to an emotion output through a block 2902.

Referring now to FIGS. 30*a* and 30*b*, there is illustrated a diagrammatic view of how the controls are facilitated through each of the pleasure neuron 2806 in FIG. 28 and the fear neuron 2904 in FIG. 29. First, the first occurrence in time would be the existence of the box, i.e., the green box in this example. This would occur at a point 3002. At this point in time, the brain will go through a recognition procedure in what is referred to as a "visual coretex" portion thereof, to recognize that not only is it a box but it is a green box. This recognition then goes to the green box neuron 2802 and generates a trigger input 3004 that is input to the pleasure neuron 2806 of FIG. 28. The intensity of this trigger is determined by the recognition level of the green box and of the weight. As noted herein above, it may be that multiple occurrences of this green box resulted in a fairly strong weight due to the fact that it had been previously recognized as pleasurable. Thus, there will be the result that a certain level of the trigger will occur. What this will do is it actually will cause the emotion box 2822 to output a pleasure emotion. This causes the output level or intensity level therefrom to rise to a certain level at a peak 3006 and then decay. The purpose of this is that any experience creates an initial indication of pleasure which then fades due to "boredom" for example. However, when the Christmas tree morph occurs, at a point in time 3008, the Christmas tree morph neuron 2808 will trigger. The intensity of this trigger is affected by the recognition of the morph, the size of the weight 2810, etc. However, it is indicated as being a more pleasurable experience than the occurrence with the green box by itself. This creates a trigger with a higher intensity level output from the weight block 2810. This causes a second increase in the pleasure emotion output from the box 2802 causing the level of intensity to increase to a peak at a point 3010 which then will decay off. Again, in order to represent things such as boredom, etc. The output of the emotion box 2822 is operable to provide to the rest of the brain information about that associated emotion. This temporarily varying level can be used to affect various discussion thresholds utilized by various partitions of the brain core. For example, it could affect decision outcomes such as "I feel like it."

In addition to the output box 2822, there is illustrated the output of a box 2820, that associated with the drive to the display. As noted herein above, when the pleasure neuron triggers, it will be mapped to many feature points on the animated face of the character. These feature points all have a mapping that will be associated with each other in a relative manner. The intensity of all of these features will be correlated with a single output. However, it is noted that emotions will have a longer decay time, i.e., they will exist longer than the actual display or expression of that emotion. Therefore, the expression of a particular emotion may occur faster and decay faster than the actual existence of the emotion. This is illustrated by the fact that the trigger or the existence of the box at the trigger 3004 will result in a faster rise of the output of the pleasure neuron associated with the display, i.e., has mapped to the display at a point 3014. This will decay off relatively fast compared to that associated with the retention of the emotion itself and then it will again rise when the trigger for the Christmas morph will occur, thus rising up to a point 3016 and then decaying. In essence, this is similar to the fact that an individual would begin a smile when it first recognized the box and then the smile would decrease until the Christmas tree morph would occur. However, the emotion of pleasure would be retained and the entire experience would be pleasurable. Therefore, a longer decaying time for the emotion output would be represented relative to the display of that pleasure.

Referring now to FIG. 30b, there is illustrated the concept of the inhibit operation. It can be seen that the pleasure emotion, for a single pleasure trigger 3020 will result in a rise time for the pleasure emotion output from box 2822 at a rise time of, in one example, 1.5 seconds. The decay time for this, with nothing else, might be approximately 2 minutes. After two minutes, the emotional state of the particular character 202 would be back to neutral. However, before such two minute decay has occurred, some event occurs that would inhibit pleasure, i.e., the existence of an explosion. This is represented by a trigger 3022. At this point in time, the pleasure state with the pleasure emotion will be forced to decay at a rate of 0.75 seconds, i.e., fairly quickly. The same will occur with respect to the display, as not only will the inhibit action remove the controls to the facial muscle associated with pleasure, but the fear neuron will cause (possibly) an opposite action for the facial muscles. They will essentially be independent but only in summation. The concept is basically that any control of the facial muscles associated with the pleasure neuron is removed faster than the decay time associated with the diagram illustrated in FIG. 30a.

Referring now to FIG. 31a, there is illustrated a diagrammatic view of a summing operation of a particular neuron. Each of the feeding neurons, i.e., the ones that have a relational link with a particular emotional neuron will have the trigger aspect thereof input to a summing junction 3102. Each of these will be input and provided as an output. The output is illustrated in FIG. 31b. This sequence of pulses in FIG. 31b is the result of the summing junction output and these are input to the boxes for generating a display output or an emotion output. The emotion output is illustrated in association with the display box and it can be seen that each of the pulses in FIG. 31b will result in small increases in the facial muscles for a particular display of emotion which all correlate to the pulses. The various intensities of the pulses will affect, of course, the intensity of the control that is passed on to the facial muscles. As noted herein above, all that is required is a single input of intensity which will be mapped through all the muscles in a relative manner, i.e., if there are 44 muscles in the face, a smile will be displayed which will be relative as to the various facial points. Additionally, there will be an inhibit block 3106 that will be directly input to both the emotion block and the display block to affect the operation thereof, i.e., will cause the outputs thereof to be inhibited or moved to zero.

Figure 32:
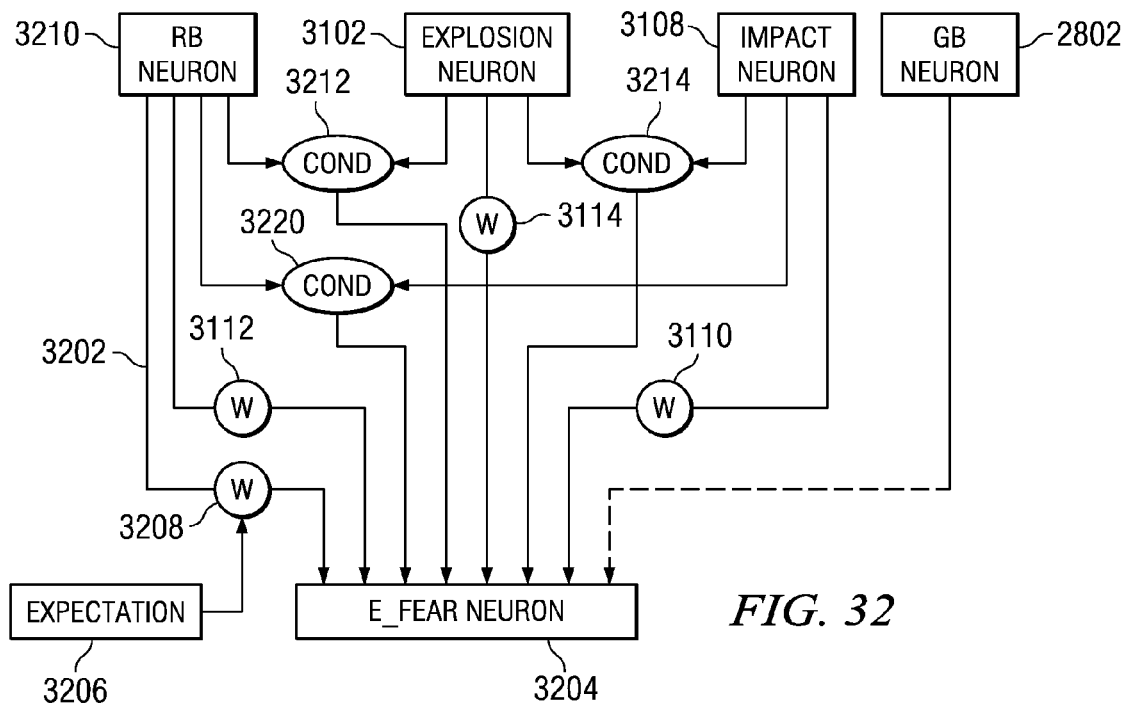
FIG. 32 illustrates some typical relational links to an emotional neuron.

Referring now to FIG. 32, there is illustrated a diagrammatic view illustrating a more detailed view of a group of neurons that constitute input neurons that are linked to an emotional neuron 3204. This illustration is for the red neuron with the explosion and the impact, that was associated with FIG. 33, wherein like numerals refer to like features in the two figures. The red box neuron 3210 is linked to the FEAR in neuron 3204 in multiple ways. There is a direct link through the weight 3208, but there is also provided a link that illustrates an expectation. As noted herein above, there is an expectation that there will be an explosion after the second bounce of the box and this will induce fear even if the box does not explode. It would not be as great as when the box exploded, but there would be some apprehension or anticipation of an event occurring that constitutes a threat. This is provided by a link 3202 through a weight 3208. This is weighted by the weight 3208 which is controlled by an expectation block 3206. This expectation block 3206 will define how much fear will be expressed and "when" the fear will be expressed. This expectation block is typically a delayed feature. For example, it might be that the character 202 is trained with an experience from a previous falling of the red box that occurred 3.2 seconds after recognition of the red box. This would not be as great as the explosion of the red box, but it would still cause an expression of fear, i.e., a slight morphing of the muscles of the face in an animation to represent fear. In a similar matter, the explosion neuron 3102 has a direct weight 3114 associated therewith and the impact neuron 3108 has the direct weight 3110 associated therewith. However, there is also a conditional neuron 3212, an unconditional relationship or link between the explosion neuron 3102 and the red box neuron 3210. In essence what this is, is a link between the red box neuron 3210 and the FEAR neuron 3204 that is controlled by the actual explosion itself. This can be expected, since that explosion in and of itself will induce fear, the intensity which is defined by the weight 3112 and the recognition of that explosion (the input to the weight block 3114), but there will also be some relationship between the fact that it is a red box and an explosion. This is provided by a weight or multiplier block 3212. This basically results in a link between the red box neuron 3210 and the FEAR neuron 3204, the intensity of which is defined by the output of the explosion drive 3102. The reason for this is that the explosion neuron may be recognized but it may be a distant explosion, such as fireworks. Therefore, the red box may also be at a distance and the conditional relationship between the two, i.e., an explosion and a red box, might not be as fearful due to the distance or even the level of the explosion, i.e., a small explosion might result in less fear for a red box. Thus, a conditional relationship between various neurons would exist. There might be a conditional relationship between the explosion neuron 3102 and the impact neuron 3108. This is represented by a conditioned weight block 3214. This may be the fact that an impact neuron, when indicating an impact, would have a stronger effect on fear in the presence of an explosion as opposed to with no explosion. Although not illustrated, there could be an expectation of explosion associated with the impact neuron also. The impact neuron 3108 will also have a conditional link associated with the red box neuron 3210 to create a link from the red box neuron 3210 and/or impact neuron 3108 to the fear neuron 3204. This will be weighted by a conditional weight block 3220. This will be the situation where, if there were no explosion, just the fact that there was an impact, i.e., the box suddenly hitting the floor, this would create some threat and, therefore, some level of fear in and of itself.

Figure 33:
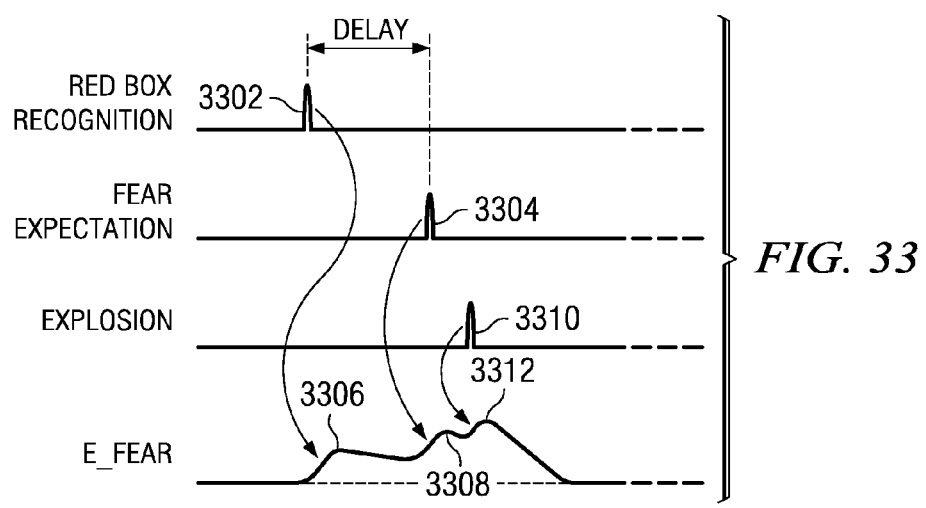
FIG. 33 illustrates a timing diagram for the neural structure of FIG. 32.

Referring now to FIG. 33, there is illustrated a diagrammatic view of how expectation in the block 3206 affects the output of, for example, the emotion block 3204. The red box is recognized at a trigger 3302, the intensity of this trigger, again, indicating the level of recognition of the red box and the weight associated therewith, i.e., the fact that the red box is recognized creates some type of output based upon prior experience. Thereafter, there is an expectation of fear that is learned, i.e., the red box had exploded before, had impacted loudly, etc. This will have been learned and, if it occurred a certain period of times, a delay, after the box had dropped before, this will create an expectation of an even that will occur later. This is illustrated by a trigger point 3304 that will output a trigger at an intensity defined by a multiplier and level of recognition. This first recognition 3302 will cause an initial indication of fear at a point 3306 which will rise, peak and then decay. However, before decay occurs, the fear expectation will jump up, be expressed, and will cause a second rise at a point 3308. This will rise upward until the actual explosion, indicated by a trigger point 3310, at which time a second rise in the emotion output at point 3312 will occur. If the explosion didn't occur, the fear will still be expressed (the display aspect is not illustrated for simplicity purposes).

Referring now to FIG. 34, there is illustrated a flowchart for setting the link or defining the link between the red box neuron and the emotional neuron. As will be described herein below, the red box neuron is a neuron that develops basic relational links based upon certain things that happen relative to the environment of the character 202. Until some action occurs to create the relational link, the relational link will not occur in that neuron. In the flow chart of FIG. 34, the initial condition is that there is no experience as to a red box falling creating any output or expression of fear. Thus, after initiation of the flow chart at a block 3402, it flows to a block 3404 indicating the red box falling. Of course, this may have some association with curiosity, it will cause the head to move the visual axis along with the box, causing the head to move. However, there will be no expression of fear. After the red box falls, there will be an explosion, indicated by the box 3406. However, this explosion will still cause no fear as there is no experience that an explosion caused any problem. However, as noted herein above, an explosion could be fireworks and this could be pleasurable, such that it would not be indicated as a threat. Thus, there has to be a determination that a threat exists. This is indicated in a threat assessment block 3408. If it is determined that this is a threat, as indicated by a decision block 3410, then the program will flow along the "y" path to a function block 3412. It should be noted that explosion is normally associated with a threat and this type of neuron, when set off, will be be associated with that type of evaluation. Of course, it could be fireworks and this would not be considered a threat. When the threat does occur, however, there must be some type of expectation or link set. As such, the expectation of an explosion will be created by sitting, first a link and, second, a weight. To do this expectation or linking, the program will flow to a block 3414 to set the red box-to-fear relational link and then to a block 3416 to set the weight value. This weight value is a value that can be modified by the nearness of the box or how far away the box is, such that the weight can be a different value. For example, an explosion more relatively close by and, then the fear would be expected to be higher. The operation will flow to a box 3417 to set the expectation-to-fear link. This is a time delay link that is the function of the relationship between the time that the explosion occurred and the time that the red box fell. It should also be understood that a red box could fall that did not itself explode but there were an explosion from some other source. There will still be some type of expectation but it would be much less than that associated with the situation wherein the red box itself exploded. This level of expectation or the fear that is to be expressed as a result of it will be set by the weight value, indicated by block 3418. Thereafter, there must be defined a conditional link, that associated with the relationship between the explosion and the fact that the red box occurred. This is indicated by function blocks 3420 and 3422. As noted herein above, this conditional link could be strengthened by the fact that it was the red box that exploded as opposed to something in the red box exploding or something behind the character exploding. If it were the red box, it would be the strongest conditional link and, if it were something else, it would be a much weaker conditional link. Once all of the weights have been set, i.e., all the relational links have been set and the expectation or anticipation links, the operations flow to an END block 3424.

Referring now to FIG. 35, there is illustrated a flow chart depicting the second flow through, i.e., the situation wherein the red box falls and the character 202 has prior experience as to what this means. This is initiated at a block 3502 and then proceeds to a function block 3504 wherein the red box is recognized. Once recognized, due to the fact that there is a predetermined link between the red box and the emotional neuron, there will be a trigger generated for input to the fear, as indicated by block 3506. Operation flows to function block 3508 to determine if there was any anticipation of some even occurring after the red box fell. This anticipation may be the fact that prior experiences resulted in an impact or prior experiences resulted in an explosion. This will result, if such an anticipation or expectation exists, in the triggering of a fear event, as indicated by block 3510. This will be delayed by a predetermined amount of time. This is a delayed trigger. Operation then flows to function block 3512 for the recognition of an explosion. Once recognized, this will again generate a trigger for input to the fear emotion neuron, as indicated by block 3514. Of course, the recognition of the explosion requires that there be some relationship and/or to provide a trigger to the fear neuron. Operation then flows to a function block 3516 to adjust the expectation and relational weights as a result of the current experience. For example, it may be that the last time the explosion occurred it was at a distance and generated a small amount of fear. This time, it may be that the distance was closer and this would result in an adjustment to the weights, i.e., this distance aspect would be a qualifier to the weights. After this operation, the program will flow to a function block 3518 to trigger the evasion, i.e., the animation of the character to take certain steps to evade this particular unpleasant situation. Operations will then flow to an END block 3520.

Figure 36:
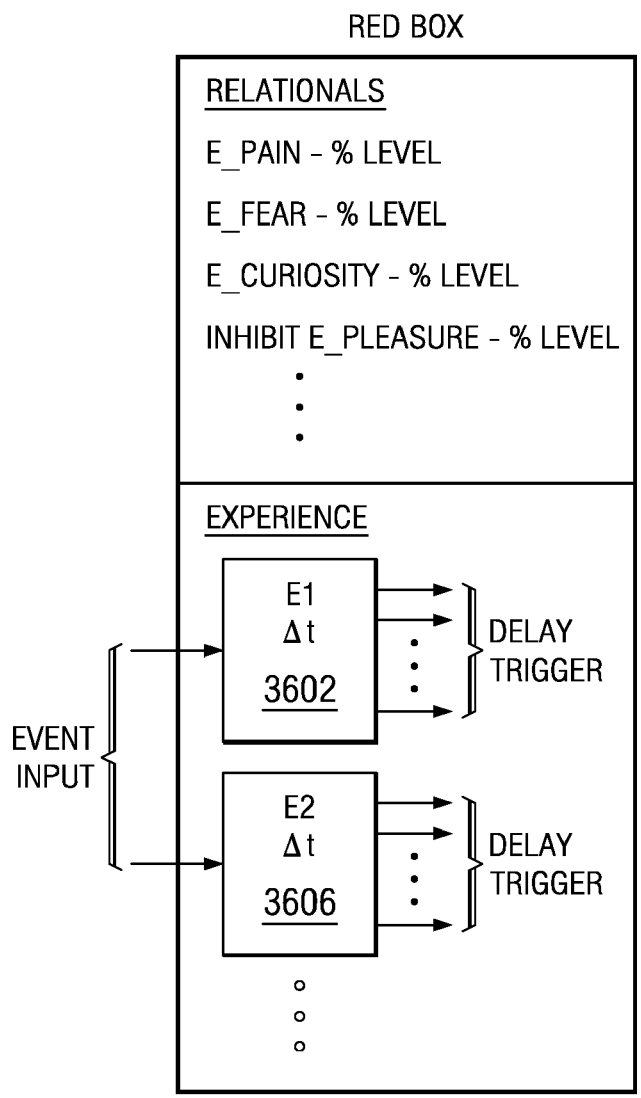
FIG. 36 illustrates a diagrammatic view of a neuron after construction.

Referring now to FIG. 36, there is illustrated a diagrammatic view of a neuron that illustrates how a neuron looks after it is built. This is illustrated for the red box neuron which basically has a large amount of data or relational links associated therewith. These relational links, as described herein above, only exist once it is learned. In this form, the first portion indicates the inclusion of relationals, this one, for example, will have some possible relationship between pain, i.e., when the red box is recognized, then a pain neuron (previously not described) would be triggered. This pain neuron would result in the expression of pain in the facial muscles, for example. The fear neuron would also be triggered, as described herein above. There is also illustrated a curiosity neuron that would be triggered in a certain manner. Again, it will be triggered when the event occurs, as that is when the relationship is present. Further, this particular relational would possibly have an inhibit neuron that would inhibit the pleasure neuron. Each of these relationals will have some type percent level out of the parameters that may be associated with the particular manner in which the percent level is generated. For example, the recognition level of the particular event may result in the particular percent that will be output. This percent level is a function of the recognition level and the weighted value in association with the experience or anticipation aspect. This aspect is one that is a temporal aspect which typically has some type of delay associated therewith. Once recognized, there will be some delay in an animated expression being morphed onto the character 202. There are illustrated two experience blocks 3602 and 3606, although there could be many more built. Each of these is a result of a particular event input, i.e., an output from an impact neuron or an output from an explosion neuron. Once this input is received, there will be a time delay associated with that particular experience block which time delay will result in the output of a relational link to a particular emotion neuron. Each of these experienced boxes can build a relation with respect to a particular emotion neuron. For example, the block 3602 could have a link to the pleasure neuron, the beauty neuron, etc. Each of these links would occur a predetermined time after the event input occurred, i.e., they would have a delay trigger.

Figure 37:
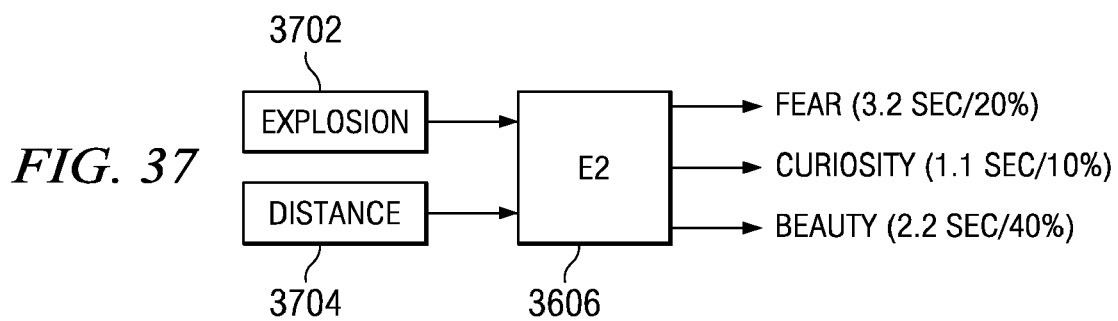
FIG. 37 illustrates a detail of the expectation or anticipation of the neuron of FIG. 36.

Referring now to FIG. 37, there is illustrated a detail of the block 3606. In this detail, there is illustrated a relational link with the fear emotional neuron, the curiosity emotional neuron and the beauty emotional neuron. When an explosion occurs, as received from an explosion neuron 3702, this will trigger an event. However, the experience neuron can have multiple qualifiers, of which one is illustrated, the distance qualifier in a block 3704. This distance qualifier will define the explosion as occurring near or far. If it is near, this might increase the weight to the fear neuron and it might increase the input to the curiosity neuron, as it is a much closer event. However, if the explosion were not close, i.e., the distance indicated as being far away, then the fear might be at a relatively low level. The fear neuron was initially triggered or created due to the fact that there was an explosion that was assessed as a threat, which threat then created the link. This link was created approximately 3.2 seconds after the explosion had occurred in the prior experience. Thus, there will be a link created that results in a time delay of 3.2 seconds. However, the level of this fear trigger is a function of the distance, i.e., it will be weighted at a level that is a function of the qualifiers. The curiosity neuron may have been trained as a result of some event that indicated that the box created a level of curiosity. This may have occurred, due to a prior experience, after approximately 1.1 seconds. However, a level of curiosity for any box, be it red or green, might be fairly low. The farther the distance, the lower it might be. Beauty, on the other hand, is an emotional neuron that may have occurred in prior experience 2.2 seconds after the occurrence of the explosion, i.e., for example, with respect to a fireworks show. In that situation, if the distance is far away, beauty would be higher, and if it were closer, beauty would be lower. This would be the qualifier that would be created in this situation. In the example illustrated in FIG. 37, the explosion was not very close and, as such, the fear neuron was only at 20%. The curiosity is relatively low but it occurred prior to either of the fear or the beauty neurons being triggered. The beauty neuron was triggered approximately 2.2 seconds after the event, but its level was fairly high, due to the distance being relatively far away. There, of course, can be many different qualifiers and many different links created to a particular emotional neuron.

Referring now to FIG. 38, there is illustrated a block diagram of how explosion, from the explosion neuron 3702 can be associated with a physical threat. Explosion, by its nature, is set for a fixed relationship with respect to a block 3802 that assesses the physical threat. The link is created and there is a weight 3804 associated therewith which defines that explosions are physical threats but presets this to a certain level. When the explosion occurs, it indicates to a physical threat neuron 3802 that the physical threat must be assessed. Further, there will be a link that has a strength that is defined by the distance block 3704. In general, an explosion by itself will have a certain level, but this level can be increased or decreased, i.e., varied, by the distance. The closer the distance, the larger the input to the physical threat block 3802. The result of this will be that, since there is a physical threat, an evasion animation must be put into effect. Of course, the physical threat could be assessed as doing nothing, as there is no opportunity to do anything, i.e., there is no place to run or the character is restrained.

Referring now to FIG. 39 there is illustrated a sequence of events for the evasion. In the first block, the character 202 is presented with a red box 3902 which is basically in the environmental space of the character 202. Initially, the character 202 is not looking at the box when it appears but, the appearance thereof will create curiosity at a relatively high level and fear at a relatively low level as there has really been no recognition of the red box. Once the red box is recognized, by turning the head through an animation toward the red box, as indicated in the second animation, and then not find curiosity neuron but, however, increasing the output to the fear neuron to a level of possibly 40%, by example. Thereafter, the red box could explode, as indicated by a morph 3904 and what happens then is that the fear will rise up to a 90% level, as explosion is relatively near. This will then cause an evasion animation to occur wherein the character will be instructed to turn away from the explosion and possibly move to a safer place.

Character Movement

Applying the Brain Model to Emotional Animation

Much of the application of the Brain Model agent to the movie animation field is taken up with the development of training of the agent. A relatively smaller part involves the interpretation and connection of neural emotional content to existing animation software.

Fundamental to the application is that the Brain agents are first trained to be actors that empathize with the script characters, and then act out their roles. This is exactly the same process as for human actors. The best human actors are those which combine talent with the training and focus of that talent. The Brain agent-actors will exhibit skills that vary with the depth of their training.

For this application, training is a multi-layered effort, just as for a child. While the training for each level can be developed in parallel, the training (texts) are applied in the proper sequence. Low-level training is foundational for all training to follow. The training sequence is as follows:

Language and Vocabulary
Experiences and Emotional Responses
Skill-Set Training as an Actor
Training in Story Prerequisites
Training in the Story Line
Training for the Character Role
Performance-Tweaking of the Character Dialog Script The final step is not truly training, but as for a human, the agent will require specific direction in some cases to deliver the results demanded by the director.

Much of the training, such as that required to be an actor, can be replicated for other agents, to create additional actors.

Applying the Brain Model to Character Movement

Presently, 3D animations are created using automated tools on a frame-by-frame basis. In many portions, the start and ending positions of a character are created, and interpolation is used to move them between those positions over multiple frames.

An application of the Brain Core, in addition to the expression of emotion, is the training of Brain agents, not as actors, but as the specific characters being emulated. There is value in both cases, and the primary difference is one of training. (The actor case is a more generic training that can largely be implemented one time, and then used multiple times.)

The advantage of specific emulation of a character is that the character can also be instructed (in the script) as to what physical actions to take, in what time and in what sequence. If it does not get it right, the director can indicate how to do it differently on the next take. In this way, considerable time and cost by the cartoon animators can be eliminated. Film creation is no longer frame-by-frame, but event-by-event.

Training of the Brain Agent-Actor

Two different approaches can be taken to implementing the agent-actor for emotion animation. Each has its own value.

Train the Agent to itself be the character of the script.
Train the Agent to be an Actor, empathizing with the script character.

Either of these methods is valid. Training an agent to specifically be the character of the script involves imparting to him/her both the knowledge and emotional experiences of the script character. Many emotional experiences can be added to the training by point-and-click methods. This uses a library of background psychological experiences with their resulting impact on the character's interaction with the world around it.

The downside to this training becomes somewhat more complex, and is based on an interactive scenario-based modeling. It is expected that this will be a somewhat more expensive approach to implement during the production of the movie, but will give more accurate implementation.

The second approach is to first train the agent to be an actor, someone who empathizes with the assigned script character and plays out the script. The agent is then given the script to interpret, and emulates the most-likely emotional response of the character. The training to be an actor can be replicated in other Brain agents, to create additional actors. The downside of this approach is that generated emotion is likely not as accurate, in that is through empathy rather than by direct experience.

Static Training—the Fast-Learning Model

The normal learning method for a human being is the emotional interpretation of information. It is also subject to present body chemistry. Human learning normally involves reinforcement of that information over a period of several weeks, or the presence of strong emotion that indicates strong importance of the information. The Brain Model operates in the same way (but is not subject to body chemistry).

In this mode, the interpretation of new information is subject to previous emotional experiences with context-related background knowledge. As such, what is trained is not necessarily what is received and remembered. The acquired knowledge cannot be trusted as if it came "from God," but may be reasonable and have an authentic feel to it.

The Brain Model has a second mode of training that bypasses history and emotional interpretation. It is labeled as static training, and assumes that the original information is pristine and accurate, as if it came "from God." It is a one-time training that does not need reinforcement or emotional content to make it believable. It is rapid and creates accurate consistent results in the accumulated background knowledge. So learned, the knowledge will still be interpreted or related to in the emotional context of the moment, when the agent brain is in operational mode.

Most training of raw knowledge for the Neuric Brain Model ("NBM") agent is done in static mode, as appropriate.

The following sections describe typical training.

Language and Vocabulary Training

The English language has a structural vocabulary of about 1000 words that are foundational and unchanging from generation to generation. These include the many irregular verbs, verbs such as 'eat' and 'ate' whose form changes with tense. These structural words are built into the Brain Model and do not need to be trained. They also include prepositions, articles, numbers and other basic word forms.

Likewise, rules of English grammar and the parsing of sentences are built into the Brain Model. They require no further training. However, the vocabulary of routinely-used English words must be trained, along with their relationships to each other. It is the recording of relationships between words that makes up facts, and these must be trained.

For example, consider the sentence:

A 'movie' is a sequence of single-frame pictures that are projected at a rate of 24 or 30 frames per second."

This defines a set of three facts about movies, including definition of the word. Basic vocabulary words are described like this in ordinary English to train an NBM agent.

Experiences and Emotional Responses

Human beings develop emotional responses to events they experience. The emotional responses of Brain Model agents develop in an identical manner. However, those responses can also be defined by training.

Scores of specific emotions that a human being is capable of have been tabulated or defined, and each has been assigned a specific name. These can then be tied into the static-mode training of an agent. After such training, the subsequent encountering of a related experience may evoke that emotional response.

For example, consider this static emotion training:

Showing approval of a person increases P_Approval. Approval is shown by positive affirmation (e.g., "Great job!"), by a smile, pat on the arm or a hug.

Showing disapproval of a person decreases P_Approval. It is shown by a frown or scowl, by negative affirmation (e.g., "That was a bad job!"), and by being ignored.

Note: The senses of encouragement and feel-good are also influenced by approval, but the conditional relationships between emotions are implicit in the Brain Model and do not have to be explicitly trained. Therefore, the impacts of approval on P_Feel_Good and P_Encouragement need not be explicitly trained. An agent's gender suitably alters interrelationships of emotion to the context of the moment.

Skill-Set Training as an Actor

Just as an actor must be trained, the Brain agent must be trained in the skill-set of being an actor. This includes empathy with the script character's background, but in the light of the agent's own experience and training. For this reason, the agent's background training for experiences and emotional responses will sometimes first be altered to allow proper empathy with the character of the script.

The concept of the camera is as central to animation as it is for television and film. Multiple cameras at different positions or focal lengths are used. While this first application of the NBM to animation is for the visual communication of emotion, only the face, eyes and head are involved in the process. The remainder of the animation body is ignored for this purpose. Just as an actor must be aware of his head position and orientation relative to the camera, the NBM actor gets trained to also be aware.

The strength of the Brain Model is that it learns in the context of the moment; in this case, a central part of that context is that it is emulating a specific character for the script.

A snippet of such training text might be:

When your character is frustrated, roll your eyes upward as he might do. Even so, do not turn your back on the camera unless directed to do so. While engaged in an animated conversation in which both of you are emotionally connected with the content, engage him with your own eyes. The script will cue you as to his position relative to you, and which camera is active. Be aware of this as the script progresses.

Because this initial application does not include body animation and motion, incidental training not relevant to that is simply ignored. Other than that, much of the actor-training script can be relatively stock training materials for human actors.

Training in Story Prerequisites

Any story to be animated requires that the agent-actor will have certain background knowledge.

Example, if an animation was to be done for the film, Mr. Smith Goes to Washington, the agent would need to know something about government and the election process. Here is a snippet of a suitable training script for that purpose. It is given to the agent as a simple text file:

Title: Structure of Government

The positions of people in federal government (in order of decreasing influence) are President, Vice President, Senate Majority Leader, Senator (member of the Senate), House Majority Leader, House Minority Whip, Representative (member of the House). The president and vice president are elected as a team, and serve 6-year terms. Senators are elected for 6-year terms, while Representatives are elected to two-year terms. The Senate Majority and Minority leaders are elected from among the senators in the party caucuses.

Two elected U.S. senators are elected from each state, and one Representative is elected for each 650,000 people, or so. Each state is divided into U.S. Senatorial and House districts for election purposes.

When the agent is given words it does not know, or cannot identify the usage or context of, it will ask for clarification.

Training in the Story Line

The acting out of movie script is done in the context of the story line. This is then relevant to the agent actor, to establish how to react to the overall circumstances of the story.

Training script for a portion of the story might look like:

Title: Background of 'Mr. Smith Goes to Washington'

Naive and idealistic Jefferson Smith, leader of the Boy Rangers, is appointed on a lark by the spineless governor of his state. He is reunited with the state's senior senator, presidential hopeful and childhood hero Senator Joseph Paine. In Washington, however, Smith discovers many of the shortcomings of the political process as his earnest goal of a National Boy's Camp leads to a conflict with the state political boss, Jim Taylor. Taylor first tries to corrupt Smith and later attempts to destroy Smith through a scandal. As Smith's plans collide with political corruption, he doesn't back down.

Training for the Character Role

An example of training for the character role to be played out by the Brain Model agent-actor might be:

Title: Character Background of Mr. Jefferson Smith

Jefferson Smith is a person of strong moral character. He has a vision for a national camp for underprivileged boys, where they will have a chance to develop in a healthy environment. Jefferson is honest and believes in the general integrity of people. He believes that they are similar to him in these things, and would not do things that are illegal.

Given the opportunity to be appointed to replace a U.S. senator who has died, Smith accepts the governor's appoint without thought that there are strings attached to the appointment. Each time he discovers another aspect of the double-dealing nature of the governor's appointment, he expresses innocent surprise. When he finally comes to a decision of what to do about it, he shows resolve and determination to do what he believes to be right, regardless of what other people might think.

This training is essentially a biography of the character to be acted out. It establishes the context of the acting in the light the character whose role is to be acted out. This training is likely to be done live, not in static mode.

Performing the Character Dialog Script

Performance of the script is likely best done on a sub-scene or sequence basis. The agent is given the script to read, and that same script gives it the cues to place its performance in the time-line of activity by other characters. Previous actor-training gives the essential instruction for how to interpret the script and its cues.

The director can modify the performance in "step time", giving the agent specific direction in how to alter its interpretation of the script as is normally required for human actors.

Application: Emotional Expression in Animation

The first-stage application of the Neuric Brain Model agent to movie animation is the automated introduction of emotion into facial expressions. The emotions track content and character experiences in the script. In this application, the agent "gets into" the character being portrayed. Like a human actor, the agent anticipates and mimics the emotion that the script character would encounter in the situational context. The agent must be first trained as an actor, and then trained for the script itself.

To manually add emotional expression to the characters, augmenting the positional animations, is presently a meticulous and costly burden on movie production costs. It is a prohibitive expense, so the expression of emotion in an animation is omitted.

Character agents based on the Neuric Brain Model bring a new paradigm for movie creation to the animation industry. It brings value by automating the expression of emotion. It also lays the ground work for full-character movement handling.
Application: Automated Animation of Character Movement Modern animation uses 3D wire-frame models of the script figures that are suitably "skinned" and clothed to resemble the target characters. The animators use existing key-framing technology to create start-end positions for body parts in each short animation sequence. In the present industry, a large team of animation artists (100-800 of them) manually set these positions, letting software create the frames in between.

The second-stage application of the Neuric agent to movie animation is to train the agent to fully perform all required motions in the 3D wire frame figure models. That is, the script cues that direct the character to open the door, enter the room and take the second chair at the table, it will then automatically do just that. The "motor nerves" of the model now drive the existing animation engine to implement the figure's motions. It is precisely the same as animating a mechanical robotic skeleton, but instead animates the body of the animation figure.

Character Animation

Referring now to FIG. 40, there is illustrated a flow chart depicting what occurs when a new object enters the environment of the character 202. In this scenario, the character 202 exists within a certain environment and then a new object appears in that environment, i.e., there is a perception that something has changed in the environment. The program is initiated in a block 4002 then proceeds to a decision block 4004 to determine if the new object has entered the environment. If so, the program flows to a function block 4006 to trigger the particular task list to control the animation such that the character 202 will look at the object. This particular animation has the flexibility of moving the eyes slightly to look at the object, it being understood that only a certain angle of movement will occur with the eyes before the head must turn. If the eyes move too much, i.e., they max to the right or the left, up or down, then the head will have to move in the respective direction. After the task list has been completed, i.e., the character 202 has been controlled through the animation thereof to appear to look at the object, the program flows to an END block 4008.

Figure 41:
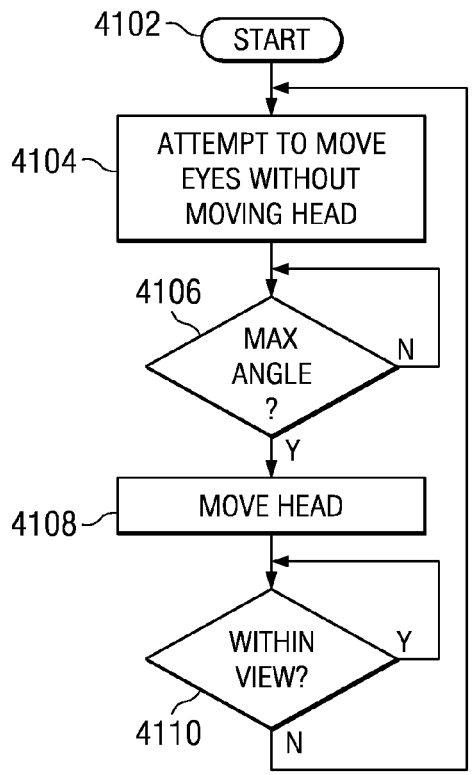
FIG. 41 illustrates a task list for moving ahead in response to perceiving new objects.

Referring now to FIG. 41, there is illustrated a flow chart depicting the task list operation of block 4006. The program is initiated at a block 4102 and then proceeds to a function block 4104 to attempt to move the eyes without moving the head, i.e., there was a certain latitude provided wherein the eyes can move a certain direction off center without moving the head. However, there is a maximum angle at which the eyes can exist and, if this angle is exceeded, as determined by a decision block 4106, the program will flow along a "y" path to a function block 4108 to move the head in the direction of the object. This can be right or left, up or down, or any direction in between. The program then flows to a decision block 4110 to determine if the object is within view, i.e., the angle of the eyes is within the acceptable range. If not, the program will flow along the "n" path back to the input of the function block 4104. As long as it is within view, the program will remain in a loop around the decision block 4110.

Figure 42:
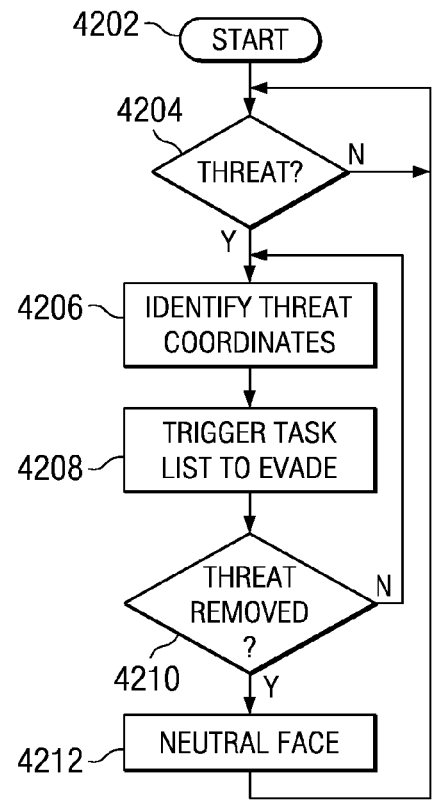
FIG. 42 illustrates a flow chart for assessing a threat in the character's environment.

Referring now to FIG. 42, there is illustrated a flow chart depicting threat assessment. This is initiated at a block 4202 and then proceeds to a decision block 4204 to determine if a threat exists. When the threat exists, the program flows upon the "y" path to a function block 4206 to identify the coordinates of the threat. The program then flows to a function block 4208 to trigger the task list for evading the threat and then to a decision block 4210 to determine if the threat has been removed after the evasion has occurred. If not, the program will continue to flow back to the input of the function block 4206. Once the threat has been removed, the program flows to a function block 4212 in order to place the expression and position of the face back at the neutral face position, i.e., staring forward with a "blank" look on the face.

Figure 43:
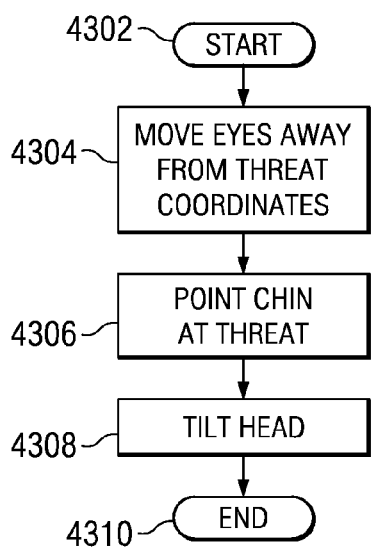
FIG. 43 illustrates a flow chart depicting the task list for evading a threat.

Referring now to FIG. 43, there is illustrated a flow chart depicting the operation of the trigger task list, which is initiated at a block 4302 and then proceeds to a function block 4304 in order to move the eyes away from the threat coordinates. Since this particular example is only limited to movement of the head, without movement of the rest of the body, the most vulnerable portions of the human body in that situation are the eyes. The normal reaction is to always move the eyes away from the threat or in general protect them in any manner possible, such as placing the hand over the eyes. The eyes are moved as far away as possible and also the chin is pointed at the threat, as indicated by function block 4306 and then the head tilted to provide the maximum angle at which the eyes will be at the most remote point away from the threat, this indicated by a function block 4308. Once this action has been completed, the program flows to an END block 4310.

State Machine Control Flags

| Conditionals (Ints) | Intent | Used By |
| --- | --- | --- |
| Cdx_Auto_Pass | Always set to 1 | (All FSM's?) |
| Cdx_Mode_Live | Mode is being changed to live. | Mode_Handler |
| Cdx_Mode_Static | Mode is being changed to static | Mode_Handler |
| Cdx_Mode_Script | Mode is being changed to script. | Mode_Handler |
| Cdx_Orientate | The neuric needs to orientate | FSM_Master |
| Cdx_Sleep | The neuric is sleeping | FSM_Master |
| Cdx_Bored | The neuric is bored | FSM_Master |
| Cdx_Idle_Timeout | Set when in idle mode too long | FSM_Master |
| Cdx_Physical_Need | Neuric has a physical need | FSM_Master |
| Cdx_Mental_Need | Neuric has a mental need | FSM_Master |
| Cdx_Spiritual_Need | Neuric has a spiritual need | FSM_Master |
| Cdx_Location_Needed | Neuric needs to know location | FSM_Master |
| Cdx_Identity_Needed | Neuric needs to know identity | FSM_Master |
| Cdx_Burst_Keyword | Holds a keyword enum value | FSM_Master |
| Cdx_Channel | | FSM_Master |
| Cdx_Desire | | FSM_Master |
| Cdx_Resolve_Thought | | FSM_Master |

| Conditionals (Ints) | Intent | Used By |
| --- | --- | --- |
| Cdx_New_Thought_Obj | | FSM_Master |
| Cdx_New_Recognition_Level | Level of object/event recognition has improved. | FSM_Decision_Process |
| Cdx_Evasion_Mode | Start up FSM_Evade. | FSM_Decision_Process |
| Cdx_Emot_Threat | An emotional threat was perceived. | FSM_Implications |
| Cdx_Resolve_Env | The Environment needs to be resolved. | FSM_Resolve_Env<br>FSM_Master<br>FSM_Decision_Process |
| Cdx_No_Input_Available | There is no current source of sensory data to use for resolution. | FSM_Sensory_Input |
| Cdx_Expected_Obj | Indicates that the object is as expected. | FSM_Resolve_Env<br>FSM_Implications |
| Cdx_Unexpected_Exper | Neuron ID of unexpected experience in our environment. | FSM_Resolve_Env<br>FSM_Implications |
| Cdx_Unexpected_Obj | Object in the environment is unexpected. | FSM_Resolve_Env<br>FSM_Implications |
| Cdx_Others_Present | Other people were present. | FSM_Implications |
| Cdx_Immediate_Threat | Object is deemed an immediate threat. | FSM_Sensory_Input<br>FSM_Implications<br>FSM_Decision_Process |
| Cdx_Obj_Identified | Object was conclusively identified. | FSM_Sensory_Input<br>FSM_Decision_Process |
| Cdx_Evasion_Unlikely | Evation is unlikely. E.g., too fast, too close... | FSM_Decision_Process |
| Cdx_New_Sensory_Data | There is new sensory data present | FSM_Sensory_Input<br>FSM_Master |
| Cdx_Get_Sensory_Data | Indicates we want to process sensory data that is available. | FSM_Sensory_Input |
| Cdx_Processing_Input | Currently processing sensory input | FSM_Sensory_Input |
| Cdx_Possible_Threat | The object is a possible threat. | FSM_Sensory_Input |
| Cdx_Resolve_Obj | An environmental object needs to be resolved. | FSM_Resolve_Env |
| Cdx_On_Collision_Course | Object is on collision course with neuric. | FSM_Sensory_Input<br>FSM_Decision_Process |
| Cdx_Env_Obj_Chg | Indicates that an object in the environment has changed states. | FSM_Sensory_Input<br>FSM_Resolve_Env<br>FSM_Decision_Process<br>FSM_Implications |
| Cdx_New_Env_Obj | Indicates that a new object has entered the environment. | FSM_Sensory_Input<br>FSM_Resolve_Env<br>FSM_Decision_Process<br>FSM_Implications |
| Cdx_New_Env | Neuron ID of new environment. | FSM_Resolve_Env<br>FSM_Decision_Process |
| Cdx_Loud_Noise | Simulated sound. | FSM_Sensory_Input<br>FSM_Master |
| Cdx_Obj_Experience | Indicates the neuric has experiences Associated with the object | FSM_Resolve_Env |
| Cdx_Do_Implications | Starts the Implications FSM | FSM_Resolve_Env<br>FSM_Implications |
| Cdx_Text_Input | Wakes neuric from sleep when text is inputted. | FSM_Master |

| To Do Flags (chars) | Usage |
| --- | --- |
| To_Do_Resolve_Thought | Initiate the Recognition process. |
| To_Do_Resolve_Obj | Initiate object resolution process. |
| To_Do_Discern_Part | Discern a part of an object. |
| To_Do_Discern_Threat | Discern the immediate threat level |
| To_Do_Resolve_Expers | Resolve the experiences and compare to expected. |
| To_Do_Set_Env_Expectations | Remember the environment entered and set expectations. |
| To_Do_Check_Expectations | Compare an object or experience with Expectations. |
| To_Do_Indentify_Object | Identify an object from discernable parts and properties. |
| To_Do_Discern_State_Chg | Processes an environment object state change. |
| To_Do_Identify_Input | Process new sensory data. |

| Finite State Machine | Usage |
| --- | --- |
| FSM_Master | Track outermost state. |
| FSM_Conversation | Track the state of conversation. |
| FSM_Resolve_Env | Track the state of resolving a delta in "Environment". |

| Finite State Machine | Usage |
| --- | --- |
| FSM_Resolve_Thought | Track the state of resolving a delta in "Thought". |
| FSM_Decision_Process | Track the decision process state |
| FSM_Implications | Track the state of the object implications process. |
| FSM_Evade | Track the evasion process. |
| FSM_Sensory_Input | Track the processing of sensory input. |

Realtime Clock (RTC) Handler

Figure 44:
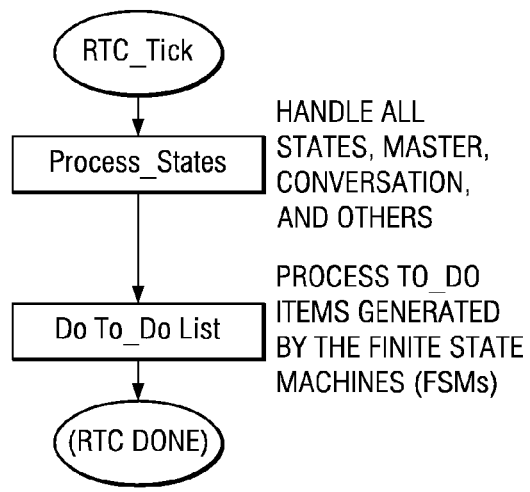
FIG. 44 illustrates the RTC flow.

Referring to FIG. 44, there is illustrated the realtime clock handler. The realtime clock interrupt happens every ten (10) msecs. Several internal counters are maintained in the Analyzer to permit selected operations to occur at regular intervals, such as ever thirty (30) msecs or every two-fifty (250) msecs (0.25 secs).

The Process_States reference systematically references all state machines to update them. Each such FSM looks at the above control flags to see if it has anything to do, and sets appropriate 'To_Do' flags if need be. The call does nothing if there is nothing to do.

The FSM_Master State Machine

Figure 45:
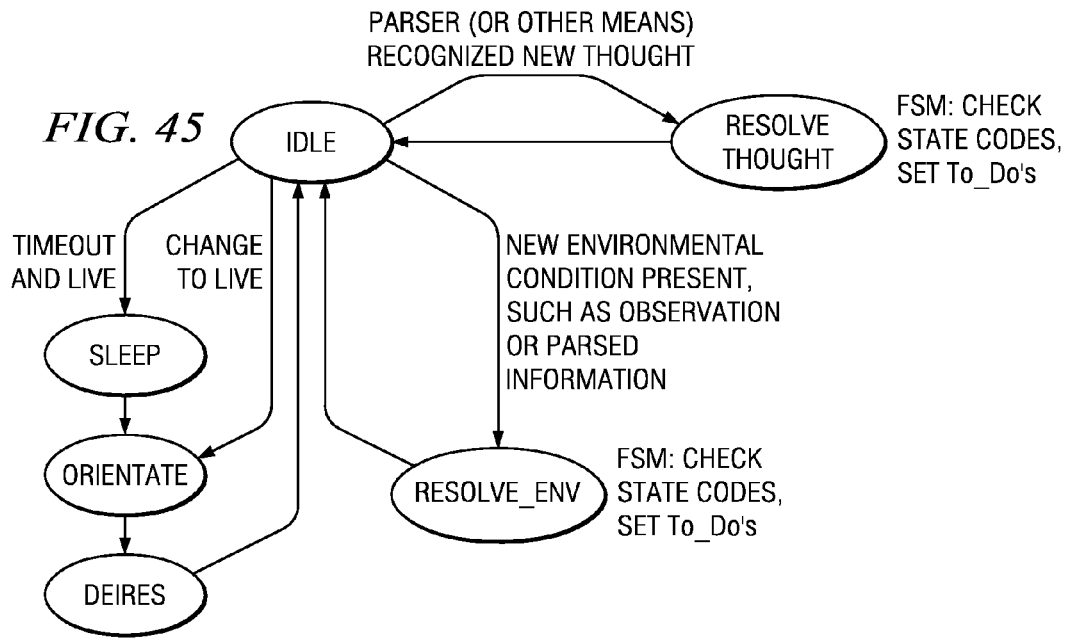
FIG. 45 illustrates the master state machine.
Figure 46:
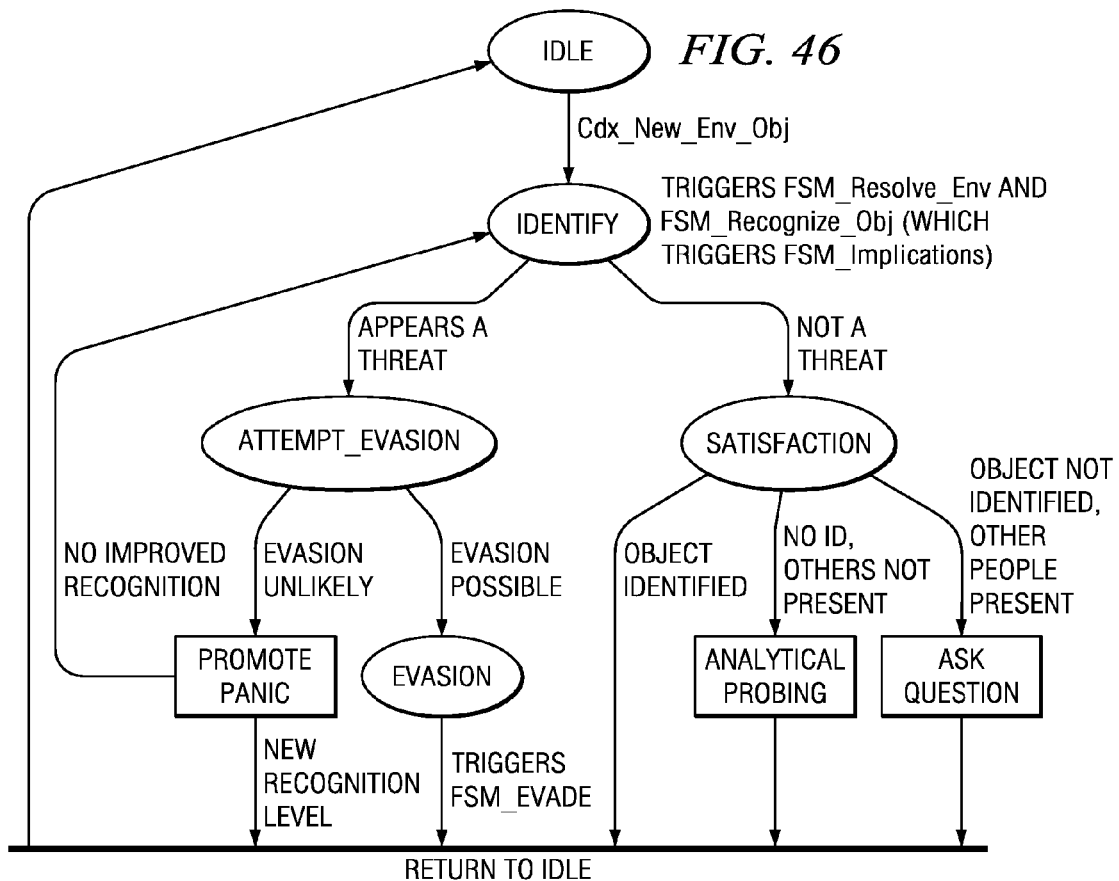
FIG. 46 illustrates the FSM Decision Process.

Referring to FIG. 45, the master FSM calls upon the RESOLVE_THOUGHT and RESOLVE_ENV FSMs to handle detailed issues related to resolving unknowns initiated from the environment or from other parts of the brain. This state machine handles mode changes between Live and other modes FSM_Decision_Processes state Machine Referring now to FIG. 46, there is illustrated a FSM Decision Process State Machine. This machine is the entry point of processing for new items encountered in the environment. It is rather the Mother of All State Machines in the information process, and kicks off a number of subordinate state machines that perform various tasks.

The IDENTIFY state triggers a cascade of three state machines, topmost of which is FSM_Resolve_Env. Between these FSMs, various elements of the recognition process are recorded as flags. Those are prefixed with Cdx_ and control the flow of other FSMs.

All FSMs have an IDLE state and remain in IDLE until a controlling flag goes true. At that point, the flag is left true until that FSM returns to its IDLE state. The FSM that originally set that flag awaits its clearing before continuing to its next state.

Threat Handling

In the IDENTIFY state, the invoked FSMs evaluate both physical and emotional threat conditions. The response is one of evasion, but if that is not possible (E.g., passage is blocked, it's moving too fast, it can't be seen . . . ), the emotion of panic is promoted. Further, if recognition is not decent, control returns to the IDENTIFY state to further identify the threat. If recognition is reasonable, the increase of panic is the only action, and the state returns to IDLE.

When evasion is possible, an FSM_Evade process is initiated to take action. When that action (E.g., jerk away, yelp, run 20 feet away . . . ) is completed, the FSM returns to the IDLE state.

Non-threat Handling

When the object is identified and is not a (known) threat, if other people are present, they will be asked a question to identify the object. If they are not present, analytical probing will be used to decide the identity of the object. After either such attempt, the FSM returns to IDLE.

The FSM_Implication State Machine

Figure 47:
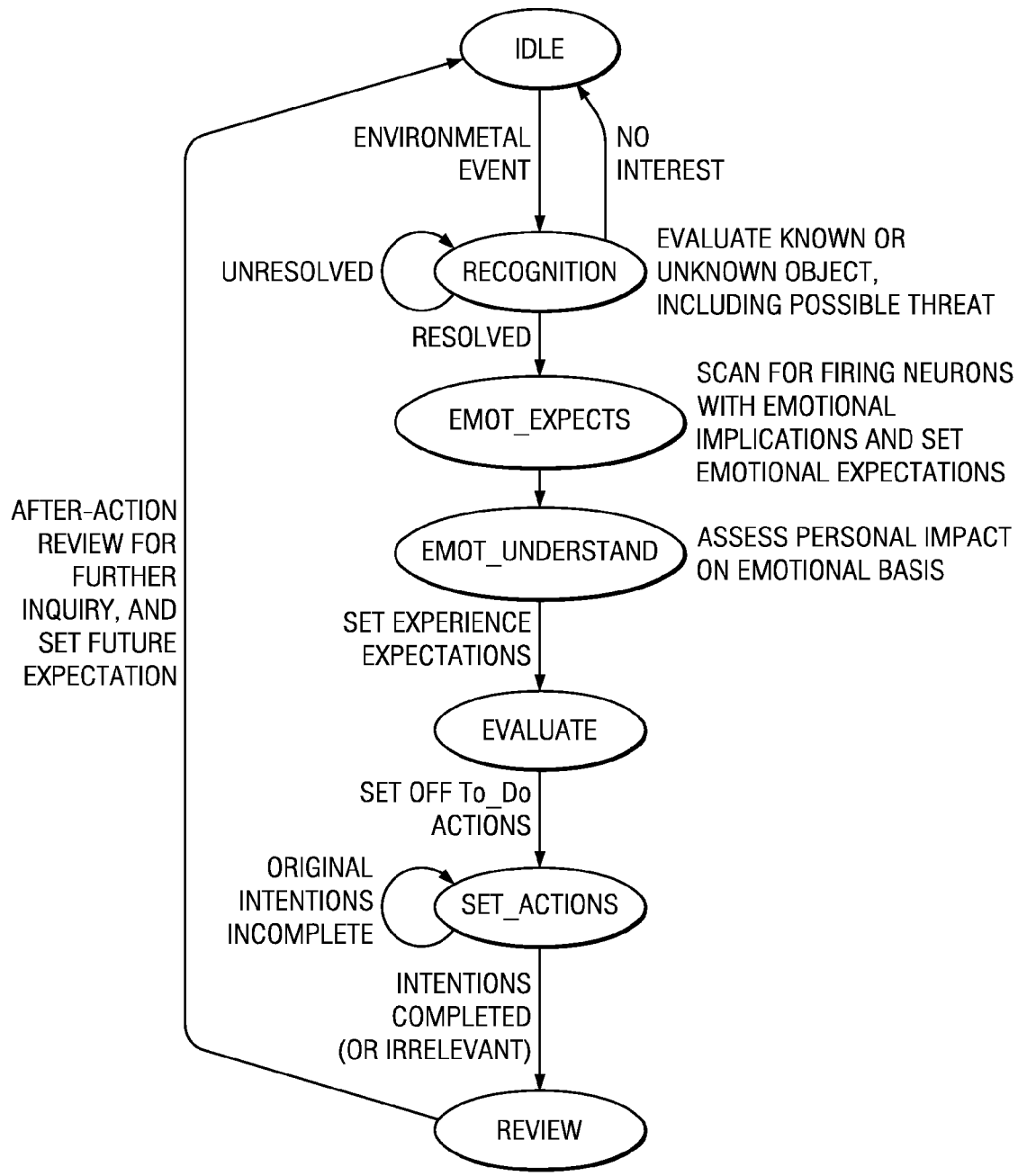
FIG. 47 illustrates the FSM implication.

Referring now to FIG. 47, there is illustrated the FSM_Implication State Machine. When it is understood that some unknown environmental event has been introduced, this FSM evaluates it and takes initial needed action.

When processing needs be suspended pending receipt of further information, that process section is placed in its own state. Processes occurring within each state are described in the sections that follow.

Idle State

The FSM_Implication State Machine stays here doing nothing until an external event occurs, such as introduction of an object into the environment.

Recognition States

The FSM_Implication State Machine attempts a cursory recognition of the object

Assess physical threat—Is it coming at me or is a known threat?

Assess emotional threat—Is it threat to well-being, honor, rightness or identity?

Assess curiosity—Are you even curious and have no interest?

Assess ordinariness—Is it ordinary or routine and understood regardless of need for action?

Assess WWWWWH—Preliminary assessment of who, what, when, where, why and how

Assess Relevance—Is it important? Does it matter?

These are made from information on hand or suggested by inspection of related firing neurons.

EMOT_Expects State

The context pool 10 may now be firing neurons that have emotional implications. Scan context pool 10 for these relevant emotional connections, some of which are only fired by _uncertainty. The FSM_Implication State Machinesets off initial firing of connected emotions as a reaction. E.g., I misinterpreted shoe laces as a black spider because I saw a tarantula recently. Most of this is done by chasing emotion relationals connected with the event, typically via the Cull_Neurons reference.

EMOT_Understand State

The FSM_Implication State Machine assesses the relevance of the event/object to current emotional state through the following steps:

Assess significance of location—Is the location significant, relevant or (emotionally) important?

Will this disrupt my intentions—Are my intentions so strong that I should be concerned of disrupting them with this event? Assess whether or not to set "_Cancel_My_Intention."

Assess emotional relevance—Is there emotional content connected to the event?

Assess emotional security—Am I emotionally secure relative to emotional threat? Possibly initiate a gripe, bluster or complaint, or lash out.

Assess physical security—Am I physically secure relative to physical threat? Jerk away and otherwise move out of the way or towards security. Assess whether or not it interrupts my footpath and set "_Cancel_My_Motion."

Assess welcome distraction—Is this a welcome distraction from my present intention (or lack of activity)?

Assess undesired disruption—Is this an undesired disruption of my present focus?

Assess emotional response—Is this due to carelessness? Is it a 'care package' arrival that fulfills me?

Evaluate State

It is now known what is had and what is being dealt with, either unknowns or known. Either way, the system sets experiential expectations. Initial reactions are now (naturally) bleeding off but it may be necessary to 'artificially' dampen selected emotion firings.

Identify all knowns—Pose question to probe each known. Move relevance of the event to the current topic of interest.

Identify facts about any unknowns—Pose question to probe each unknown area or each uncertainty.

Bleed initial reactions—(May not be needed.)

Assess impact on others—Are others affected by it? Are others hit? This is temperament-dependent, with Choleric or Sanguine having lower interests in such impact.

Set_Actions State

Decide what (else) needs to be done and then do it.

If it fills physical need—(TBD)

If it fills emotional need—(TBD)

If it fills spiritual need—(TBD)

Issue exclamatory—If others are present, optionally issue an exclamatory or other verbal response, or initiate a dialog with them about the object/subject.

If time to evaluate is relevant—The time needed to evaluate what's happening may be more than I can or want to give up. Determine what actions (or cancellations) I need to make.

Does it require something of me?—Once this is determined, assess my sense of responsibility or decide it's not my problem.

Is other intelligence involved?—If a person threw the box, should I respond? Is a defensive move (strategy) needed? If so, kick of the relevant FSM/process. _cause, _who.

Before returning from this state, the FSM_Implication State Machine ensures that all needed future activity has been initiated. If personal intention was pending when the event occurred, the FSM_Implication State Machine schedules a review to follow completion of the intention (unless the intention was cancelled during the event).

Review State

The FSM_Implication State Machine revaluates things following completion of intentions. Internal Activity: The FSM_Implication State Machine uses_learning processes, observations, conclusions, all weighted towards the emotional knowledge and experience gained. External Activity: Same as Internal, but via communication with others.

Evaluate how we are now feeling (about the event)—_guilt, _shame, _thanks, _grateful, _resentful? Schedule To_Do actions to deal with these as appropriate.

Compare outcome against preliminary expectations—Compare current emotions against the initial expectations for the experience.

Evaluate what is still unknown—If the object is yet unknown, ask questions (if others present) or remark about it as a means of soliciting understanding.

Evaluate what was learned—Form any conclusions and add relationals to the event or object, as appropriate to extend its context.

Set future expectations about the experience/event/object—Based upon the above, set future expectations for the experience.

Set resolution and closure—Set resolution by suppressing any emotional left-overs.

At this point, the subject should be considered closed, except that future events may have been scheduled to resolve otherwise-open matters. No further immediate processing on the matter should be needed, so the FSM_Implication State Machine goes idle.

FSM_Resolve_ENV

Figure 48:
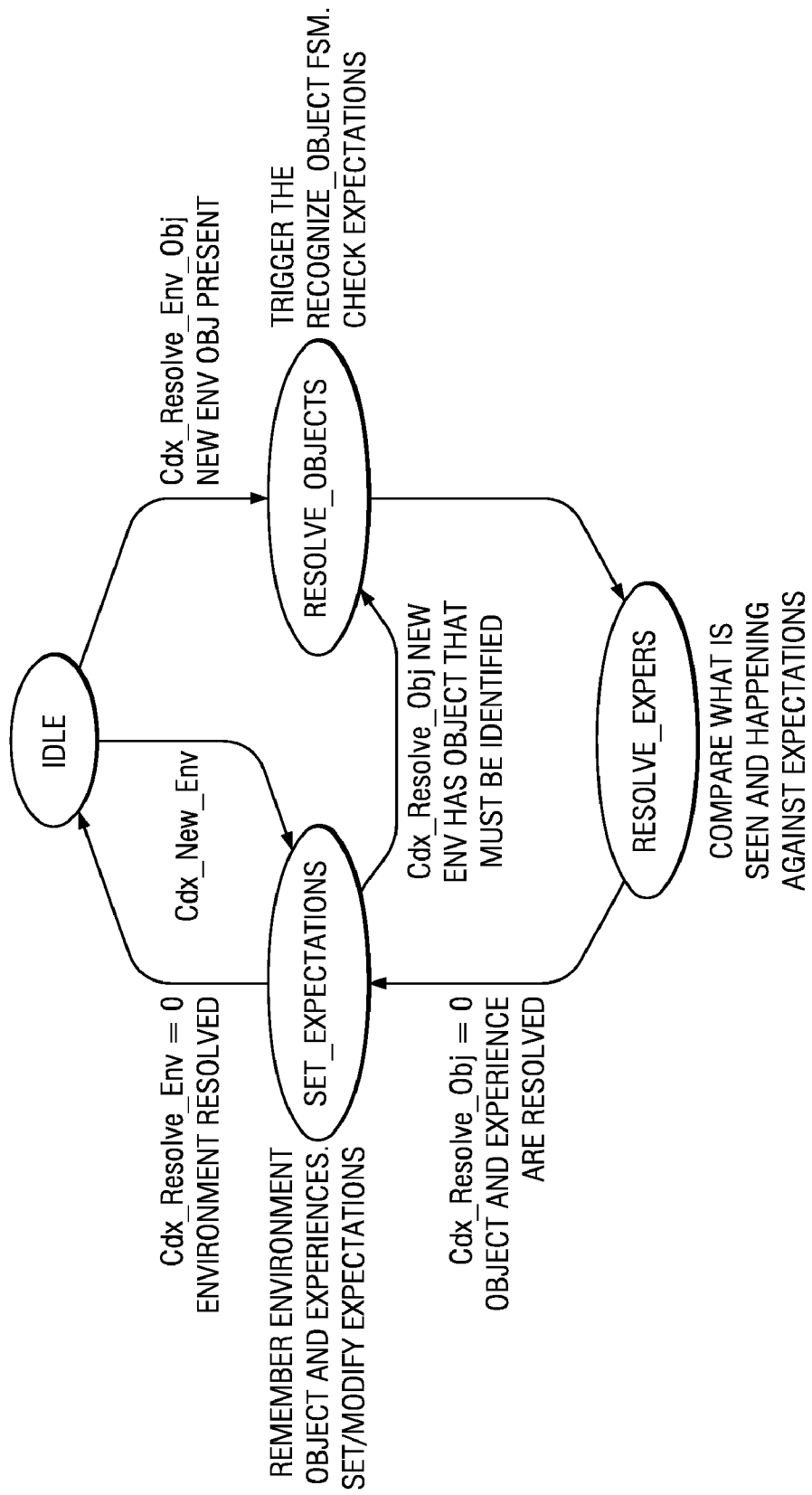
FIG. 48 illustrates the FSM Resolve State Machine.

Referring now to FIG. 48, there is illustrated the resolve environment machine. The resolve environment state machine is called whenever the environment is changed, something in the environment changes, or a new object enters the environment.

Idle State

The resolve environment machine stays here doing nothing until an external event occurs.

Identify_Input State

The resolve environment machine waits_here while the Sensory Input FSM processes the input data. When that state machine is finished, one of three things will be present:

Cdx_New_Env_Obj—a new object in the environment.

Cdx_Env Obj_Chg—an object in the environment has changed states.

Cdx_New_Env—we have entered a new environment.

Resolve_Objects State

After the object has been identified, it is checked against our expectations for this environment. If this is an object that has changed states, the resolve environment machine discerns the state change and process the implications accordingly.

Resolve_Expers State

The resolve environment machine compares the expected experiences with this object to what is actually occurring.

Set_Expectations State

The resolve environment machine remembers the environment from previous experiences.

The resolve environment machine will expect certain objects to be present and experiences to happen based on past experiences in the environment.

Remember environment—recall the objects, experiences, and emotions associated with the environment that is being entered.

Set expectations for the environment—set expectations based on recollections and their relevance.

Modify expectations for the environment—modify expectations based on the unexpected objects or experiences and emotions.

FSM_Sensory_Input State Machine

Figure 49:
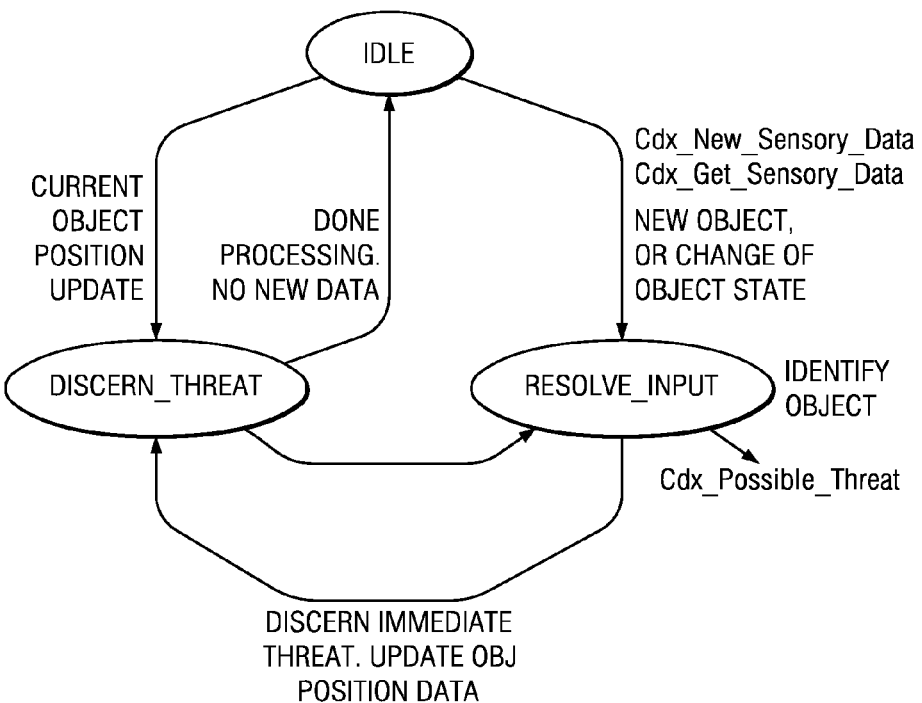
FIG. 49 illustrates the FSM Sensory Input State Machine.

Referring now to FIG. 49, a FSM Sensory Input State machine is illustrated. This FSM checks the sensory input buffers for new data, and processes the data to identify it when possible.

This FSM primarily considers whether or not a new object in the environment (or one whose state has changed) is a threat, and tracks its position.

Idle State

This FSM stays in IDLE until there is data available to process. If the incoming data is a position update, it is processed immediately. If it is a state change or a different object, it must wait until the previous information has been processed or a decision is made that more information is needed.

Resolve_Input State

Process the incoming data. The first step is to identify which environmental object for which data is being received, or create a new one and identify it from its properties.

Discern_Threat State

Assess immediate physical threat. This is determined based on physical motion, path of motion, speed, size and weight of the object.

Discern motion of the object—Is it moving?

Discern path of motion—Is it on a collision course with me?

Discern speed—how much time do I have?

Discern size and weight—is it large enough, fast enough, and heavy enough to cause physical damage? If so, it doesn't matter what it is, if we are going to evade it, do so now.

Threat Assessment Flow

Figure 50:
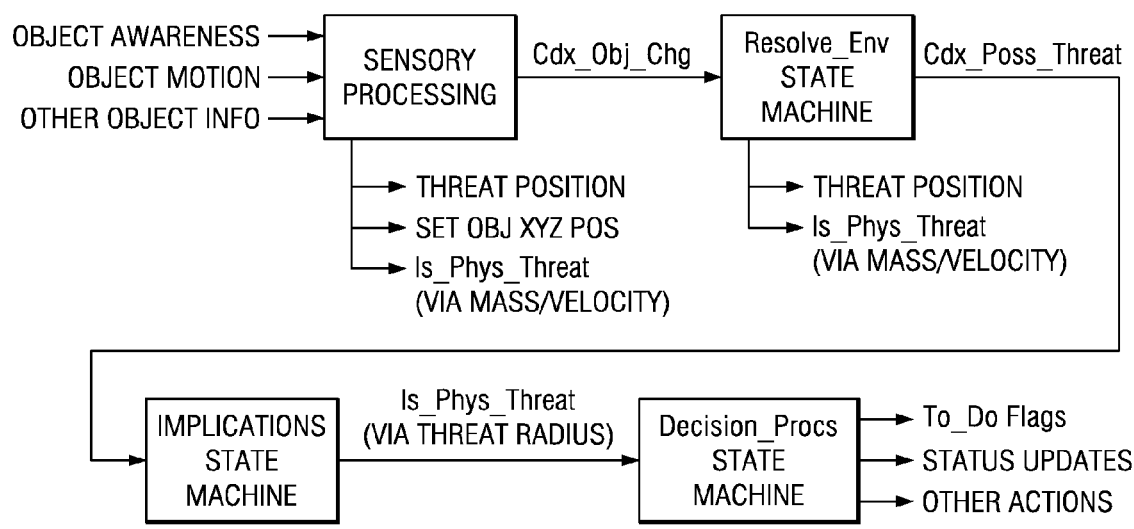
FIG. 50 illustrates the Threat Assessment Flow.

Referring now to FIG. 50, there is illustrated the general flow of threat assessment from sensory detection of the object (or event) to the taking of action. Some of the relevant conditions sensed or defined are shown.

The information is passed off from state machine (FSM) to state machine until explicit action for the object has been taken. Incoming awareness of an object turns it into an experience with associated emotions.

If a similar experience has occurred in the past, some items such as physical threat level will have been remembered for the object in the form of relationals. Other such information may be stored in the experience memory block.

Application Specific Use of Emulated Brain

Figure 51:
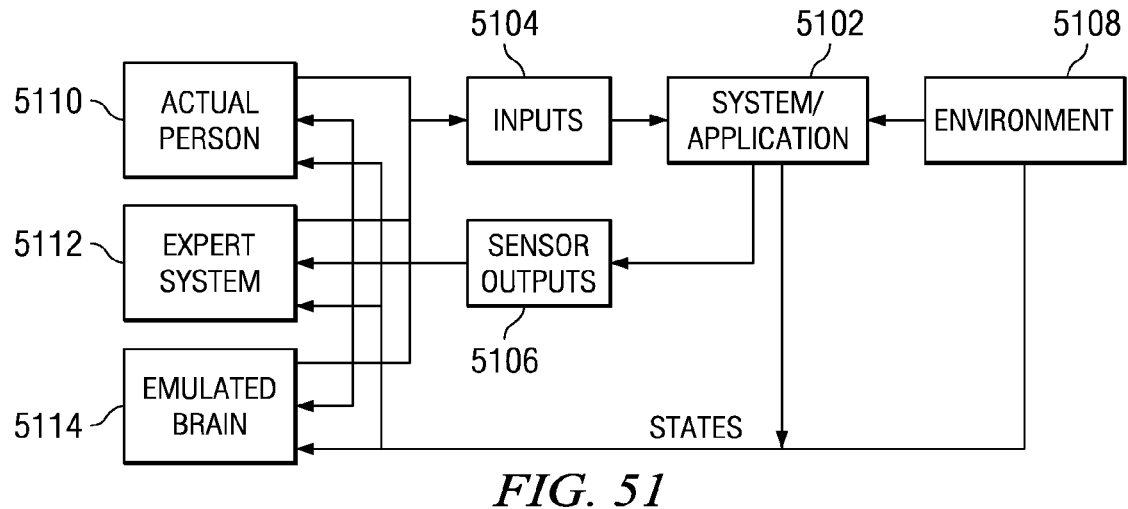
FIG. 51 illustrates a generic application wherein the electronic emulation of the human brain is substituted for an actual person in a real world application.

Referring now to FIG. 51, there is illustrated a diagrammatic view for a generic application in which the emulated brain is substituted for that of a human. Depicted is a system/application 5102 which basically represents some type of application or system. For example, the system could be a power plant or it could be an application such as, for example, a military mission, a task-based application wherein certain goals and the such were provided to the system which must be achieved, etc. In task-based applications, such as a military operation, certain goals and the such would be provided to the human, in the event that a human were involved in the task based application, and this human would carry out the task with the purpose of achieving the goals, and all of this based upon that particular human's training.

The system/application 5102 will have various inputs provided thereto from a block 5104. These could be inputs such as control inputs, i.e., the yoke for an airplane or heading parameters for a sailboat. These are inputs that are provided by the user to the system or application which control the system/application 5102. There will be some type of outputs that are received from the system/application 5102 which are indigenous to the system/application 5102 and allow a human to determine aspects of the operation of a particular system or progress of a particular application. These outputs are represented by a block 5106. Each system/application 5102 will have some type of environment 5108 associated therewith. The environment basically provides "context" to the user about the system/application 5102. For example, if this were a plant and the task were to change the output efficiency by 1%, the environment 5108 could represent temperature, feed rate, etc. The output of the environment 5108 would be the "states" of the environment and this would also exist for the system/application 5102, as the system/application 5102 will have certain states associated therewith defining the current condition of a particular environment or the current condition of a particular system/application 5102. States are distinguished from outputs to some extent in that outputs are measured variables as opposed to a state that constitutes a current condition.

There are illustrated three different blocks 5110 defining an actual person, a block 5112 associated with an expert system and a block 5114 associated with an emulated brain. Each of these can be utilized, one substituted for the other. If the human were utilized, i.e., the block 5110, this would indicate that a human were trained in a particular task associated with the system/application 5102 and the user could evaluate the real time measurable variables output by the system/application 5102, the human could evaluate the states, i.e., the condition of the system/application 5102 and the environment 5108 and make a decision based upon these inputs. This decision, if some change were required, would then be communicated to the system/application 5102 to make changes thereto. The person would have a unique aspect about them, i.e., they would be trained for the specific application. For example, consider a mission control application wherein ten individuals are associated with the personnel required to "man" a particular task carried out by mission control. Each of these individuals would have specific training for their particular task, all of the tasks required for the combined mission. It may be that some individuals are cross trained and can perform multiple tasks. However, some individuals will be better suited based upon their training and experience for a particular task. Thus, the block 5110 will represent an individual that has application specific training associated with the particular system/application for carrying out a particular application or task with respect to that system.

The expert system in block 5112 is a system that is trained upon a particular individual that has expertise such that, when presented with a particular set of conditions, will react in the appropriate manner consistent and almost identical to what the actual person, upon which this expert system is based, had made in a prior test. Typically, the expert system is trained by observing an actual person presented with certain conditions that makes a certain decision based upon their training and expertise. This information is downloaded into a system and, when those conditions are presented to the expert system, it will make substantially the same decision, if not the exact decision. This is what is referred to as a "first principles" model in that it is a "if, then" system that looks at a condition and, if a condition exists it will then make a decision based on what the human expert did in those exact or similar conditions. The problem with this particular situation is that, when the particular expert was not presented with those exact conditions, there will essentially be no decision made or possibly the wrong decision. For example, if the expert system were trained on an individual that was presented with certain situations such as flying a fighter jet and this fighter jet was presented with a condition that recognized a Sam 6 anti aircraft missile had locked onto the plane. The human would have been trained to take a certain action based upon that locking indicator, such as to initiate a particular evasion maneuver. However, suppose that with an expert system, just prior to the missile locking onto the aircraft and the indication being provided to the expert system, one of the engines had been slightly damaged and did not possess the thrust to allow the aircraft to perform that particular evasion maneuver that was called for by prior experience of the expert upon which it was trained. In this situation, the expert system would not recognize this was a problem (assuming it was not trained in that condition) and would try to execute the evasion maneuver called for and, of course, probably fail. Thus, expert systems are only based upon the level of training that they receive and they are very rigorous in the decisions that they make, i.e., they only make decisions based upon conditions that previously existed and under which previous conditions a certain response had been taken when trained.

With the emulated brain in block 5114, there are many relationships that are provided, as described herein above. These relationships allow the emulated brain to make decisions based upon what it had learned. Since this emulated brain will be trained in a mission or application specific manner, i.e., it will be presented with many conditions and many inputs to allow it to make the best decision based upon conditions, i.e., there will be very strong relationships built into the various nodes, etc., that will allow the emulated brain to make a decision which, under these conditions, would probably be very similar to the expert system. However, the way that the emulated brain makes decisions is based upon these application specific relationships and also upon previously learned relationships that are not necessarily specific to the application. For example, if it had been trained that, when the Sam 6 missile were indicated as being locked onto the aircraft and were approximately five miles away and at 3 o'clock, this would trigger off a number of neurons. For example, there would be a threat neuron triggered which would heighten the awareness of the user, a direction neuron would be triggered that would recognize the direction and an evade neuron that would seek to evade the threat and it would recognize, based upon its specific training, that the evasion maneuver would require certain inputs to be made to the aircraft. However, if an engine had failed, the emulated brain would recognize this was a problem and would have a higher degree of fear and would make different decisions, as the strong relationships derived from the application specific training would not have worked and other, possibly weaker, relationships, would give rise to different actions, as will be described herein below in more detail. Further, once the emulated brain is presented with a situation that it had never been presented with before, it will make decisions based upon prior training that is not necessarily mission or application specific. This training will then strengthen those relationships, if not create new relationships in the form of new nodes.

Figure 52:
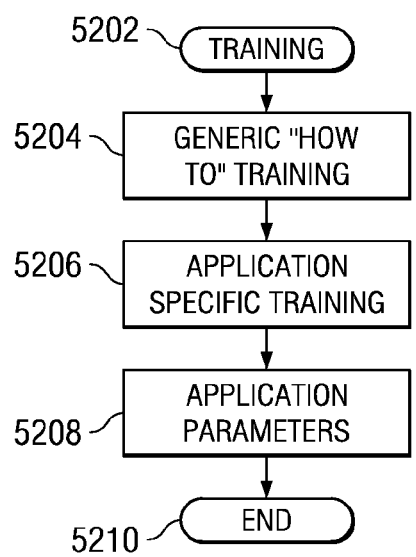
FIG. 52 illustrates a flow chart for the training operation for training an application specific emulated brain.

Referring now to FIG. 52, there is illustrated a flow chart for the training of an application specific emulated brain, in block 5114. In general, each emulated brain, as well as a human, has certain basic training of how to exist in the world. However, there are certain situations that, if newly presented to that individual or that emulated brain, would present previously unencountered conditions. These previously unencountered conditions would require both a human and the emulated brain to call upon prior relationships and experience to take certain actions and attempt to make a decision (if one were required) based upon those relationships and experiences. However, if experiences and relationships are provided that are specific to a particular application or task, this will enable the particular human or emulated brain to make better decisions. This is because there are very strong relationships between an action to be taken and a present condition. For example, if the emulated brain were presented with a threat in an aircraft, for example, the normal untrained response would be to evade that threat and go in the opposite direction at the highest rate of speed. This would also typically be the response of an untrained human. However, one response might utilize a trained maneuver such as a "jinking" maneuver. In this situation, when a missile is detected by radar as heading directly toward the aircraft from the front, a determination is made as to whether the missile is heat-seeking or radar-homing. The jet will then head straight for the missile and, when it is within a predetermined distance from the missile, it will release a proper counter measure (flare for heat-seeker, ECN for radar-homing) and then pull up hard. Basically, this "jinking" is the operation of varying the altitude and, if one were not trained to do this, they might take different evasion steps. However, for the human, this is a learned behavior and for the emulated brain, this is also a learned behavior. During training, of course, the emulated brain could be provided with predetermined evasion routines in a table which, upon recognizing a particular condition, these tables could be pulled up somewhat like an expert system. However, in the event that, for example, the counter measure did not deploy as desired, a different decision would be required. If a strictly scripted task were performed, the missile would probably hit the aircraft in the condition where it were damaged.

The training program is initiated at a block 5202 and then proceeds to a block 5204 wherein the generic "how to" training is provided to the emulated brain. This is the general building of nodes and relationships for a general emulated brain. There could be certain specific scripts played to the emulated brain to provide certain biases and relationships that would focus it on a particular area; however, for a particular mission specific or application specific training, additional training would be required to build stronger relationships. This is provided by a block 5206 where an application specific training process is provided. In this mode, input is provided to the emulated brain that would strengthen these relationships for certain conditions. For example, in the above noted condition wherein a missile were coming head on at the aircraft, a relationship would indicate the recognition of the missile, the type of missile and a relationship between that missile coming head on and a particular maneuver, that being to fly directly at the missile until it were within a predetermined distance before releasing a counter measure. If the counter measure did not deploy correctly, this would not necessarily be a part of the training but would be a situation where the emulated brain would have to rely upon other relationships that existed from the "how to" training. This will be described in more detail herein below.

After the particular emulated brain has been trained for the application specific task, the program then would flow to a block 5208 wherein specific application parameters would be provided to the emulated brain. These are specifically associated with a particular task to be performed. For example, if a plant were to have the operating parameters changed to achieve a certain additional increase in yield or efficiency, then the goals would be provided to the emulated brain. It could be merely that the task was to power down a particular plant. This might be a simple task, but the application specific training in block 5206 provides the ability for the emulated brain to achieve this task, but it must be provided the goals, which basically modify the way that the system operates. In a military operation, the mission goals would be provided, i.e., travel to a specific point and release some type of munitions or take a photograph and then return. Once this training has been provided, then the task can be initiated, and completed. At this portion of the training, the program will flow to a End block 5210.

Figure 53:
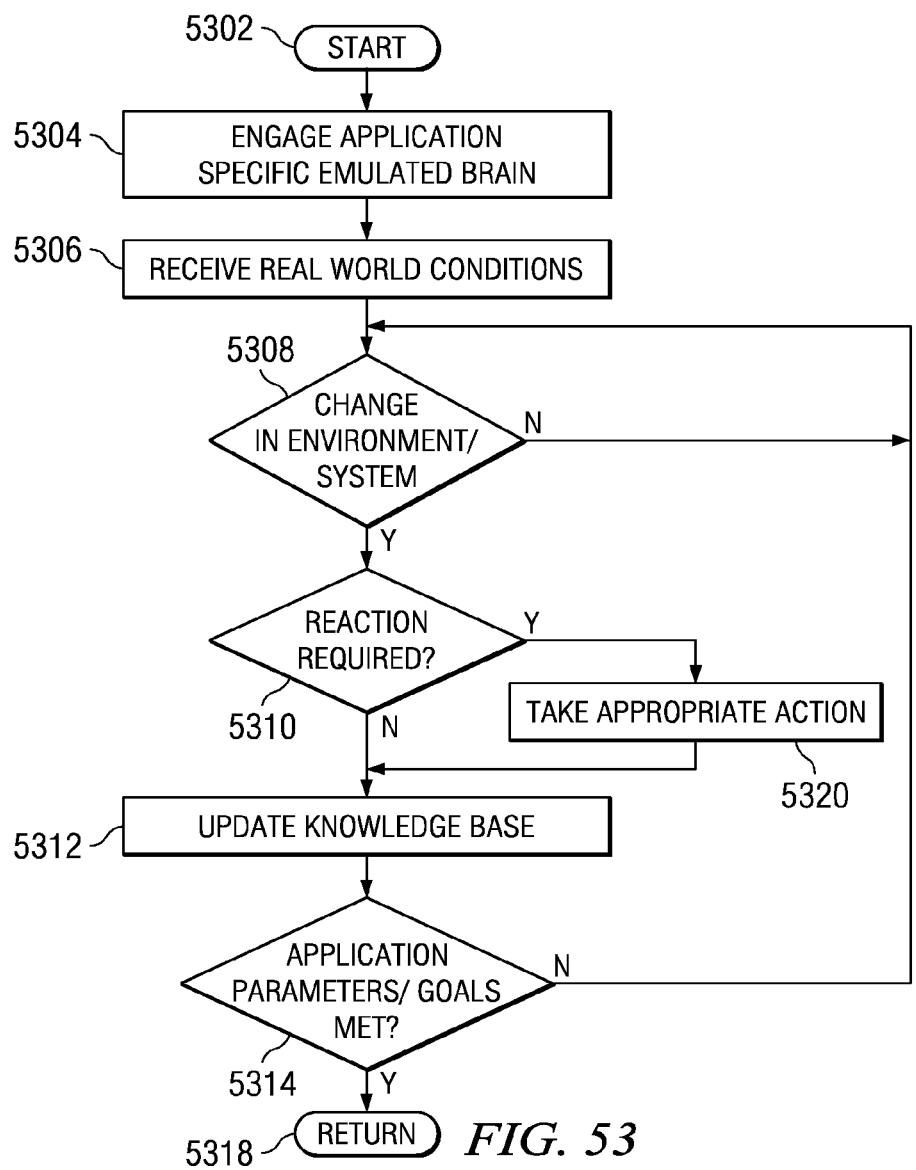
FIG. 53 illustrates a flow chart for the generic application running with the emulated brain.

Referring now to FIG. 53, there is illustrated a generic flow chart for the operation of initiating a particular application after training. This is initiated at a block 5302 and then proceeds to a function block 5304 wherein the particular application specific emulated brain is engaged in the particular application. This is one that has already received the particular application parameters to which it is to operate, i.e., the various goals of the task are available to the emulated brain, since this is a task oriented application. The program then flows to a function block 5306 in order to receive real world conditions. This is basically the operation of sensing the measured variables output by the system/application (if there are any) and also the various environment states. This generally appraises the application of the "context" in which it operates. For a plant, this would merely be the conditions that existed with respect to the plant such as temperature, etc., and also the various measured outputs such as feed rate, power output, power input, etc. Once these real world conditions are assessed, i.e., known, the program flows to a decision block 5308 to determine if a change in the environment/system has occurred or if a change must be made in the environment/ system in order to achieve a particular task, i.e., start a particular power down process, for example. If not, then the program will loop back around to the input of decision block 5308. Once it has been determined that there has been some change, i.e., an external disturbance, or that a particular action must be taken to achieve a particular goal, such as reaching a particular point on a geographical grid, then the program will proceed along a path "Y" to a decision block 5310. At decision block 5310, there will be a determination made as to what reaction is required. For example, if it was determined that there was an external disturbance in the environment such as a flare being present off to the side of the aircraft, a determination must be made as to whether an evasion maneuver must be performed. If not, then this just indicates that something happened but that there is no reaction required. If this was the case, the program would indicate no reaction required and would flow along the "N" path to a function block 5312 to update the knowledge base. This updating operation would strengthen certain relationships based upon the change. For example, it might be that the threat relationship had to be increased based upon this particular event. In the future, a flare would make a stronger relationship that might, in the future, cause there to be some type of evasion maneuver executed. The reaction at this point might not occur, since the flare had never occurred before. It might be that this flare at the present time caused some type of temperature increase in the plane, but the existence of the flare, i.e., the optical sensing thereof, would not cause any experience of threat due to no previous experience thereof. In the future, however, there would be a greater relationship with threat and this event and that may cause a different reaction, i.e., an evasion maneuver. (Consider the operation to be that of a drone operated from a command console. If the flare caused the destruction of the drone, the next mission that encountered such would result in some type of reaction whereby the drone moved away from the threat.)

After the knowledge base has been updated, the program would flow to a decision block 5310 to determine if the application parameters/goals have been met, i.e., in a task-based system, was the task completed? If not, the program would flow along the "N" path back to the input of decision block 5308 to again await for changes in the environment/system and/or task goals. Once completed, the program will flow along the "Y" path to a return block 5318.

When a reaction is required, as based upon the learned relationships, control will flow from the decision block 5310 along a "Y" path to a function block 5320 in order to take an appropriate action and then back to the input of the function block 5312 to update the knowledge base with any additional relationships that have been learned. It should be understood that, although illustrated as a single path, there might be multiple paths taken for conditions changing. For example, the appropriate action may be to change altitude to achieve a particular task with an aircraft but an additional and parallel path may indicate a reaction that is slightly different to modify this particular action. In any event, the path wherein a reaction is required is one that is based upon the learned relationships that exist within the emulated brain and the decision having the strongest relationship will be the one selected. The stronger these relationships are, the more likely it is that a particular action would be taken.

During the training of the emulated brain in the "how to" portion thereof, various higher level aspects of training will be provided. For example, the emulated brain might be trained with respect to a classification at the highest level that would be defined as "world relationships." The highest relationship would be that of a galaxy with the next lower level being the solar system and the next lower level from that being the sun and the next lower level being planets. Earth would be one planet which would be lower and then this would be so divided into sea, air and land and so on and so on. Another major area could be high school materials such as math, science and geography, with different branches therein. By providing the brain material to digest in each of these, these relationships can be learned. Another class could be engineering and aerospace and another class could be information associated with a military command college. By inputting scripts to the emulated brain, as described herein above, various relationships are created. Further, different inputs can be provided to the brain that can be indicative of various reactions that should exist with respect to certain sensed inputs. For example, the existence of fire can be somehow associated with a threat relationship or a damage relationship. Once these relationships have been trained, a given input can then be compared against the relationship to determine how strong the relationships are for a given input.

Figure 54:
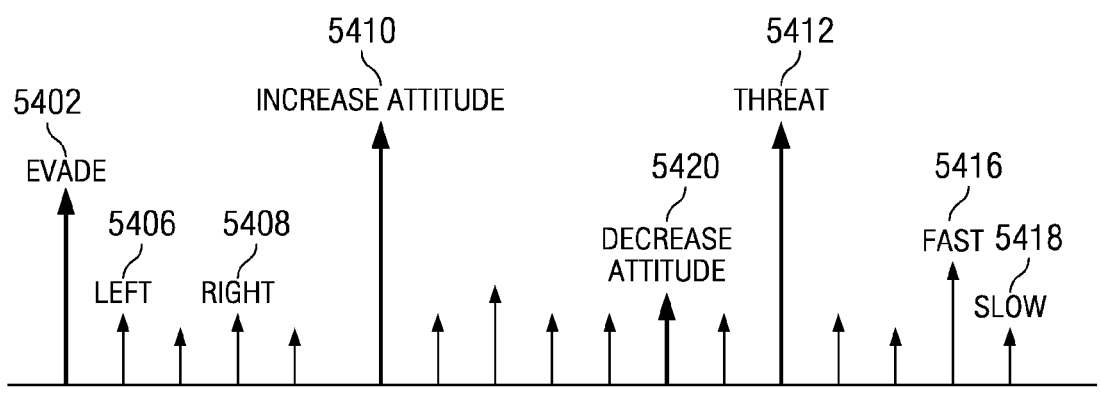
FIG. 54 illustrates a diagrammatic view of relationships between various actions.

Referring to FIG. 54, there is illustrated a diagrammatic view of the different relationships that might exist for a given input, this being bars that relate to strengths. The strengths are strengths of neural responses that are in response to a particular stimulus or input, i.e., a change in the environment/application. This example illustrates different relationships that might exist when, for example, a particular threatening object is encountered in an aircraft and an evasion maneuver must be implemented. One of the relationships that was learned is an application specific training parameter for evading such an object, which would be a strong relationship and would be indicated by a solid bar 5402. There are a number of other small relationships that can be illustrated with smaller or lower level bars, such as one indicating the relationship "left" indicated by a bar 5406, a bar 5408 indicating a "right" relationship. There is no indication that this particular "right" or "left" relationship relates to maneuvering an aircraft, but it indicates that when a particular action occurs, there is some type of relationship with respect to a particular direction in which the aircraft should be moved. It is this relationship in conjunction with other relationships that actually can cause a fairly strong relationship such as one associated in an increase in altitude, represented by a sold bar 5410, to have a very strong value. This particular bar 5410 is associated with an increase in altitude. This is a relationship that would have been based on the application specific training such that, under those given conditions, the relationship would be high. Additionally, there is provided a relationship for threat, which is a relationship that is typically learned in the "how to" training. However, this relationship is strengthened based upon the application specific training, i.e., when a missile is detected, this is learned during the training operation to be a very serious threat and the bar 5412 associated with the threat relationship would be very strong. Associated with the normal "how to" training will also be the concept of "fast" associated with the bar 5416 and the concept of "slow" associated with the bar 5418. During the maneuvering operation, the relationship associated with "fast" would typically be higher than the other relationship associated with "slow." Additionally, there would be potentially a relationship for decreasing altitude, as indicated by a bar 5420. This would be a learned relationship during the training but, for the current situation, it would not have a very strong relationship through these particular sets of conditions. It could be, however, in a different situation, that the particular threat was one that, although it indicated an evasion operation which would be a strong relationship associated with the bar 5402 would not indicate an increase in altitude. For example, the environment could be one wherein the aircraft were over a canyon and could decrease altitude to go into a canyon which would increase the relationship associated with the decrease altitude bar 5420. An additional example would be one wherein the aircraft were close to a target and it was indicated that the aircraft should decrease altitude to photograph the target, for example. This would indicate that there was no threat and the relationship associated with bar 5412 would be very low but the decrease altitude bar 5420 would be increased and the evade bar 5402 would be decreased. If, however, when the aircraft decreased altitude in accordance with the training, there were some turbulence associated with the decrease in altitude, it could be that the threat relationship were strengthened such that, the next time altitude was decreased for the same or similar task, threat would be increased slightly. This is the concept of updating the knowledge base for the various stored relationships.

The following are a plurality of specific applications wherein the emulated brain could be substituted for a human in a particular task based system. Further, the emulated brain could be trained in many tasks such that the training associated with each task could be carried out by the same brain or there could be multiple emulated brains for each task in a multi-task environment. These tasks are set forth as follows: Local Smarts and Intelligent Decision Making In-flight Aircraft Traffic Controller (ATC) functionality: Approximately 150 of the 5300 United States airports that are capable of supporting small business jets are managed by ATCs. While many of these others are below airspace monitored by radar, the local ATC functions to govern the airspace are not available. Business jet craft wishing to land in such airports must "de-conflict" the air space around them, in three dimensions.

An agent can be trained to assimilate radar, navigation and heading information and to track other craft, radio towers, mountains or other obstacles of concern to the safety of the airplane. It can recommend flight corrections or warn of encroachment of the craft upon the airspace of others, and warn of incoming encroachment by others.

Onboard Mission Control and Management—Neural agents can be used in place of human crew members of air, space or naval vehicle, whether surface or sub-surface. Some extremes of space and sub-sea environments yield at-risk conditions unreasonable for human crewmen. Crew members for such missions can ideally be neural agents. The roles and functions of individual human flight crew members are well understood, and anyone of proper background, intelligence and temperament can be trained in these roles.

With neural agents, once training for the background, crewmember knowledge and mission goals is complete, such training can be simply replicated to create additional agents. Training can create agents to fill almost any position in the flight crew, whether pilot, navigator, weapons officer or mission commander. Training for each position can be created by people expert in the related crew position. This same agent can be trained to perform situational analysis for the immediate environment or battle-space.

Vehicle anti-collision warning technology using programmed technology presently exists. The detection of specific dangerous conditions envisioned by the Collision Avoidance System (CAS) designers are programmed into the system, but other dangerous conditions may also exist. Use of a neural agent can widen the gamut of conditions that can be sensed for and countered. An agent can be trained in the basics of Newtonian physics, the general capabilities of cars, their engines and their braking systems, as well as the external environmental and surface conditions that can be exist. The agent can detect present environmental and near-vehicle conditions and can then create the proper advisory warnings to head off the danger. For vehicles so equipped, it can initiate immediate corrective action.

Voice-interactive Elevator Controls—Elevators and their controls have been around for more than a hundred years, but their controls have not evolved that much. It is possible with ordinary non-sentient analog and digital technology to make an elevator whose controls operate on classical voice-recognition principles.

To replace or augment existing push-button or voice-activated elevator controls with a behavioral-modeled agent brain may at first appear to be an overkill solution. However, it is a practical alternative and can bring additional useful functionality to the elevator controls. Actual cost of hardware implementation of the agent of the present disclosure is not substantial, and would be on a par with cost of existing elevator control electronics. For its cost, it brings human-factor based functionality to the system.

The agent can handle the normal 'floor-number' requests ("Four, please!") as well such as "Lobby", "Main floor" and other expected variants. If it is trained to know what tenant offices are in the building, it could also properly respond to "The floor that Gresham Engineering is on" and other such sentence fragments or clauses.

An elevator control agent can be trained to know the layout of the building and answer questions related to that, as well as to identify and know the voices of well known clients. For example, "Take me to Jack Smalley's office," could evoke the reply of, "Okay, but I just left him off at the main lobby." Clearly, the training could be configured to properly handle matters of both physical and information security, as is appropriate for the installation.

On rare occasions, unusual, emergency or panic-prone situations arise. The agent can be trained as to how to handle these and guidelines on how to interact with patrons to mollify them, answering their concerns or questions. Emergency crews such as firemen could also query of the elevator how many people it has handled from the fifth floor in the last 10 minutes, which floors are abnormally warm, and other safety-related information.

In every case, no pat answers are programmed into the agent. Indeed, no programming of the conventional variety is needed (or available). English text descriptions of relevant information of the day can be uploaded to the elevator agent on a regular basis to make 'elevator service' take on new meaning in the public eye. Any human language for which the agent has been configured could also be used with the system.

Game Systems—A behavioral-model Agent of this disclosure can be applied to interactive games that go far beyond the simple board games like Monopoly. Gaming systems that use expert knowledge of world, national and regional economics can now contain intelligence that alters the outcome of a game. For example, a game called Econ 105 is now possible, in which different agents manage the economies and issues of economic impact for specific countries.

Players within one such country can compete with players from an alternative country, in which each country has previously been endowed with certain natural and cultural resources. The Agent of this disclosure can parlay those resources and present local and world economic conditions into suggested opportunities or moves for their own players.

Such a system serves as both an interactive and recreational game, but also as an implicit training tool for how economics works. In a similar manner, an Agent can be configured to emulate the economic conditions and opportunities on a personal level, permitting individuals to 'compete' with the environment around them. Again, it serves as both a recreational and an educational tool.

Robotics Brain for Hazardous Environments—A behavioral-model agent of this disclosure can be used as the brains for robotic devices that can be used in hazardous environments. The latter can include collapsed buildings, chemical spills, nerve agent releases, burning buildings, explosives and many other areas. Not only does the agent bring an autonomous means of control for robotics outside the range of human contact, but it brings local thought and experiences and analytical capabilities to the process.

Combat Systems: It is frequently desirable to put autonomous intelligence in remote vehicles used for information gathering by Command and Control (C2TSR) systems. Both undersea and airborne vehicles are sometimes required to operate outside of human control, yet are tasked with specific information-gathering missions. The ability for autonomous thought onboard the craft, such as in the role of a mission commander, greatly facilitates this process, and reduces the possibility of friendly human loss. Neuric agents can be trained in a variety of roles, much the same as humans are trained in specialist roles. Such ability has been sought after by various military services for many years, particularly in systems that can be trained, rather than programmed to handle every foreseen contingency and circumstance.

Decision Maker for Partial Facts—Offer decision recommendations for situations where the known facts are partial, or are yet incomplete.

Traffic Light Controls: Every municipality has considerable investment of popular tax money for roadway and traffic control systems and infrastructure. Particularly for main arteries, it is desirable to maximize traffic thru-put in cars-per-hour per tax dollar expended. Poorly managed traffic control systems can easily reduce that vehicular thru-put to 30% of what the street infrastructure is capable of. It is common for municipalities to obtain current technology, but to grossly underutilize it because of the limited traffic engineering expertise needed to correctly apply it.

Coordinated timing, time-of-day flow patterns, under-pavement sensors, flow logic, intersection television cameras and other intersection sensor systems demand parallel investment in trained traffic engineers. The capabilities of the Neuric agent and brain can be applied to traffic light control, particularly when use is made of vision cameras. This is an expert system, expert in traffic control, and it can massively augment a relatively smaller team of professional traffic engineers.

While use of a Neuric agent/brain may seem overkill for traffic control, it is an excellent application for it. The agent can adapt to changing conditions without the complex programming required with present technology. The brain can continuously analyze intersection traffic conditions, including visual cues of inbound traffic not yet arrived.

It could also be configured to give recommendations to existing controllers to adjust signal lights for the maximum traffic thru-put within the intersection.

Adaptive control systems (where complicated initial conditions and non-linear and/or unknown relationships between determinate variables make it impossible to specify a controlling function or algorithm), for example: building heating and cooling. A controller outfitted with temperature, humidity and solar insolence sensors would eventually adapt to a person tweaking the temperature until the person no longer had to manually adjust the temperature. Docking a boat on a river: A controller outfitted with wind, water, position, orientation and load sensors would eventually "get the feel" of how to dock a boat under a wide range of conditions by being taught by a human pilot (via observing how a human does it under varying conditions). Games with intelligent opponents (board games, video games, etc.) Playing chess has always been a challenge for machines. Currently it is done by brute force analyzing up to 12 "plies" (how many moves deep it examines).

Expert Replacement

Expert Help (e.g., Automotive maintenance shop or Parts Store kiosk): "The car is a 1998 Honda Accord with a 2.3 liter engine and standard transmission. When down-shifting from $4^{th}$ to $3^{rd}$ at high speed, the engine stalls. The computer says the mixture is overly rich but the oxygen sensor operates properly. What's the likely problem?" A neural agent can be given a basic training in mechanics and physics as a background, followed by training on the configuration and quirks of specific cars. The training forms relationships between components of the mechanical system, from which the agent can draw its own conclusions about the problem under inquiry.

Capturing of an Expert's Knowledge: Over the lifetimes of a commercial project and of an individual or employee himself, a company or organization invests considerable monetary or time resources in the accumulation of knowledge. For various reasons, that knowledgeable person becomes no longer available in his former capacity. For example, he or she may retire, die or be moved on to a project of higher priority. The organization suffers loss of its former opportunity to consult with the individual on the subject matter. The Artificial Intelligence (AI) community of the 1980s held forth the hope of replacing such an expert with sentient (reasoning) computer software, a hope never quite met in practice.

Such AI systems are still often heuristics-based. That is, they are implemented as computer programs based on the 'if this, then that' decision paradigm. They are also sometimes implemented as computationally-intensive Rules-Based expert systems. Further, such systems as were developed have required considerable computational power.

In any case, the training of the traditional AI-based system is both complex and complicated, often requiring experts on expert systems to implement the training. The behavioral-model agent system of the present disclosure can be trained by anyone who can write English text and who possesses the expert knowledge to be captured.

Example use: The use of the behavioral model of this disclosure permits such a capture of an expert's knowledge. The model can be trained in the relevant underlying sciences (if applicable) to give it general understanding of a field. Subsequent to that, the expert can interact with the agent to teach him the nuances of the subject matter, things found to be relevant, important or critical to someone studying the subject. Thereafter, the agent can be used as a resource for inquiry and assistance on the subject matter. Obviously, the better organized and methodical the training process is, the better equipped the agent will be on the material.

Example use: A further example of this is in aircraft maintenance. For example, a Mooney airplane pilot/owner might inquire of such an expert agent, "When I bank into a right-hand roll or coordinated right turn, I feel a slight shimmy that just doesn't seem right. The feeling goes away after passing through 15 degrees of bank. What might be causing this?"

Example use: It is possible to use existing industry 'Help' text as a significant basis for the training of the Neuric agent, reducing licensee's training costs from what it could be. A Neuric agent could be trained to offer expert assistance in any field of significance, giving answers to ordinary questions in English. The agents could be fully interactive and conversational, to clarify what area the user needs more specific help in, and to give it in the form requested. The agent can be created as a software product itself, or can be a stand-alone hardware product.

Commercial Data Analysis: An agent can be configured and equipped to absorb all known sources of information on a topic, becoming a repository of information in that area. For example, external software can scour the internet for information relevant to the topic, and then feed those pages to the agent. Indeed, an agent can himself be trained to do such scavenging of information. It can then act as a server to interpret and analyze that data at the request of human beings, and could even supply URL references for the human to use to look up as desired.

A further capacity of the agent of this disclosure is that it can absorb disparate sources of information and infer conclusions from the combination, something that could not be done perhaps with information from one source only. This makes a powerful tool for analytical data analysis.

Software Help: It is standard practice for modern software to provide help information for the person using the software. That help is accessed in various ways, for example, through a 'Help' menu selection. In practice, there are three or four common methods of obtaining help, and help is presented in various forms. Further, for the software to ascertain exactly what you are looking for help on, it may have you enter your question into a text box. The problem that often arises is that the software expects only an explicit set of questions to be asked, or expects you to use a specific set of key words that are suggestive to it. This can be a hit-and-miss and frustrating process to use.

The human behavioral-modeled agent of this disclosure could be configured and trained to handle this in an appealing manner. For example, in Microsoft Word, you might rather wish to make the remark or ask a question as follows, "How do you create figure captions so that all references to them track when you add a new figure? I know how to work with 'references', but don't know how to make them refer to the figures I created." This lets the software user put the question in his own terms, and the phrasing can be exploratory in nature. This contrasts with the more rigid help query system in use today.

Emergency Room Diagnosis and Triage Recommendations: Emergency Rooms handle a wide gamut of medical situations, including life threatening conditions that occur so infrequently as to not be immediately recognized for what they are. Trained behavioral model agents of the present disclosure can be used to consider the information and then offer preliminary diagnoses, recommendations or suggestions to for medical staff to consider.

Reverse Conjecture Diagnostic Tool: As input, train a behavioral-model Agent of this disclosure, giving it the biological history and details of Person A. Use the Agent to construct a list of possible variables and combinations that could have lead to the outcome for Person A.

Self-Help for Medicine: A behavioral-model Agent of this disclosure can be trained and used to supply background and information on medical issues, OTC drugs, naturopathy, holistic and herbal medicine and other aspects of self-guided health.

Expert Information Capture: Upon returning from the field in Iraq, senior battlefield commanders who have acquired substantive experience dealing with asymmetric warfare are retiring, and their experience will be lost. The memory of their actions and reactions during critical incidents will fade with the passage of time. Due to the vagaries of personality and temperament, the documentation styles, methods and levels of completeness vary widely by commander. An expert system that could be fed emails, after-action reports, written incident history and other sources to capture significant amounts of information that would otherwise be lost or uncorrelated.

Mechanical Maintenance Kiosk—Provide a maintenance kiosk at which support personnel can ask 'how-to' questions related to maintenance. For example, "Our shipboard gas turbine propulsion system shows extensive wear on the starboard unit's rear bearing. Load-sharing analysis shows no excessive torque loading over that of the left turbine. Bearing oil seals on the right turbine showed overheating at about 2700 hours of operation, but acoustic analysis showed no excessive vibration in either turbine, when last run at 7000 hours. Where should I start looking for the problem? What should we do so this doesn't happen again?" Such a proposition and question are unreasonable to ask of existing Help systems.

Specific-Interest Intelligence Analysis: A behavioral-model agent of this disclosure could be trained as an expert in an area of specialty, such as in Mid-Eastern culture or in the Chinese political system. It could be passed information for analysis and interpretation based upon that knowledge in its field. The same type of application in commercial, political and social arenas is also served by this form of neural agent.

Additional area of use could be a News and events surveyor: Pump internet news sources (Yahoo!, Netscape, MSNBC, CNN, etc.) to a dedicated agent and have it summarize and prioritize events and significance. Reuters financial news feed: Instantly direct relevant items/info to trading personnel (who are perhaps other agents).

Data Analysis

Image Interpreter of Topical Geological Data (Remote Sensing): Arial and satellite photographic and radar imagery has been used for many years for various purposes, ranging from mining exploration to military purposes. Existing image interpretation software commonly makes use of heuristics, programmed techniques that cover known situations. These match graphic features to databases of known or expected features. The behavioral model agents of the present disclosure can augment this with human-like knowledge and reasoning for the interpretation of visual data.

Example: Mining Exploration: Images used in mining and drilling exploration come from sources such satellite and high-altitude photography or radar, and from sub-surface sonic mapping. The analysis of this imagery can be greatly augmented from the human-like analytical processes of a neural agent of the present disclosure.

Example: Military Intelligence Analysis: NSA, DIA and CIA satellites constantly produce new imagery of their areas of over-flight, most of which have never been seen by human eyes because there is no present interest in that specific slice of the world. Next week, however, it may be desired to backtrack certain activity on the ground that is taking place at this moment. Because of the training and labor expense, human interpreters are used to pull up these image files only as needed, on a time-available basis, or when the need warrants. Readily-replicated pre-trained behavioral model agents of the present disclosure can be used continuously in the background, seeking objects, motion tracks and other items of potential interest. This gives more rapid access to pre-analyzed data when the need should arise.

Example: GES Map Generation: Great amounts of vector (line-drawn) map databases are prepared by the government in the standardized and so-called GES format. These are made available for automotive GPS maps, for various federal, state and local government purposes, as well as to the general public. Weather maps are a well-known application of the GES maps. The use of trained behavioral model agents of the present disclosure can greatly expand the capabilities, accuracy, and economy of producing such maps.

Search 'Bot': A behavioral-model Agent of this disclosure can apply intuitive sense to the area of data mining, creating a truly intelligent search 'bot'. Such an agent can be given specific instructions as to what is important and what is not, what to exclude from searches and what generic areas to include or exclude. The capability to do such things greatly widens the effectiveness of both data mining and information lookup.

Search Engine: A behavioral-model Agent of this disclosure can apply intuitive sense to information gathering. Conventional search engines are based upon various forms of simple text matching, done without either intuition or conjecture. This application brings cognitive processes to bear on the search.

Information sources may include conventional repositories such as Internet search databases, but also such specific sources as archives and resources that an investigative reporter might use. It can also be applied by the military for analysis of after-action battle reports from disparate sources, such as compilations, emails, faxes, verbal and other sources. It can be applied for the analysis of case histories ranging from the medical field, automotive trouble-shooting, general mechanical systems repair (such as airframes), aeronautical accident investigation, drug interaction and applicability, and many other studies relating to case histories.

Conjecturing of Missing Information: Analyze currently incomplete information to isolate the missing facts. Conjecture what those facts might look like, were they to be known.

A Dream Analyzer: Using the behavioral-model Agent of this disclosure, a "Joseph" analyzer for dreams can be created. A dream can be described to the agent, permitting it to use conjecture to ask questions about it. Some dream symbols are global throughout cultures and sub-cultures. Other symbols are context-driven and are specific to the individual. The dream analyzer can "connect the dots" to make sense of one's dreams in the light of this information.

Addiction Analyzer: Using the behavioral-model Agent of this disclosure, a predictor and analyzer for additive behavior can be created. Anyone willing to admit they have a problem, possibly addiction, could benefit from this tool. Past abuses are described to the Agent. When an alcoholic slips up and has a drink, he tells the Agent. The agent senses the subtle emotional cues in the voice, so the sooner you talk to the agent, the more accurate it will be. The agent answers questions about the moment, and what led up to it.

The agent can then predict future possible mishaps, and can warn of certain circumstances or events that would evoke certain emotions that would trigger another slip. The agent is able to sense the same emotions in your state that cause you to slip. It is there to be your friend when you mess up, and encourages you to be the person you want to be.

Surveillance Camera Imagery Interpretation: One high-end technique in use today with surveillance cameras is to subtract two images from each other to see what has changed between the two frames. An alternative approach is to have the behavioral model agent of this disclosure to augment such techniques with analytical scrutiny of the images. This eliminates frame changes due to natural changes in the image, such as waving branches.

Additional areas of use could be: Satellite Imagery Interpreter (NSA/CIA/DIA). Pump internet news sources (Yahoo!, Netscape, MSNBC, CNN, etc.) to a dedicated agent and have it summarize and prioritize events and significance. Reuters financial news feed. Instantly direct relevant items/info to trading personnel (who are perhaps other neuric agents). Would respond to the people by looking at votes, news editorials, letters to editors, "chatter."

Scenario Modeling of People

Applications for the prognostication of future human decision processes. Applications in the military command-and-control market. Applications in the military modeling market. Applications in the military simulating opposition and coalition forces.

Game Systems—A behavioral-model Agent of this disclosure can be applied to interactive games that go far beyond the simple board games like Monopoly. Gaming systems that use expert knowledge of world, national and regional economics can now contain intelligence that alters the outcome of a game. For example, a game called Econ 105 is now possible, in which different agents manage the economies and issues of economic impact for specific countries.

Players within one such country can compete with players from an alternative country, in which each country has previously been endowed with certain natural and cultural resources. The Agent of this disclosure can parlay those resources and present local and world economic conditions into suggested opportunities or moves for their own players.

Such a system serves as both an interactive and recreational game, but also as an implicit training tool for how economics works. In a similar manner, an Agent can be configured to emulate the economic conditions and opportunities on a personal level, permitting individuals to 'compete' with the environment around them. Again, it serves as both a recreational and an educational tool.

Modeling of Economic Systems—There are world economic systems that contain a certain (possibly-intentional) mystique with them, such as the Federal Reserve, the World Bank and other systems. A behavioral-model Agent of this disclosure can be applied to the analysis, understanding and prediction of structure, events and decision made by those bodies.

For example, mainstream universities have traditionally taught that the Fed will under no circumstances alter interest rates further than 0.25% per month, yet the Fed now does so often. The euphemism of "cooling (or moderating) the economy" is used to explain interest rate decisions, yet the occasional use of that terminology is very inconsistent with the state of the economy of the times.

On the other hand, the Fed has a rich and well-documented history of decisions made in times for which considerable economic data is available. An Agent can be used to consider both the decisions, the reasonings for it, and the prevailing conditions of the times, to give better assessment of motive. From this it can offer predictive suggestions of what the collective Fed will do under a given set of future conditions. As such, such a trained and analytical agent becomes a modeling and predictive tool for large areas of business, industry and government.

There are many applications in equivalent areas, where understanding can be brought through use of an Agent who has become expert in the analysis and understanding of select subject material.

There are at least four distinct application areas within the military: Expert information capture, scenario modeling, complex-system maintenance, and combat systems. Some of these (expert capture and maintenance) have strong parallels with needs in industry, and the industry examples and discussions apply.

Scenario Modeling: attempting predictive modeling of enemy behavior is at best a difficult exercise, when human temperament, personality and emotion are not integral to the modeling. Use of Neuric agents to model specific groups of both opposing forces makes scenario modeling a practical matter.

Psychological profiles of key decision-makers and people in each group are largely available using conventional analytical techniques. Those profiles can be incorporated into Neuric agents, who are then presented with a specific history and scenario backgrounds and allowed to interact with each other. By studying the English interactions between the models, what ifs run on a variety of scenarios can ascertain otherwise-unforeseen decisions and plans by the modeled opposition forces.

Reverse Conjecture, or Backwards in Time: As input, train a behavioral-model Agent of this disclosure, giving it the life details of Person A. Use the Agent to construct a list of possible variables and combinations that could have lead to this outcome for Person A. An almost identical application exists as a psychological tool, with a parallel application in the medical diagnostic field.

Simulation of Adversarial Decision Processes—The behavioral model agent of this disclosure permits the emulation of the primary decision makers of the opposing force. Further, it readily permits the modeling of religious, political and military concepts that would be difficult or impossible with conventional AI systems. It enables the probing of representative behavior and decisions that would be made under a variety of scenarios. For each case, the English communication between models can be reviewed to see if they would make decisions that friendly military commanders would not think of.

Internet Brain—One or more behavioral-model Agents of this disclosure would exist on an Internet server that is open to the net. It would be a live and interactive environment in which people could log in, create an account and interact with a synthetic person, such that they could ask it questions or teach it. The agents could demonstrate initial life as a toddler, growing up as the internet culture that trains it. It would be on public view to permit people to watch, to participate, train or simply enjoy the process. Where would the "Internet Child" end up? This serves as a training, teaching or game tool alike.

Movie and Gane Animation

Animation of Art—In the 1950's, Walt Disney created the statue of Abraham Lincoln at Disneyland, largely operated by pneumatic controllers and then synchronized with wire or tape recorders for the Lincoln's speech. Quite realistic, it was later replaced with a computer-driven 'statue' that lost much of the original realism. The behavioral-model Agent of this disclosure can be applied with its motor skill and animation capabilities to drive the electro-mechanics of such a statue.

Such an agent can be trained and/or coached either as an actor, or can be configured and trained to play the emotional role—in this case, of Mr. Lincoln. Other such animations for purposes of art and entertainment are likewise enabled by this disclosure and are so claimed. This same system has identical applications in entertainment and education.

Emotional Expression in Movie Animation: Automated creation of emotional content to augment facial expression (e.g., Disney®, Pixar®, Lucas Films®, Dreamworks®). Much of cartoon creation is presently animated, particularly from the standpoint of facial features. The animation computer reads the English script of the cartoon's dialog and generates facial expressions, lip and jaw positions that are consistent with words being spoken and formed. Such software algorithmically translates English words into 'cookbook' facial shapes in synchrony with spoken words.

Systems like this greatly reduce the cost and drudgery of cartoon animation, but suffer in that they don't offer automatic portrayal of emotional expression. Simple cues, such as '?' marks, allow the automated raising of eyebrows when a question is asked, but there is little information in simple English grammar to convey true emotion. The Neuric agent can bring this capability to the animation movie industry.

Sentient Movie Animation: Placement of a sentient (thinking) being behind 3D animations, to permit the agent to instigate and carry out motion, reducing the workload on key-frame animation artists. Agents can be specifically trained to be actors. They are then given the same script and immerse themselves in it, just as a human actor would. Further, the agents can be training instruction specific to the script, to prepare them to experience the emotion caused by prior experience. (Possibly not covered by existing disclosure)

Video Games (Sentient characters)—Most video games are 'scripted' or heuristics based, with an action for every situation the writers could think of. Use of a behavioral-model neural agent enables competition against thinking characters, changing the entire feel of the video game.

For identical reasons, use of the agent in military training simulators offers more realistic characters within the simulators. Such simulators do not differ that much in their technical principles from high-end video games, and the two applications share many features in common.

Companionship

Companion for Alzheimer's Patients—Alzheimer victims greatly benefit from someone to talk to them, inasmuch as it practices the reconnection with diminishing memories. The behavioral-model Agent of this disclosure can be configured with a suitable temperament and predisposition for patience, and applied as a companion for Alzheimer's victims.

The agent can be trained and instructed in the optimum methods of interaction with such patients, becoming a friend, a confidante, encourager and calming outlet. This role enabled by the present disclosure can be greatly beneficial. It may be that the victim has no immediate family, or that family may already be emotionally beleaguered or otherwise unable to properly care for such a person.

Encouraging Confidante: The behavioral-model Agent of this disclosure, an encouraging confidante can be created. Speaking to the Agent about your personal problems will not only give you a listening ear, but someone who can ultimately respond with encouraging wisdom.

To implement, the Agent is first trained on matters of social relationships, on the fruits of various kinds of actions, cause and effect. Being implicitly trained in matters of psychological processes, it can distinguish between behaviors, outlooks and attitudes that are based in a person's underlying temperament, and those which are based in prior experience or environment. As such, the Agent can offer suggestions, sympathy or insight into the whys and what nexts of the present matters, and can do so at the heart level.

Dolls, Companion Toys and Confidantes: Use of emotion and feeling of the Neuric brain model opens entry to some volume consumer markets, such as dolls. The in-built emotion and visual cues available from the brain can be adapted to change facial expressions, giving warmth and personality to a doll, contrasting sharply with the inanimate nature of present one. The doll becomes a personal companion and friend rather than a stoic plastic face that cannot respond at all.

Example: Dolls: As the brain learns to recognize the child by voice features, it associates specific things it learns about the child with her. As in any new technology, the features and usefulness and realism of human-like dolls will increase as technology mature. The doll can be both a companion and a means of training.

Example: Autism: The doll's temperament and training can be shaped to be a 'safe' and non-threatening friend for autistic children, and tolerant and patient of them. The Neuric 'dolls' can take many forms, from traditional dolls hardware-based embedded agent brains to computer based "think-tank' companions at the business level.

Example: Robotics—Such companions may also take the form of bio-mechanical skeletons such as envisioned in previous media portrayals of robots, of the past several decades. It would be reasonable to say to such a robot, "Pick up that paper from over there on the floor and trash it!" Such applications are not practical with programmed or heuristics-based robotic controllers, which do not reason in the context of the moment.

Example: Confidante—It is not uncommon for people to maintain a diary to which they relate as if speaking to a human person. The behavioral-modeled agent of the present disclosure opens a new application in this area. A personal confidante is an application in which an agent can be configured with temperament and personality suitable to its owner, as someone she or he could readily relate to with confidence. For a child, the confidant could be a conversational bear, for example.

Example: Highly interactive toys can be created using an agent, optionally trained to play any number of child's games.

In a similar manner, "e-People" could be created, such that one could raise his own 'child' on the net. The child Agent could be configured to start with little knowledge of anything, and the interactive community trains their own specific child. Someone wanting a personal friend or confidante could chose from a base model/configuration and then begin training him/her.

In this system is the implicit danger that some people can use and train such agents for the wrong purposes. It is not desired that Agents be used by creative evil folks to gain insight or knowledge that will aid their evil deeds. For example, the sex industry might desire to purchase and train Agents. Terrorists could purchase Agents and use their AI capabilities. To limit these deeds, certain limitations and strictures could be placed on the Agent, whether through training or through restructuring of internal propensities.

Classical Robots—In many respects, the classical idea of a human-like robot has not been practical, because present technology is largely limited to a programmed, 'scripted' or heuristics-based internal 'brain'. That is, such a robot can do what it is programmed to do, and that only. It has no independent thought processes internal to it. By contrast, the behavioral model agent of the present disclosure permits autonomous thought, a sentient brain, to control the skeleton of the robot. It can think for itself, be given commands of things to do, show emotional expression and be conversationally interactive with humans around it.

3D Holographic Animations: A behavioral-model Agent of this disclosure can be trained and used to as the 3D image animator and thought processes behind 3D holographic images. Various movies such as Star Wars have envisioned a 3D animation using holographic projection of an image. While such projectors are presently in their infancy, such as for cockpit-based spatial imaging, they will come to maturity. During that transition, they will require means to form the animations, motions and facial expressions in an unscripted manner. The Agent of this disclosure is a suitable source for such information.

Further the Agent can be used as the intelligence behind the holographic animation itself, giving human-like qualities to an image rendered in 3D space. The applications for such a visual being may be far more diverse than mechanical or physical robotics, especially where human interaction or communication is concerned. Like the application for movie animation, this application puts a human face and behavior into Artificial Intelligence, along with the associated feeling, emotion and its expression.

Dolls with personalities that can grow with a child. Implementation of personality in the brain model. Implementation of temperament in the brain model.

Historical Figures: Mimicking

Teaching by the Masters—Previous experience with animated art forms: such as Walt Disney's depiction of Abraham Lincoln has demonstrated the emotional connection that animated art can make with people. While the Lincoln example was an animated life-sized statue of him that spoke, a behavioral-model Agent of this disclosure can be applied with its motor skill and animation capabilities to drive the electromechanics of such a statue, or a 3D modeling of some individual on a computer.

The agent can be configured and trained to play the behavioral role of a person no longer living. It can use the preexisting emotional connections that people have with that person, to interact with them for purposes of education or training of people. For example, the Agent/person can be trained to know the flow and nuances of history related to the person being mimicked, serving as an awe-inspiring method of training in history or other matters.

The person being emulated could be an Admiral Sprague discussing the Battle of Leyte Gulf. It could be an image of Albert Einstein that can address the issues of special and general Relativity, a Richard Feynman image can address general physics, or a Werner Heisenberg can discuss the background of why he developed matrix algebra: to simplify the computations of the Uncertainty Principle in physics. Applications of this sort have the potential to turn the world of education completely upside down.

Speech to Text

Alternative Speech (e.g., regional accents, Ebonics)—Because of the behavioral model of the present disclosure operates in terms of concepts instead of disparate facts, it is able to construct sentences that state information in alternative ways. One such method is the use of regional accents, or of cultural-specific expressions such as Ebonics. This can greatly augment the human-like personality of speech-generating devices as may be used in commercial or consumer enterprise.

Call Center Data/Voice Interpreter: A behavioral-model Agent of this disclosure can be trained and give an emotional status of a caller to the call center operator. It could give the operator with a suggested response word to solicit the option response.

Menu-Free Telephone "Websites"—For telephone calls at commercial businesses, it is common to have automated menu-driven answering systems, some of which are menu-driven voice response units. While a welcome alternative to having no call-answering system at all, they are less desirable than true human attendants. A behavioral-model agent of this disclosure can be trained in multiple aspects of information related to the business, and able to answer questions to the depth of exposure desired by management.

This application goes beyond the mere vectoring of the caller to the proper telephone, which it could be given the information to do. The neural agent also acts to handle inquiries, or will best direct the caller to the someone who can properly answer the inquiry.

Voice-interactive Elevator Controls—Elevators and their controls have been around for more than a hundred years, but their controls have not evolved that much. It is possible with ordinary non-sentient analog and digital technology to make an elevator whose controls operate on classical voice-recognition principles.

To replace or augment existing push-button or voice-activated elevator controls with a behavioral-modeled agent brain may at first appear to be an overkill solution. However, it is a practical alternative and can bring additional useful functionality to the elevator controls. Actual cost of hardware implementation of the agent of the present disclosure is not substantial, and would be on a par with cost of existing elevator control electronics. For its cost, it brings human-factors based functionality to the system.

The agent can handle the normal 'floor-number' requests ("Four, please!") as well such as "Lobby", "Main floor" and other expected variants. If it is trained to know what tenant offices are in the building, it could also properly respond to "The floor that Gresham Engineering is on" and other such sentence fragments or clauses.

An elevator control agent can be trained to know the layout of the building and answer questions related to that, as well as to identify and know the voices of well known clients. For example, "Take me to Jack Smalley's office," could evoke the reply of, "Okay, but I just left him off at the main lobby." Clearly, the training could be configured to properly handle matters of both physical and information security, as is appropriate for the installation.

On rare occasions, unusual, emergency or panic-prone situations arise. The agent can be trained as to how to handle these and guidelines on how to interact with patrons to mollify them, answering their concerns or questions. Emergency crews such as firemen could also query of the elevator how many people it has handled from the fifth floor in the last 10 minutes, which floors are abnormally warm, and other safety-related information.

In every case, no pat answers are programmed into the agent. Indeed, no programming of the conventional variety is needed (or available). English text descriptions of relevant information of the day can be uploaded to the elevator agent on a regular basis to make 'elevator service' take on new meaning in the public eye. Any human language for which the agent has been configured could also be used with the system.

Voice-to-Text, Near-Absolute Accuracy—Use of human voice to transcribe documents onto a computer is yet relatively limited because of its need for extensive vocal training. Once trained, it still is less that 100% accurate, and will even then recognize only one person's voice. Its present limitations lie in its frequent use of rules-based Artificial Intelligence concepts. The neural agent of the present disclosure has the potential for near 100% accuracy over a wide range of human voices, and is based upon interpretation of sound in the context of the moment.

Analysis of Regional Speech—In its interactions with diverse cultures across the world, there is military need to understand the regional accent of an English-speaking person. For example, this is of value when dealing with terrorism, whether it be to determine where the person came from or where he might have been trained. By quickly ascertaining the vagaries of regional accent, the agent can give valuable heads-up warning that may be needed.

Better, adaptive intelligent automated phone answering/querying systems. (Currently they are just preprogrammed with anticipated queries.)

Security

Recognition of Faces at Press Conferences—It is possible to configure the behavioral-model agent of this disclosure to identify faces and present the information at the podium. For example, when taking questions from reporters, the person asking the question can be automatically identified and his name and/or background popped up on a small podium display panel. It allows the speaker to address the reporter—for example—by name.

This would be possible if the reporters registered "at the front desk" were viewed by a camera serving as the agent's eyes, connecting that face with data obtained from his registration information. There is similar application in commercial, social and military circles, wherever the association of face and name is important or crucial.

Face-in-the-Camera for ATM Security—Recognition of known criminals or terrorists. Facial Recognition for ATMs—Fraud avoidance. Facial Recognition—Banking lobbies and other public buildings.

Surveillance Camera Imagery Interpretation—One high-end technique in use today with surveillance cameras is to subtract two images from each other to see what has changed between the two frames. An alternative approach is to have the behavioral model agent of this disclosure to augment such techniques with analytical scrutiny of the images. This eliminates frame changes due to natural changes in the image, such as waving branches.

Secure Facility Access Control—Use the behavioral model agent of this disclosure to augment video-based secure area access. The agent can analytically determine that 'something isn't right', to preclude access by specific personnel. It can refer their access to human counterparts if necessary. This has specific applications in industry, banking, commerce and the military.

Security Surveillance Interpretation (Face in a Crowd)—For public transportation terminals, such as subway, train, bus or air transport, cameras with facial recognition can be augmented by a behavioral model agent of this disclosure. This model can use additional characteristics other than simple facial recognition to identify patterns, movements, and other elements that suggest that something may be amiss.

Prostehtics

Hearing and Vision Recovery or Replacement—Interpretation of speech and visual information is an interactive process of the brain based upon context in prior experience. It is not simply a literal rendering of sound 'snippets' into words, for example. Use of the behavioral-model agent of this disclosure can facilitate the recovery from loss of human hearing or sight. The means can include offering an interpretation of the information using alternative senses, such as displaying speech on a screen or verbally announcing what the individual is looking at. It can also be used to generate the relevant signals that would have come from damaged nerves, using medical implants.

Training and Education

Training Using Temperament-Specific Approaches—For each human temperament, there is an optimal approach to both training and tutoring. The classical one-type-fits-all approach is not equally effective for all temperaments. The behavioral-model agent of the present disclosure can be trained to be an instructor or tutor, and then configured for the specific temperament of the students to be trained. Such configuration, for example, preset the agent to have a Sanguine temperament when training a Sanguine. The result is that the student relates to the presentation approach of the instructor, making the material more interesting.

Tutoring and Companion Aids for Children. See the Recreation topics for coverage of this area, as well as temperament-specific tutoring. Tutors (math, science, etc.), especially for languages where the size of the space of wrong answers is large. Current programs only know when an answer is wrong, but not how it is wrong and how to tell the student that.

Art

Creation of Music (and an AI Music Genre)—The behavioral-model Agent of this disclosure an create music of new genres, and multiple sub-genres. The Agent can be trained or optimized to create music based on his past experiences, feelings, knowledge, preferences and other internal issues of state.

Such an application can give the unmusical the ability to be musical. The agent can be trained to be a substantial copy of a certain person, with his/her certain past and certain experiences. This music could then be more closely associated with one's heart, because it came from an agent whose mindset mimicked their own.

In a similar manner, agents can be trained to know musical genres such as classical and rap. It can be instructed to produce hybrid musical genres based upon well-understood constructs of 'legitimate' music for genres it knows. Because genres themselves define the acceptable musical structure, patterns, chording, rhythm and organization, there is a wealth of information available for properly training an agent to create such music.

Investigation

Marketing research tool. Get engaged in a conversation, connect with people, then unobtrusively ask what they think about X or what brand of Y they use.

Although the preferred embodiment has been described in detail, it should be understood that various changes, substitutions and alterations can be made therein without departing from the spirit and scope of the invention as defined by the appended claims.

What is claimed is:

1. A method for emulating human behavior and actions to control and execute a defined task, comprising the steps of:
    defining a task based application having a task associated therewith that is operable to receive goals and conditions and which goals define desired results to be achieved when the task is performed;
    providing inputs to the task based application for controlling the operation thereof;
    receiving from the task based application information as to the state of the task based application;
    defining a brain emulation that is represented by a plurality of concept nodes each representing a concept, and non-fixed interconnecting relationships defined between select ones of the concept nodes, which brain emulation is operable to receive information from the task based application and process such information and capable of controlling the task based application with the outcome of such processing to achieve the goal of the task based application;
    training, using a processor, the brain emulation in a training mode to create and define the otherwise non pre-existing relationships between concepts associated with the concept nodes in response to training information input thereto that is designed to impart predetermined meaning to the one or more concepts in the brain emulation and wherein some of the concept nodes have bidirectional relationships;
    operating in an operational mode after training to receive information either directly from an external source or from the task based application as to the state of the task based application; and
    process the received information based on the existing interconnecting relationships to initiate the task associated with the task based application and attempt to achieve the goal associated with the task based application.

2. The method of claim 1, wherein received information from the task based application includes information about a surrounding environment of the task based application during the performance of the associated task and changes thereto.

3. The method of claim 1, wherein the task is a temporal task that occurs over a time horizon.

4. The method of claim 1, wherein the step of training comprises the steps of:
    training the brain emulation with a first generic set of general information to establish general relationships between concepts in response to general training information input thereto that is designed to impart a general predetermined meaning to the one or more concepts in the brain emulation that are not necessarily specific to the task based application; and
    training the brain emulation with a second and task based application specific set of information to establish task specific relationships between concepts associated with the task based application in response to task specific training information focused on the associated task and input thereto that is designed to impart a specific predetermined task related meaning to the one or more concepts in the brain emulation that are specific to the task based application.

5. The method of claim 1, wherein, in response to external disturbances having no predetermined or trained relationships associated therewith, the external disturbances will be received and used to update the existing trained relationships as experiences that can be used in a future performance of the task.

6. The method of claim 1, where in the goals of the task based application are imparted to the brain emulation after the step of training, such that the brain emulation has the training thereof and the learned relationships modified.

* * * * *